(12) United States Patent
Plouffe et al.

(10) Patent No.: US 8,776,050 B2
(45) Date of Patent: Jul. 8, 2014

(54) DISTRIBUTED VIRTUAL MACHINE MONITOR FOR MANAGING MULTIPLE VIRTUAL RESOURCES ACROSS MULTIPLE PHYSICAL NODES

(75) Inventors: Jerry Plouffe, Hollis, NH (US); Scott H. Davis, Needham, MA (US); Alexander D. Vasilevsky, Westford, MA (US); Benjamin J. Thomas, III, Bedford, MA (US); Steven S. Noyes, Sterling, MA (US); Tom Hazel, Andover, MA (US)

(73) Assignee: Oracle International Corporation, Redwood Shores, CA (US)

( * ) Notice: Subject to any disclaimer, the term of this patent is extended or adjusted under 35 U.S.C. 154(b) by 1636 days.

(21) Appl. No.: 10/972,762

(22) Filed: Oct. 25, 2004

(65) Prior Publication Data

US 2005/0120160 A1     Jun. 2, 2005

Related U.S. Application Data

(63) Continuation-in-part of application No. 10/831,973, filed on Apr. 26, 2004, now abandoned.

(60) Provisional application No. 60/565,433, filed on Apr. 26, 2004, provisional application No. 60/496,567, filed on Aug. 20, 2003.

(51) Int. Cl.
*G06F 9/455* (2006.01)
*G06F 9/46* (2006.01)
*G06F 9/50* (2006.01)

(52) U.S. Cl.
CPC .......... *G06F 9/5077* (2013.01); *G06F 9/45533* (2013.01); *G06F 9/45558* (2013.01); *G06F 9/455* (2013.01); *G06F 9/50* (2013.01)
USPC ................ 718/1; 718/100; 718/102; 718/104

(58) Field of Classification Search
CPC ..... G06F 9/5077; G06F 9/50; G06F 9/45558; G06F 9/455; G06F 9/45533
USPC .......................................... 718/102, 104, 105
See application file for complete search history.

(56) References Cited

U.S. PATENT DOCUMENTS 5,379,428 A     1/1995   Belo
5,692,193 A *  11/1997   Jagannathan et al. ........ 718/106
5,909,540 A     6/1999   Carter et al.

(Continued)

FOREIGN PATENT DOCUMENTS

EP          0 780 770 A1    6/1997
EP          0780770 A       6/1997

(Continued)

OTHER PUBLICATIONS

VMware ("VMware ESX server, user manual", version 1.5, 2002, pp. 1-286).*

(Continued)

*Primary Examiner* — Meng An
*Assistant Examiner* — Caroline H Arcos
(74) *Attorney, Agent, or Firm* — Kilpatrick Townsend & Stockton LLP

(57) ABSTRACT

A management capability is provided for a virtual computing platform. In one example, this platform allows interconnected physical resources such as processors, memory, network interfaces and storage interfaces to be abstracted and mapped to virtual resources (e.g., virtual mainframes, virtual partitions). Virtual resources contained in a virtual partition can be assembled into virtual servers that execute a guest operating system (e.g., Linux). In one example, the abstraction is unique in that any resource is available to any virtual server regardless of the physical boundaries that separate the resources. For example, any number of physical processors or any amount of physical memory can be used by a virtual server even if these resources span different nodes.

37 Claims, 22 Drawing Sheets

(56) References Cited

U.S. PATENT DOCUMENTS

| | | | |
|---|---|---|---|
| 5,918,229 A | 6/1999 | Davis et al. | |
| 5,946,487 A * | 8/1999 | Dangelo | 717/148 |
| 5,964,886 A | 10/1999 | Slaughter et al. | |
| 5,987,506 A | 11/1999 | Carter et al. | |
| 6,026,474 A | 2/2000 | Carter et al. | |
| 6,047,323 A | 4/2000 | Krause | |
| 6,075,938 A * | 6/2000 | Bugnion et al. | 703/27 |
| 6,148,377 A | 11/2000 | Carter et al. | |
| 6,272,523 B1 | 8/2001 | Factor | |
| 6,321,373 B1 * | 11/2001 | Ekanadham et al. | 717/119 |
| 6,345,287 B1 | 2/2002 | Fong et al. | |
| 6,397,242 B1 * | 5/2002 | Devine et al. | 718/1 |
| 6,427,162 B1 * | 7/2002 | Mohamed | 718/108 |
| 6,496,847 B1 | 12/2002 | Bugnion et al. | |
| 6,647,393 B1 | 11/2003 | Dietterich et al. | |
| 6,704,925 B1 | 3/2004 | Bugnion | |
| 6,711,672 B1 | 3/2004 | Agesen | |
| 6,725,289 B1 | 4/2004 | Waldspurger et al. | |
| 6,735,601 B1 | 5/2004 | Subrahmanyam | |
| 6,735,613 B1 * | 5/2004 | Jean-Dominique et al. | 718/104 |
| 6,760,756 B1 | 7/2004 | Davis et al. | |
| 6,768,901 B1 * | 7/2004 | Osborn et al. | 455/230 |
| 6,778,886 B2 | 8/2004 | Hunt | |
| 6,785,886 B1 | 8/2004 | Lim et al. | |
| 6,789,156 B1 | 9/2004 | Waldspurger | |
| 6,795,966 B1 | 9/2004 | Lim et al. | |
| 6,839,740 B1 | 1/2005 | Kiselev | |
| 6,865,688 B2 * | 3/2005 | Dawkins et al. | 714/6 |
| 6,886,085 B1 * | 4/2005 | Shuf et al. | 711/159 |
| 6,898,670 B2 | 5/2005 | Nahum | |
| 6,907,419 B1 * | 6/2005 | Pesola et al. | 707/1 |
| 6,961,806 B1 * | 11/2005 | Agesen et al. | 711/6 |
| 6,961,941 B1 * | 11/2005 | Nelson et al. | 719/319 |
| 7,007,183 B2 * | 2/2006 | Rawson, III | 713/324 |
| 7,016,996 B1 | 3/2006 | Schober | |
| 7,024,427 B2 * | 4/2006 | Bobbitt et al. | 707/200 |
| 7,035,930 B2 * | 4/2006 | Graupner et al. | 709/226 |
| 7,039,705 B2 * | 5/2006 | Graupner et al. | 709/226 |
| 7,103,625 B1 * | 9/2006 | Hipp et al. | 709/201 |
| 7,117,280 B2 * | 10/2006 | Vasudevan | 710/100 |
| 7,140,021 B2 * | 11/2006 | Srinivas et al. | 718/104 |
| 7,143,412 B2 | 11/2006 | Koenen | |
| 7,191,440 B2 * | 3/2007 | Cota-Robles et al. | 718/1 |
| 7,203,944 B1 * | 4/2007 | van Rietschote et al. | 718/104 |
| 7,240,098 B1 | 7/2007 | Mansee | |
| 7,366,784 B2 * | 4/2008 | Ishizaki | 709/228 |
| 7,392,511 B2 * | 6/2008 | Brokenshire et al. | 717/143 |
| 7,484,208 B1 * | 1/2009 | Nelson | 718/1 |
| 2002/0049803 A1 * | 4/2002 | Bandhole et al. | 709/104 |
| 2002/0095396 A1 * | 7/2002 | Frerking et al. | 707/1 |
| 2002/0103889 A1 | 8/2002 | Markson et al. | |
| 2003/0037127 A1 | 2/2003 | Shah et al. | |
| 2003/0061220 A1 | 3/2003 | Ibrahim et al. | |
| 2003/0061379 A1 | 3/2003 | Craddock et al. | |
| 2003/0069886 A1 | 4/2003 | Jaskiewicz | |
| 2003/0101377 A1 * | 5/2003 | Dawkins et al. | 714/34 |
| 2003/0110205 A1 * | 6/2003 | Johnson | 709/104 |
| 2003/0115218 A1 | 6/2003 | Bobbitt et al. | |
| 2003/0172149 A1 | 9/2003 | Edsall et al. | |
| 2004/0107300 A1 | 6/2004 | Padmanabhan et al. | |
| 2004/0268044 A1 * | 12/2004 | Heller et al. | 711/118 |
| 2005/0039180 A1 | 2/2005 | Fultheim et al. | |
| 2005/0044301 A1 * | 2/2005 | Vasilevsky et al. | 711/1 |
| 2005/0080982 A1 | 4/2005 | Vasilevsky et al. | |

FOREIGN PATENT DOCUMENTS

| | | |
|---|---|---|
| WO | WO 01/14987 A | 3/2001 |
| WO | WO 01/14987 A2 | 3/2001 |
| WO | WO 02/25437 A | 3/2002 |
| WO | WO 02/25437 A1 | 3/2002 |

OTHER PUBLICATIONS

Bugnion et al., "Disco: runing commodity operating systems on scalable multiprocessors", ACM, 1997, pp. 412-447.*

Govil et al. ("Cellular Disco: Resource management using virtual clusters on shared—memory multiprocessors", ACM, 2000, pp. 229-262).*

Figueiredo, Renato J., A Case for Grid Computing on Virtual Machines, May 2003, retrieved from the internet via URL: http://ieeexplore.ieee.org/xpls/abs_all.jps?arnumber=1203506.

U.S. Appl. No. 10/831,973, filed Apr. 26, 2004, Office Action mailed Nov. 4, 2009, 20 pages.

U.S. Appl. No. 10/911,398, filed Aug. 7, 2004, Office Action mailed Apr. 5, 2007, 8 pages.

Beck, et al., "Harness: a next generation distributed virtual machine," Future Generation Computer Systems, vol. 15, No. 5-6, accepted Dec. 14, 2008, pp. 571-582.

Goscinski, et al., "Genesis: an efficient, transparent and easy to use cluster operating system," Parallel Computing, vol. 28, No. 4, accepted Dec. 12, 2001, pp. 557-606.

Migliardi, et al., "Dynamic Reconfiguration and Virtual Machine Management in the Harness Metacomputing System," Computing In Object-Oriented Parallel Environments, Second International Symposium, ISCOPE 98, 1998, pp. 127-134.

Migliardi, et al., "Plug-ins, Layered Services and Behavioral Objects: Application Programming Styles in the Harness Metacomputing System," Future Generation Computer Systems, vol. 17, No. 6, Apr. 2001, pp. 795-811.

Brainy Encyclopedia, "Plex86," (brainyencyclopedia.com), date printed May 2, 2005.

SourceFORGE.net, "Project: Bochs x86 PC emulator: summary," (sourceforget.net), date printed May 2, 2005.

Paul Barham, et al., "Xen and the Art of Virtualization" 2003, University of Cambridge Computer Laboratory, Cambridge, UK.

Nancy P. Kronenberg, et al., "VAXclusters: A Closely-Coupled Distributed System," ACM Transactions on Computer Systems, vol. 4, No. 2, May 1986, pp. 130-146.

William E. Snaman, Jr., "Application Design in a VAXcluster System," Digital Technical Journal, vol. 3, No. 3, Summer 1991.

Scott H. Davis, "Design of a VMS Volume Shadowing Phase II-Host-based Shadowing," Digital Technical Journal, vol. 3, No. 3, Summer 1991.

Wayne M. Cardoza et al., Design of the TruCluster Multicomputer System for the Digital UNIX Environment, (adolfsson.org), date printed Mar. 11, 2005.

James V. Lawton et al., "Building a High-performance Message-passing System for Memory Channel clusters," (adolfsson.org), date printed Mar. 11, 2005.

Kinshuk Govil et al., "Cellular Disco: resource management using virtual clusters on shared-memory multiprocessors," Operating Systems Review 35(5): 154-169, Dec. 1999.

Andrew Whitaker et al., "Denali: Lightweight Virtual Machines for Distributed and Networked Applications," The University of Washington, 2002 14 pgs.

Tal Garfinkel et al., "Terra: A Virtual Machine-Based Platform for Trusted Computing," Computer Science Department, Stanford University, 2003 14 pgs.

Sujay Parekh et al., "Thread-Sensitive Scheduling for SMT Processors", pp. 1-19, 2000.

John Regehr, "Hierarchical Loadable Schedulers," (cs.utah.edu), date printed Feb. 15, 2005, pp. 1-15.

John B. Carter et al., "A Comparison of Software and Hardware Synchronization Mechanisms for Distributed Shared Memory Multiprocessors," Department of Computer Science, University of Utah, Salt Lake City, UT, Sep. 24, 1996, pp. 1-24.

Bryan Ford et al., "Microkernels Meet Recursive Virtual Machines," Department of Computer Science, University of Utah, Salt Lake City, UT, May 10, 1996, 1-15.

Ravindra Kuramkote et al., "Analysis of Avalanche's Shared Memory Architecture," pp. 1-17, 1997.

Chen-Chi Kuo et al., "AS-COMA: An Adaptive Hybrid Shared Memory Architecture," Department of Computer Science, University of Utah, Salt Lake City, UT, Mar. 23, 1998, pp. 1-26.

John B. Carter et al., "Design Alternatives for Shared Memory Multiprocessors," Department of Computer Science, University of Utah, Salt Lake City, UT, Mar. 23, 1998, pp. 1-22.

(56) References Cited

OTHER PUBLICATIONS

John B. Carter et al., "Avalanche: A Communication and Memory Architecture for Scalable Parallel Computing," Computer Systems Laboratory, University of Utah, pp. 1-22, 1995.

W. Wulf, et al., Hydra: The Kernel of a Multiprocessor Operating System, Communications of the ACM, Jun. 1974, vol. 17 No. 6, pp. 337-345.

Kai Li and Paul Hudak, "Memory Coherence in Shared Virtual Memory Systems," ACM Transactions on Computer Systems, 7(4):321-359, Nov. 1989.

Mendel Rosenblum and Tal Garfinkel, "Virtual Machine Monitors: Current Technology and Future Trends" Published by the IEEE Computer Society, May 2005, pp. 39-47.

\* cited by examiner

DISTRIBUTED VIRTUAL MACHINE MONITOR FOR MANAGING MULTIPLE VIRTUAL RESOURCES ACROSS MULTIPLE PHYSICAL NODES

RELATED APPLICATIONS

This application is a continuation-in-part of, and claims priority under 35 U.S.C. §120 to U.S. application Ser. No. 10/831,973, entitled "VIRTUAL SYSTEM ARCHITECTURE AND METHOD" by A. Vasilevsky, et al., filed Apr. 26, 2004, now abandoned which claims priority to Provisional Application Ser. No. 60/496,567, entitled "VIRTUAL SYSTEM ARCHITECTURE AND METHOD," by A. Vasilevsky, et al., filed on Aug. 20, 2003, and Provisional Application Ser. No. 60/565,433 entitled "METHOD AND APPARATUS FOR MANAGING VIRTUAL SERVERS," filed Apr. 26, 2004, each of which applications are herein incorporated by reference in their entirety.

FIELD OF THE INVENTION

The field of the invention relates generally to management of computer systems, and more particularly, to management of virtual resources.

BACKGROUND OF THE INVENTION

Conventional datacenters include a complex mesh of N-tier applications. Each tier typically includes multiple servers (nodes) that are dedicated to each application or application portion. These nodes generally include one or more computer systems that execute an application or portion thereof, and provide computing resources to clients. Some systems are general purpose computers (e.g., a Pentium-based server system) having general purpose operating systems (e.g., Microsoft Server 2003) while others are special-purpose systems (e.g., a network attached storage system, database server, etc.) that is specially developed for this purpose using custom operating system(s) and hardware. Typically, these servers provide a single function (e.g., file server, application server, backup server, etc.) to one or more client computers coupled through a communication network (e.g., enterprise network, Internet, combination of both).

Configurations of datacenter resources may be adjusted from time to time depending on the changing requirements of the applications used, performance issues, reallocation of resources, and other reasons. Configuration changes are performed, for example, by manually reconfiguring servers, adding memory/storage, etc., and these changes generally involve a reboot of affected computer systems and/or an interruption in the execution of the affected application. There exist other techniques such as server farms with front-end load balancers and grid-aware applications that allow the addition and deletion of resources, however, the operating systems or applications on which they are supported must be specifically developed to operate in such an environment.

SUMMARY OF THE INVENTION

According to one aspect of the invention, a system is provided that enables a virtualized environment suitable for dynamic configuration of components in response to varying hardware and policy needs. One aspect of the present invention relates to a virtual computing system and methods and systems for managing the virtual computing system.

According to one aspect of the present invention, a management capability is provided for a virtual computing platform. This platform allows scale-up and scale-down of virtual computing systems, and such a management capability provides for control of such scale-up and scale-down functions. For instance, a capability is provided to allocate and/or deallocate resources (e.g., processing, memory, networking, storage, etc.) to a virtual computing system. Such control may provide, for example, to an administrator through an interface (e.g., via a CLI, or GUI) or to other programs (e.g., via a programmatic interface).

According to one aspect of the present invention, an interface is provided that allows for the addition or removal of resources during the execution of a virtual computing system. Because resource allocation may be changed without restarting the virtual computing system, a flexible tool is provided for administrators and programs for administering computing resources. For example, in the case where such a virtual computing system is provided in a datacenter, an administrator (through a user interface or a program through a programmatic interface) may be capable of provisioning resources in real-time to support executing virtual servers without interrupting applications or servers. Conventionally, datacenter server resources are hard-provisioned, and require interruption of server operation for resources to be changed (e.g., change in memory, network, or storage devices).

According to one embodiment of the present invention, a virtual computing system is provided that allows a system administrator or a program to provision computing resources in real-time ("on-the-fly") without a restart of a virtual computing system, as hot-pluggable processor, I/O or storage devices. For instance, the administrator may be presented an interface through which resources may be allocated to a virtual server (e.g., one that emulates a virtual multiprocessor computer). The interface may display a representation of an allocation of physical resources and mapping to virtual resources used by a virtual server. For example, the interface may provide an ability to map virtual servers to sets of physical resources, such as a virtual processor that is mapped to a physical processor. Such an interface may be, for example, a programmatic, command line, graphical user interface, or any other type of interface suitable for managing a virtual computing system.

According to another aspect of the present invention, the interface is a graphical user interface (GUI) that allows a drag-and-drop and/or pull-down provisioning of resources. This ability permits an administrator to grow or shrink the capabilities of a virtual server system graphically. More particularly, the user interface may display to a user, a display of virtual to physical mappings for one or more virtual server systems. In one embodiment, a virtual server can span a collection of a physical nodes coupled by an interconnect. This capability allows, for example, an arbitrarily-sized virtual multiprocessor system (e.g., SMP, Numa, ASMP, etc.) to be created.

In another example, an interface may be provided that displays an entire virtual data center with associated virtual servers and their resources. Such an interface may also be used by an administrator to add, move, and change resources in the virtual datacenter through a visual interface. An administrator may also be permitted to define policies on how virtual resources may be accessed and policies that govern automatic sizing, reconfiguration, and/or provisioning of virtual servers. Such policies may be triggered based on one or more predefined rules, and an administrator may define one or more actions that may be taken as a result of a rule being triggered.

A resource that may be managed using various aspects of the present invention includes any element or group of elements that perform functions used by a computer system. Examples of such resources include physical resources (e.g., processors, memory, storage, network interfaces, etc.) and virtual resources that are backed by one or more underlying physical resources. An example of a virtual resource is a Virtual Host Bus Adapter (VHBA) which may be supported by one or more underlying physical Host Bus Adapters (HBAs) and associated software. Virtual resources (e.g., virtual processors, virtual network interfaces, virtual storage adapters, etc.) may be mapped to one or more underlying physical resources by a virtualization layer as described more fully below. According to one aspect of the present invention, capability is provided to manage the allocation of resources (e.g., physical resources, virtual resources) in a virtual computing system.

According to another embodiment of the present invention, the interface may be a programmatic interface that may be used by other applications that manage the allocation of resources. For instance, functions may be exposed to application programs for increasing (or decreasing) resources for use in executing the same application programs. Similarly, a management application may determine the performance (e.g., processor utilization) of a virtual server, and in response, may adjust resources automatically to maximize the use of resources, increase performance, etc.

According to various aspects of the present invention, a management infrastructure is provided comprising a management server having a management console and one or more management agents used to manage one or more servers. In one embodiment, the management server may provide a user interface through which a user (e.g., an administrator) may configure and control one or more virtual servers and underlying physical resources. According to another embodiment, management agents may be, for example, components of a distributed virtual machine monitor program that are executed by one or more nodes and control virtual servers through commands issued to the distributed virtual machine monitor.

The system may also include a data store that holds configuration information. In one example, this data store is controlled and managed by the management server. The system may also include a management agent. Through this management agent, the distributed virtual machine monitor program may communicate with the management server using a management protocol. This communication includes configuration information, operations, logging, parameter setting, events, alarms, heartbeats and other methods of cooperation and communication. Configuration changes may be coordinated and/or tracked to allow for orderly changes to the virtual computing system to occur. This may be performed using discrete transactions, for example.

In one embodiment, discrete transactions may be stored to provide a transaction history for the virtual computing system. In particular, a record may be maintained of discrete transactions as they are performed on the virtual computing system and its components. Because a history of the discrete transactions is stored, a capability for rolling back changes on the virtual computing system may be provided. Such a transaction history is also useful for assisting an administrator in tracking changes and support of the virtual computing system.

According to one aspect of the present invention, a system is provided which comprises a plurality of physical resources, a virtualization layer that maps the plurality of physical resources to one or more virtual resources, wherein the one or more virtual resources span at least two of the plurality of physical resources, and an interface that represents the mapping of the plurality of physical resources to the one or more virtual resources. According to one embodiment, the plurality of physical resources includes at least one of an input/output (I/O) device, an interconnect, a processor, and a storage entity. According to another embodiment, one or more virtual resources include at least one of a virtual multiprocessor computer and an I/O device. According to another embodiment, the one or more virtual resources include at least one virtual computer that is mapped to at least one of the plurality of physical resources. According to another embodiment, the interface is adapted to provide ability to map physical resources to at least one virtual resource and to remove physical resources from being mapped to the at least one virtual resource. According to another embodiment, the interface includes at least one of a group comprising a graphical user interface, a command line interface, and a programmatic interface.

According to one aspect of the invention, in a computer system comprising a plurality of resources and user interface having a display, a method is provided for permitting configuration of the plurality of resources, comprising displaying a representation of a virtual server on the display; and providing for a user to select a resource and associate the resource with the virtual server. According to one embodiment, the method further comprises providing for the user to select the resource and disassociate the resource from the virtual server. According to one aspect of the invention, in a computer system including an interface and a plurality of resources, a method is provided for allocating the plurality of resources comprising acts of providing a selection of at least one virtual resource on the interface, and allowing mapping of at least one resource of the plurality of resources to the virtual resource through a virtualization layer.

According to one aspect, a computer-based system for managing a virtual server system comprising a plurality of physical resources, at least one of which is associated with at least one of a plurality of virtual resources, the virtual server system comprising a virtualization layer that maps the at least one of the plurality of physical resources, the computer-based system comprising an interface that provides a representation on the mapping; and at least one control adapted to create and delete the mapping.

According to one aspect, a management infrastructure is provided which is adapted to operate in a computer-based network environment to control allocation of a plurality of resources in the network environment. The management infrastructure comprises a control interface, a distributed virtual machine monitor program adapted to execute on at least one of the plurality of resources, and at least one management agent adapted to communicate with the control interface to receive instructions and to forward results, and wherein the management agent is capable of communicating the instructions to the distributed virtual machine monitor program which is capable of implementing the instructions so as to allocate the plurality of resources and wherein the management agent forwards a result of the implementing of the instructions. According to another embodiment, the control interface includes at least one of a group comprising a graphical user interface, a command line interface, and a programmatic interface.

According to one aspect, a system is provided comprising a virtual server system capable of executing at least one of a plurality of operating systems, and a manager capable of mapping the at least one of the plurality of operating systems to the virtual server. According to one aspect, a virtual computing system is provided comprising a plurality of physical resources, a virtualization layer that maps the plurality of physical resources to one or more virtual resources, and a manager that performs at least one of adding, moving, and removing at least one of the plurality of physical resources from the virtual computing system.

According to one embodiment, the manager stores a history of changes in configuration of the virtual computing system. According to another embodiment, the system further comprises a manager that is adapted to processes at least one transaction, the at least one transaction relating to the at least one of adding, moving, and removing the at least one of the plurality of resources from the virtual computing system. According to another embodiment, the manager is adapted to store change information of the at least one transaction as a discrete entry in the history of changes. According to another embodiment, the manager is adapted to undo the at least one transaction based on the discrete entry stored in the history of changes. According to another embodiment, the manager is adapted to implement at least one management policy relating to virtual and physical resources. According to another embodiment, the at least one management policy includes at least one rule triggered by one or more events. According to another embodiment, the manager is adapted to perform one or more actions in response to a triggering of the at least one rule. According to another embodiment, the at least one management policy is in effect for a particular period of time.

According to one embodiment, the at least one rule is triggered based on one or more parameters. According to another embodiment, the one or more parameters include at least one of a performance parameter indicating the performance of the virtual computing system. According to another embodiment, the manager is adapted to perform at least one of the group of actions comprising add a resource to the virtual computing system, repair a resource of the virtual computing system, remove a resource from the virtual computing system, start a processing resource of the virtual computing system, and stop a processing resource of the virtual computing system. According to another embodiment, the plurality of virtual resources includes a virtual I/O interface. According to another embodiment, the virtual I/O interface includes an associated identifier. According to another embodiment, the virtual I/O interface is a virtual network interface, and wherein the associated identifier includes a network address. According to another embodiment, the network address includes a MAC address. According to another embodiment, the virtual I/O interface is a virtual storage adapter, and wherein the associated identifier includes a storage adapter identifier. According to another embodiment, the storage adapter identifier includes a World Wide Node Name (WWNN) identifier. According to another embodiment, the system further comprises a manager that is adapted to define the one or more virtual resources in the virtual computing system, the one or more virtual resources including the virtual I/O resource, and wherein the manager is adapted to assign the associated identifier to the virtual I/O resource.

According to one embodiment, the manager is adapted to select the associated identifier from a group of available identifiers. According to another embodiment, the manager further comprises an interface, through which the associated identifier is assigned to the virtual I/O resource. According to another embodiment, the one or more virtual resources include at least one virtual computer that is mapped to at least one of the plurality of physical resources, and wherein the manager further comprises an interface, through which the at least one virtual computer may be created. According to another embodiment, the manager is adapted to perform at least one of adding, moving, and removing at least one of the plurality of physical resources from the virtual computing system. According to another embodiment, the interface includes a control for making a copy of the at least one virtual computer, and wherein the control includes means for assigning, to a virtual I/O resource associated with the copy, a new associated identifier. According to another embodiment, the manager is adapted to select the associated identifier from a group of available identifiers. According to another embodiment, the interface includes at least one of a group comprising a graphical user interface, a command line interface, and a programmatic interface.

According to another embodiment, the at least two of the plurality of physical resources are associated with respective separate nodes, and wherein the one or more virtual resources span the separate nodes.

Also, it is realized that conventional single-function servers (e.g., fileservers, application server, storage server, etc.) are typically over-provisioned due to the inflexibility of the environment. More particularly, each application component executes on a server geared to more than the maximum workload the server will ever experience from the application, resulting in rampant under-utilization of the computing resources. For the majority of the time, the server experiences much less than its maximum design workload. Also, it is realized that because resources in this environment are hard-provisioned, the environment does not allow adequate flexibility in response to changing business and customer needs. More particularly, as customer and business needs change, expanding (or contracting) the server resources or applying excess resources where they are needed is difficult, and generally requires time and effort on the part of an administrator to reconfigure/upgrade the affected server system(s).

Conventional single-function server architecture leads to a multiplicity of servers in the datacenter, each of which requires independent management and configuration. Further, the single function server is a single point of failure in the system, and backup capabilities are not easily placed into service without additional specialized hardware or software, or downtime and effort on the part of an administrator.

Conventional application server farms usually provided with a server load balancer generally require that each server not maintain state, and state must be persisted in networked or shared storage (e.g., a database) such that independent server processes may share data. Such applications require that the application be modified to store data to suit the persisted architecture. There are other types of applications and operating systems that operate in a cluster environment that are used to provide resources, but these conventional grid or cluster-aware applications need to be modified or specially-developed to operate with multiple processors in a coherent manner. This special development often requires the application or operating system to be more complex as a result. Another common feature of server farms and grid-aware applications and operating systems is that each of these environments involves systems that execute (and therefore, require management of) separate instances of an operating system on each server or grid or cluster member.

According to one aspect of the invention, an architecture is provided that allows an administrator to more easily manage computing resources (e.g., in a data center). In one embodiment, a virtualization layer is provided that allows operating systems (OSs) and their applications to be executed on a virtual server that spans more than one physical node. Because, according to one embodiment, the virtualization layer isolates the OS and their applications from the underlying physical nodes, resources may be managed without changes at the application or operating system interface levels. This is beneficial, for example, as the application or operating system need not be modified to function on multiple nodes (or types of nodes) and therefore, the cost in developing a scalable application is decreased.

According to one aspect of the invention, a management capability is provided for managing a virtual computing platform. In one embodiment, the platform allows physical resources to be abstracted and mapped to virtual resources (e.g., virtual servers (VSs), virtual processors (VPs), virtual I/O devices, etc.). Virtual resources are arranged in a grouping referred to as a virtual partition. The virtual partition maps of one or more virtual servers to a grouping of hardware in the physical realm. In addition, virtual partitions may be arranged in a grouping referred to as a virtual mainframe. The virtual mainframe contains one or more virtual partitions. The system can have an-infinite number of virtual mainframes.

According to one embodiment, a collection of one or more virtual processors is arranged in a set. In one embodiment, a virtual server (VS) may be viewed as a simple representation of a complete computer system. A VS, for example, may be implemented as a series of application programming interfaces (APIs). An operating system is executed on a virtual server, and a distributed virtual machine monitor may manage the mapping of VPs onto a set of physical processors. A virtual server may include one or more VPs, and the number of VPs in a particular VS may be any number.

According to one embodiment, hardware nodes and their associated resources are grouped together into a set referred to herein as a frame. According to one embodiment, a virtual server (VS) is associated with a single frame, and more than one virtual server may be serviced by a frame. In the physical realm, nodes may be associated with a particular frame. In one example, a frame may define a partitioned set of hardware resources, each of which sets may form multiple virtual partitions, each of which may be associated with one or more virtual servers. In one embodiment, virtual processors are mapped to physical processors by the distributed virtual machine monitor (DVMM). In one embodiment, there may be a one-to-one correspondence between virtual processors and physical processors. Nodes within a frame may include one or more physical processors upon which virtual processor tasks may be scheduled.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

According to one aspect, a horizontal virtualization architecture is provided wherein applications are distributed across virtual servers. In one example system, an application is scaled horizontally across at least one virtual server, comprised of a set of virtual processors, each of which is mapped to one or more physical nodes. From the perspective of the application, the virtual server operates like a shared memory multi-processor, wherein the same portion of the application is located on one or more of the virtual processors, and the multiple portions operate in parallel.

In conventional grid-based computing systems, the application needs to be "parallelized" to use multiple nodes in parallel. That is, the application needs to be modified to allow multiple portions of the application to execute in parallel on different nodes. These nodes are formed into what is referred to as a "grid," where cooperative processing tasks of an application are distributed among nodes coupled by a network. In such a grid, a portion of an application or data set executes on multiple nodes, and the nodes communication with each other using messages or by communicating through a file system. By contrast, according to various embodiments of the invention, applications need not be modified to execute in parallel among multiple nodes.

According to one embodiment of the present invention, the horizontal virtualization architecture allows applications and operating systems to execute on virtual servers, where each of these virtual servers span a collection of physical servers (or nodes) transparent to the applications and operating systems. That is, the virtual server presents, to the operating system and application a single system where single instance of an operating system runs. Such a system according to one embodiment is contrasted by conventional clustered computing systems that support single system image as typically understood in the art, in that multiple instances of an operating system are clustered to create an illusion of a single system to the application programmers. Further, such a system according to one embodiment is unlike conventional grid computing systems as typically understood in the art, as no application modifications are required for the applications to execute on the virtualization architecture.

In another aspect of the present invention, a management architecture is provided that allows for management of the virtualization architecture. The following examples include example virtualization architectures and example management architectures and elements that may be used to manage virtualization architectures. It should be appreciated that various inventive aspects of the described management architectures are not limited to managing the virtualization architectures herein, but rather such inventive aspects may be used to manage any virtual computing architecture.

Example Virtualization System

Figure 1:
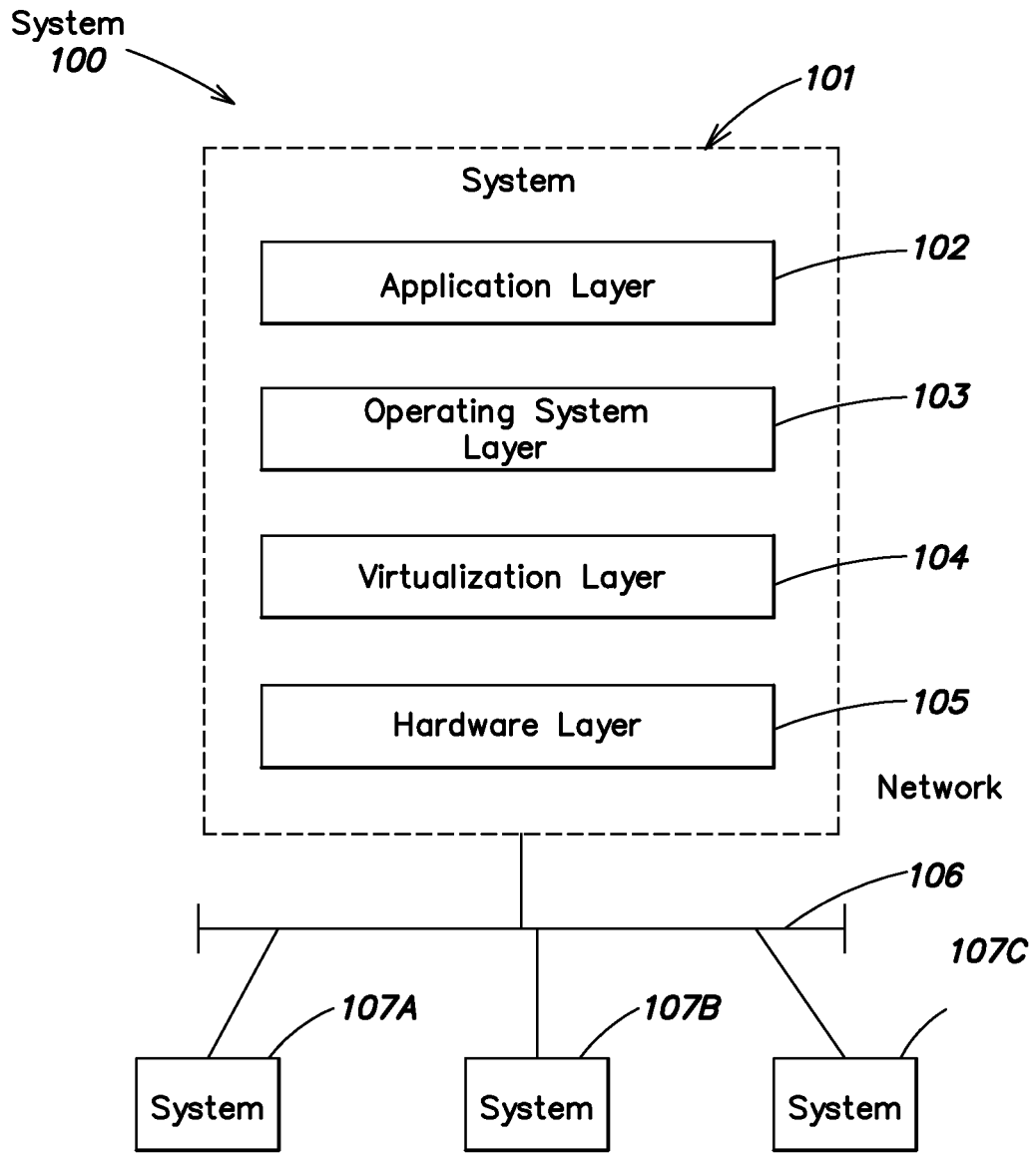
FIG. 1 is a block diagram of a virtual server architecture according to one embodiment of the present invention.

FIG. 1 shows one example system 101 that may be used to execute one or more data center applications. System 101 may include one or more system layers providing layers of abstraction between programming entities. As discussed above, a virtualization layer 104 is provided that isolates applications on a guest operating system (GOS) operating in layers 102 and 103, respectively, from an underlying hardware layer 105. Such applications may be, for example, any application program that may operate in a data center environment. For instance, a database server application, web-based application, e-mail server, file server, or other application that provides resources to other systems (e.g., systems 107A-107C) may be executed on system 101. Such applications may communicate directly with virtualization layer 104 (e.g., in the case of a database server application, wherein the application is part of the operating system) or may communicate indirectly through operating system layer 103. Virtualization layer 104 in turn maps functions performed by one or more virtual processors to functions performed by one or more physical entities in hardware layer 105. These entities may be, for instance, physical nodes having one or more processors.

In one aspect, virtualization layer 104 presents, to application layer 102 and operating system layer 103 a single system presented in the form of a virtual server. In one embodiment, a single instance of an OS is executed by the virtual server. In particular, a distributed virtual machine monitor creates a single system image, upon which a single instance of a virtual server is executed. The virtual server acts as a single system, executing a single instance of the OS. This architecture contrasts to conventional clustering systems where multiple OS entities executing on multiple systems cooperate to present a single system (e.g., to an application programmer that develops programs to be executed on a clustered OS). According to another embodiment of the present invention, this virtual server includes one or more constructs similar to a physical server (storage, memory, I/O, networking), but these constructs are virtual and are mapped by virtualization layer 104 to one or more hardware entities.

Physical entities may communicate with each other over an interconnect (not shown) for the purpose of sharing access to resources within hardware layer 105. For instance, a distributed memory architecture may be used to allow hardware devices (e.g., nodes to share other non-local memory. Other hardware entities (e.g., network, storage, I/O, etc.) may also be shared by nodes through an interconnect.

System 101 may be coupled to one or more external communication networks (e.g., network 106) for the purpose of sharing resources with one or more systems (e.g., systems 107A-107C). System 101 may function as part of an overall computing system 100 to perform one or-more tasks. For instance, system 100 may function as a client-server, n-tiers, or other type of architecture that executes one or more applications in a cooperative system. It should be appreciated that system 100 may include any number and type of computing systems, architecture, application, operating system or network, and the invention is not limited to any particular one(s).

Example Architecture

Figure 2:
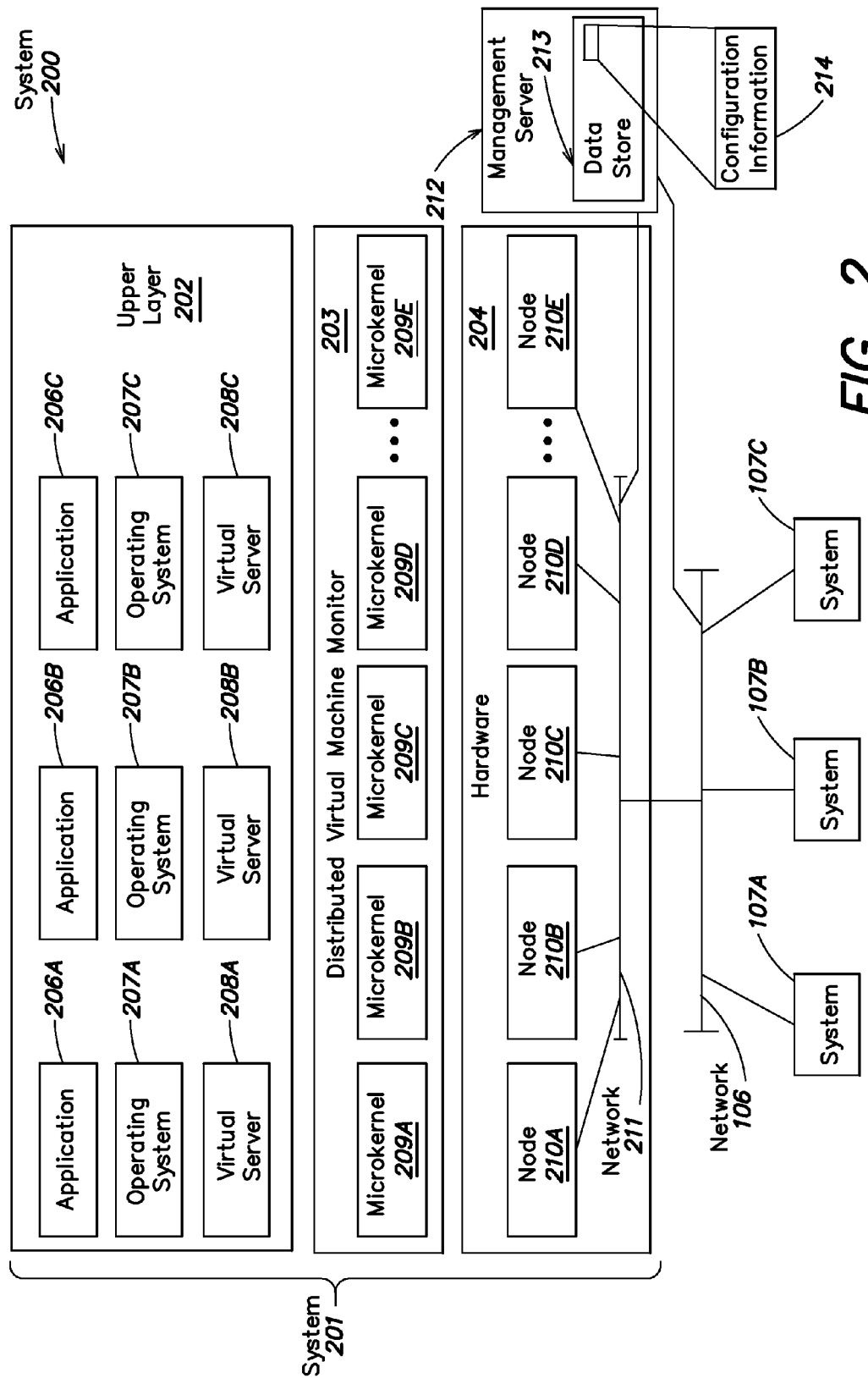
FIG. 2 is a block diagram of a system for providing virtual services according to one embodiment of the present invention.

FIG. 2 shows an example architecture of a system 201 according to one embodiment of the invention. System 201 includes an upper layer 202 including one or more operating systems 207A-207C executed by one or more virtual servers 208A-208C, respectively. According to one embodiment, virtual servers 208A-208C present, to their respective operating systems 207A-207C, single system regardless of the number of hardware nodes (e.g., nodes 210A-210D) included in a particular virtual server.

Operating systems 207A-207C may be, for example, commodity operating systems that may be ported to a Virtual Machine Architecture (VMA) presented by a distributed virtual machine monitor. A virtual server may be an instance of an architecture presented by a virtualization layer (e.g., layer 104). A virtual server may have a persistent identity and defined set of resource requirements (e.g., storage, memory, and network) resource access privileges, and/or resource limits.

Distributed virtual machine monitor (or DVMM) 203 provides an abstraction layer for mapping resources presented by each virtual server to other upper layer 202 programs to underlying hardware 204. In one embodiment, DVMM 203 includes one or more microkernel 209A-209E, each of which are pseudo-machines, each of which runs on a single node and manages the resources associated with that node. Each microkernel 209A-209E may include a virtual memory which it manages, this memory space spanning one or more portions of available physical memory associated with participating nodes.

Hardware layer 204 may include, for example, one or more nodes 210A-210E coupled by a network 211. These nodes may be, for example, general-purpose processing systems having one or more physical processors upon which tasks are performed.

According to one embodiment, an organizational concept of a frame may be defined, the frame identifying a set of nodes and other hardware entities that may be used to operate as an organizational unit. Elements within the frame may be capable of communicating between each other over a network 211. In one example, network 211 may include a low-latency high-bandwidth communication facility (e.g., InfiniBand, PCI-Express, GigiNet, Ethernet, Gigabit Ethernet, 10 Gigabit Ethernet, etc.). Network 211 may also include one or more elements (e.g., switching or routing elements) that create an interconnected frame.

In one embodiment, nodes (e.g., nodes 210A-210E) are restricted to participating in one and only one frame. A defined frame and its associated hardware may be associated with a virtual partition, and the entities of that frame may perform the physical operations associated with that virtual partition.

In one embodiment, a virtual partition is a collection of software and hardware components. For example, hardware components may include commodity servers coupled to form a cluster. Software associated with each virtual partition runs on this cluster and presents a multi-processor system architecture to the upper layers, defining a virtual server that is capable of hosting a guest operating system (GOS). Components of a virtual partition may include a distributed virtual machine monitor program, interconnects, processors, memory, I/O devices and software and protocols used to bind them. A guest operating system (GOS), such as, for example, UNIX (e.g., Linux, SUSE, etc.), Microsoft Windows Server, or other operating system executes upon the virtual server. In one embodiment, the guest operating system operates as if it was running on a non-cluster multi-processor system having coherent shared memory.

System 201 may also include a manager 212 that manages the configuration of system 201. Manager 212 may include an associated management database 213 that stores information relating to the configuration of system 201. Manager 212 may also communicate with a management agent (not shown) executed by one or more virtual servers microkernels of system 201 for the purpose of performing configuration changes, monitoring performance, and performing other administrative functions associated with system 201. A microkernel is an operating system based on small modules that implement basic features of an operating system kernel such as resource allocation and low-level hardware interfaces. The following section discusses an example management architecture for managing a virtual computing architecture, and various advantages of a scalable virtual computing system according to various embodiments of the present invention.

Management Architecture

According to one aspect of the present invention, a management capability is provided for a virtual computing platform. This platform allows scale-up and scale-down of virtual computing systems, and such a management capability provides for control of such scale-up and scale-down functions. For instance, a capability is provided to allocate and/or deallocate resources (e.g., processing, memory, networking, storage, etc.) to a virtual computing system. Such control may be provided, for example, to an administrator through an interface (e.g., via a CLI, or GUI) or to other programs (e.g., via a programmatic interface).

As discussed above, the virtualization architecture allows for an expansion (or a contraction) of resources used by an executing virtual computing system. Such expansion or contraction may be needed from time to time as customer and business needs change. Also, applications or the operating systems themselves may need additional (or less) resources as their requirements change. For instance, performance of an application, operating system, virtual server, virtual processor, etc. may decrease with increased loading, change in configuration or requirements, etc. Such a decrease in performance may require additional resources to be added to the virtual computing system.

To this end, a capability may be provided for changing the amount and allocation of resources, both actual and virtual, to the virtual computing system. More specifically, additional resources (e.g., nodes, network, storage, I/O, etc.) may be allocated (or deallocated) in real time to a frame and these resources may then be used (or not used) by a virtual partition. Similarly, virtualized resources (e.g., virtual processors, virtual I/O, virtual networking, etc.) as well as physical resources may be allocated or deallocated to a virtual server. In this manner, the virtual computing system may be scaled-up/scaled-down as necessary. The ability for allocating or deallocating resources may be provided using, for example, a manager and one or more management agents as described further below.

According to one aspect of the present invention, an interface is provided that allows for the addition or removal of resources during the execution of a virtual computing system. Because resource allocation may be changed without restarting the virtual computing system, a flexible tool is provided for administrators and programs for administering computing resources. For example, in the case where such a virtual computing system is provided in a datacenter, an administrator may be capable of provisioning resources in real time to support executing virtual servers. Conventionally, data center server resources are hard-provisioned, and typically require interruption of server operation for resources to be changed (e.g., change in memory, network, or storage devices).

According to one embodiment of the present invention, a virtual computing system is provided that allows a network administrator to provision computing resources in real-time ("on-the-fly") without a restart of a virtual computing system. For instance, the administrator may be presented an interface through which resources may be allocated to a virtual server (e.g., one that emulates a virtual multiprocessor computer). The interface may display a representation of an allocation of physical resources and mapping to virtual resources used by a virtual server. For example, the interface may provide an ability to map virtual servers to sets of physical resources, such as a virtual processor that is mapped to a physical processor. In one embodiment, a virtual server can span a collection of a physical nodes coupled by an interconnect. This capability allows, for example, an arbitrarily-sized virtual multiprocessor system (e.g., SMP, Numa, ASMP, etc.) to be created.

According to another embodiment, a capability is provided to allocate and/or deallocate resources (e.g., processing, memory, networking, storage, etc.) to a virtual computing system.

Such control may be provided, for example, to an administrator through an interface (e.g., via a CLI, or GUI) or to other programs (e.g., via a programmatic interface). According to another embodiment, an interface is provided that allows for the addition or removal of resources during the execution of a virtual computing system. Because resource allocation may be changed without restarting the virtual computing system, a flexible tool is provided for administrators and programs for administering computing resources. This tool permits an administrator to grow or shrink the capabilities of a virtual server system graphically or programmatically.

Such capabilities may be facilitated by a management agent and server program that collectively cooperates to control configuration of the virtual servers and virtual paritions. According to one embodiment, the management server writes information to a data store to indicate how each node should be configured into virtual servers and virtual partitions. Each management agent may then read the data store to determine its node's configuration. The configuration may be, for example, pushed to a particular management agent, pulled from the management server by the management agent, or a combination of both techniques. The management agent may pass this information to its microkernel instance within the distributed virtual machine monitor (DVMM) program which uses the information to determine the other nodes in its DVMM with whom it is tasked to cooperatively execute a set of virtual servers.

FIG. 2 shows an example system that may be used to provide management control of a virtual computing system 200. In one example management system, the management system includes a management server 212 (or manager) and one or more management agents (not shown). The management server 212 may include an interface through which an administrator may configure virtual servers (e.g., virtual servers 208A-208C) and their resources (e.g., nodes 210A-210D, storage, network, I/O or other resources).

Management server 212 may be, for example, a software program that executes on one or more physical (or virtual) computer systems. For instance, management server 212 may include a program executed on a general-purpose computer system such as, for example, a personal computer (PC), workstation, or other computer system capable of loading and executing computer programs. One or more programs associated with management server 212 may be loaded from a computer-readable medium such as, for example, a compact disk, loaded from a storage location (e.g., storage associated with a server) through the Internet, or by any other method. Such programs generally include computer instructions, that, when executed, allow the general-purpose computer to perform management functions according to one or more embodiments of the present invention. The computer instructions may be determined through programming in one or more computer languages, and it should be appreciated that any computer language may be used to render aspects of the present invention, and the invention is not limited to any particular language.

Management server 212 may be a distributed process (e.g., executed among a number of nodes) that is executed as part of or separate from the virtual computer system being controlled. It should be appreciated that management server 212 may be centralized, distributed, or any other architecture, and may be executed by any number of nodes.

Management server 212 may be adapted to communicate with one or more agents to obtain information from and perform administrative actions on the virtual server and its resources. An agent may be, for example, a software process, task, thread or a kernel level thread that performs configuration of the virtual server. Such configuration may occur, for instance, through a distributed virtual machine monitor program 203. An agent may, for example, form a part of the distributed machine monitor program, may be a user-space program executed by a virtual server, or may be executed at any level of the virtual computing system. The agent may also be programmed in any number of programming languages, and may reside as computer instructions stored on a computer-readable medium.

Management system 212 may include configuration information 214 that indicates a mapping of physical to virtual resources. This configuration information may be stored, for example, in a data store as discussed below. The data store may include, for example, one or more data structures stored in a memory, storage system or other entity. For example, the data store may include XML data structures that define resource allocations to particular virtual servers. However, it should be appreciated that the invention is not limited to any particular data storage method (e.g., flat file, relational database, object-oriented database, distributed or centralized database, etc.), but rather, the configuration information may be stored using any data structure format and configuration information may be stored in any number of storage locations. Management agents may be adapted to read configuration information (e.g., information 214) from the data store and pass this configuration to the distributed virtual machine monitor (e.g., DVMM 203) to determine how resources are allocated to virtual servers.

The management system may also include a data store that holds configuration information. In one example, this data store is controlled and managed by a management server (e.g., management server 212). The system may also include a management agent. Through this management agent, the distributed virtual machine monitor program may communicate with the management server using a management protocol. This communication includes configuration information, operations, logging, parameter setting, events, alarms, heartbeats and other methods of cooperation and communication. Configuration changes may be coordinated and/or tracked to allow for orderly changes to the virtual computing system to occur. This may be performed using discrete transactions, for example.

In one embodiment, discrete transactions may be stored to provide a transaction history for the virtual computing system. In particular, a record may be maintained of discrete transactions as they are performed on the virtual computing system and its components. Because a history of the discrete transactions is stored, a capability for rolling back changes on the virtual computing system may be provided. Such a transaction history is also useful for assisting an administrator in tracking changes and support of the virtual computing system.

Management actions may be grouped into a set and executed as single transaction, referred to herein as a "job." For instance, a particular job may include multiple management actions that are performed as part of an overall management function. For example, a virtual server may need to be stopped prior to adding resources (e.g., memory) and then restarted. Therefore, a command for stopping the virtual server may need to be executed, followed by a command which adds the particular resource, and then a start command needs to be executed. As discussed, a transaction history may be maintained (e.g., by the management server or other entity) that permits transactions to be rolled back in certain situations. For example, if, after a job is executed, an error occurs, the job may be rolled back prior to the point when the error occurred. Such a rollback may be initiated, for example, by an administrator using an interface program, by a management system, or by any other program or system.

Management Server

According to one embodiment of the present invention, a management server is provided that performs command and control functions that monitor and control a virtual server system. Some features of a management server according to various embodiments of the present invention include, but are not limited to:

The ability to control administration of the plurality of physical nodes to create virtual servers and virtual processors as needed.

Automatic discovery of nodes and automatic installation of a distributed virtual machine monitor may be performed so that the nodes can be used by virtual servers. For instance, the management server may be configured to discover nodes connected to an interconnect. Once a node is discovered, the management server may direct the discovered node to boot a microkernel part of a distributed virtual machine monitor program (DVMM), thereby "turning on" a management agent program associated with the node and enabling configuration of the node, as discussed further below.

The ability to perform software-based provisioning of physical and virtual resources. For instance, a system according to one embodiment of the invention may allow applications running on the system to request resources and allow physical resources to be appropriately mapped to virtual servers, as needed.

The ability to manage the mapping of operating systems to virtual servers.

The ability to manage the mapping of storage resources, such as one or more disks and one or more World Wide Node Name (WWNN) identifiers to one or more virtual servers (VSs).

Capacity planning. The system may also allow an administrator or a program to store and analyze historical performance of virtual servers, estimate future needs, and perform other planning functions.

Policy-based administration of virtual servers and virtual partitions.

System alerting (e.g., events, performance alerting etc.)

Provision of local and/or remote user interface consoles.

Performance analysis (e.g., to analyze short and long term performance of virtual and physical resources)

The ability to manage user access to virtual and physical resources.

Resource accounting (e.g., billing, determining charges for virtual resources used, etc.)

According to one embodiment of the present invention, management server 212 may execute on a physical server that is not running the virtual server software so that if the virtual server fails, the management server may be available to facilitate fixing problems with the virtual server. However, it is to be appreciated that management server 212 may execute on a virtual server or any other system, virtual or actual. Further, management server 212 may be implemented in hardware, firmware, software, or any combination thereof. Also, it is to be appreciated that management server 212 may be a single entity or a distributed set of cooperating functions.

Although, according to another embodiment, management server 212 may be an integral component of the virtual server system, management server 212 need not always be running for the virtual server system to be operational. In one example, each microkernel of a distributed virtual machine monitor program of a virtual server system and its associated management agent may be provided with an initial default configuration such that the distributed virtual machine monitor program may operate using this default configuration when management server 212 is not available. In another example, the distributed virtual machine monitor program may be designed to initially use the default configuration until a user of management server 212 assigns a different configuration to the distributed virtual machine monitor.

It is to be appreciated that one or more management servers may be used with any given virtual server network system. In one example, the number of management servers provided may depend on the management servers' network connectivity with the virtual server nodes in the system. In some examples, one management server may be used to manage a large number (e.g., hundreds or thousands) of virtual server nodes. According to one embodiment, nodes are accessible to the management server over a communication network (e.g., one or more LANs, VLANs (Virtual LAN) or extended LANs, InfiniBand, GigaNet, etc), and such a management server is adapted to communicate with such nodes using one or more management protocols.

Communications between the management server and the virtual server nodes may be accomplished via datagrams that typically are constrained to an extended LAN (i.e., they are not transmitted past routing boundaries). In another embodiment, the communication between the management server and the virtual server nodes may be accomplished via TCP/IP, UDP/IP, or other any other protocols. Network connectivity may be provided through a type of physical layer network (e.g., by direct or switched Ethernet connection) or may be provided, for example, via tunneled IP as in IPoIB (IP over InfiniBand) or any other connectivity mechanism. Management server 212 may be coupled to the virtual computing system 200 via one or more external networks, may be coupled to an internal network 211 of the virtual computing system, or may form an integral part of the virtual computing system (e.g., as part of virtual computing system 201).

The management server and its agent may communicate using one or more network level communication protocols. For instance, TCP/IP or UDP/IP may be used. However, it should be appreciated that other physical or and/or network-layer protocols may be used, and that the invention is not limited to any particular protocol or set of protocols. It should be appreciated that communications interfaces and protocols may also be virtualized and provided to one or more virtual servers as resources.

According to another embodiment, the management server may be configured to manage one or more guest operating systems on the virtual computing system. A guest operating system (GOS) is any operating system, such as, for example, Windows or Linux, that may be running on one or more virtual servers of the system. The management server may comprise a set of management utilities that will allow the user to create a copy of an installed GOS, save the GOS to a repository and deploy the GOS to a new virtual server. The management server may also allow manipulating one or more GOSs at a time, for example to change an IP address associated with a network device used by the GOS or to install an application that is executed on the GOS. In this manner, the management server provides a method of configuring and running a variety of guest OSs and applications on the virtual servers without requiring any modifications to the guest OSs or applications.

As mentioned above, management server 212 may control configuration of the virtual servers and virtual partitions. According to one embodiment, management server 212 writes information to the data store to indicate how each node should be configured into virtual server and virtual partitions. Each management agent may then read the data store to determine its node's configuration. In another example, a single management agent may read the data store to determine the node's configuration and then distribute the information to other nodes in the virtual partition. The configuration may be, for example, pushed to a particular management agent, pulled from management server 212 by the management agent, or a combination of both techniques. In another embodiment, management agent may pass this configuration information to a corresponding microkernel instance of the distributed virtual machine monitor program (e.g., DVMM 203) and the microkernel will use the information to determine the other nodes in its virtual partition with whom it is tasked to cooperatively execute a set of virtual servers.

In one example, management server 212 may use an object model to manage components of the virtual computing system. Manageable objects and object collections may be defined along with their associations to other manageable objects by the management server 212. These objects may be stored in a data structure (e.g., data store 213) and shared with other management servers, agents, or other software entities.

Management Agent

According to one embodiment of the present invention, a management agent at each node interacts with its microkernel instance of the distributed virtual machine monitor program and with outside entities, such as, for example, a management server 212 and a data store 213. In one example, management server 212 provides command and control information for one or more virtual server systems. According to one embodiment of the invention, a management agent acts as a distributed virtual machine monitor program tool to communicate with management server 212, and the management agent implements actions requested by the management server 212.

As discussed, the data store may store configuration information used to configure the operation of each microkernel instance. In one embodiment, the data store stores and provides configuration information to the management agent upon demand. The data store may reside on the same or different node as management server 212, or may be distributed among multiple nodes.

The management agent may exist within a constrained execution environment, such that the management agent is isolated from both other virtual server processes as well as the distributed virtual machine monitor program. That is, the management agent may not be in the same processor protection level as the rest of the distributed virtual machine monitor program. Alternatively, the management agent may operate at the same level as the distributed virtual machine monitor program or may form an integral part of the distributed virtual machine monitor program. In one embodiment, the management agent may be responsible for a number of tasks, including configuration management of the system, virtual server management, logging, parameter management, and event and alarm propagation.

In one example, the management agent is a distributed virtual machine monitor user process. According to one embodiment, the DVMM microkernel's management agent may be executed as a user process (e.g., an application on the virtual server), and therefore may be scheduled to be executed on one or more physical processors similar to an application. Alternatively, the management agent may be executed as an overhead process at a different priority than an application. However, it should be appreciated that the management agent may be executed at any level of a virtual computing system hierarchy and at any protection or priority level.

In one specific embodiment, all network interactions between the management agent and the management server may be performed via a TCP/IP connection or by any other protocol (e.g., UDP/IP). Under circumstances in which TCP is unavailable, connectionless UDP may be used. Allowing for alternative network communication protocols provides for the ability to secure control and data interactions via SSL or other mechanisms. Where there is no need for either authorization or encryption of either data or control information, commands, responses and data may be transferred between nodes and the management server in cleartext. In another example, the management server may be designed to support both authentication and encryption of data, responses, and/or commands. In one embodiment, TCP connections may be initiated and preserved by the management server. Thus, the management agent may be designed to use as little time and resource as possible to have minimal impact on performance of the virtual servers.

In one embodiment, the management agent may generally receive directives from management server 212 and any information needed by the management agent may be requested from management server 212 or data store 213. For example, if management server 212 directs the management agent to change a configuration, a command may be sent to the management agent, and the command need not be a verbose command having all data necessary to perform the configuration change. Rather, the management agent may instead request detailed configuration information from the data store in response to receiving a brief command. In one example, the management agent may rely solely upon system calls to accomplish distributed virtual machine monitor mode tasks.

According to one embodiment, interactions between the management agent and the management server may be categorized as either command or status interactions. According to one embodiment, commands originate with the management server and are sent to the management agent, management agent responds to these commands with a result and/or status, and events are generated within the management agent and are sent to the management server. Commands include, but are not limited to, virtual partition operations, instructions to add or remove a node, processor, memory and/or I/O device, instructions to define or delete one or more virtual servers, a node configuration request, virtual server operations, status and logging instructions, heartbeat messages, alert messages, and other miscellaneous operations.

Although in one embodiment the data store may be considered to be a separate service from management server 212, data store 213 may be located on the same systems with, and have the same failure characteristics as, management server 212. Interactions between data store 213 and the management agent may be performed, for example, via a standard TFTP service, which are connectionless UDP/IP based network operations. However, it should be appreciated that other information transfer protocols may be used, and that the invention is not limited to any particular transfer protocol. Such network file transfer operations typically are used to retrieve configuration data on boot and during configuration changes, and may, according to various embodiments, include data retrieval, configuration information, and guest operating system booting in a virtual processing system.

As discussed above, a management agent may require the active involvement and cooperation of the distributed virtual machine monitor program to perform any of its actions. In some actions, such as setting the local time, these actions may be accomplished with generic distributed virtual machine monitor calls. In other cases, actions, such as booting of a guest OS, may require specialized API interfaces specific to the management agent operations.

Interactions between the distributed virtual machine monitor and the management agent may be bidirectional. In some cases, the management agent may request operations, while in other cases the management agent may be notified of events from the distributed virtual machine monitor. In addition, according to one embodiment, there are a class of variables referred to herein as kernel environment variables that may be used to pass configuration information into the management agent and which the management agent may use to configure system components.

According to one embodiment, each microkernel instance of the distributed virtual machine monitor program is a standalone entity for most of its operation. The scope of actions that it may take may affect only the node on which it is running and any associated resources. The system, however, may comprise a set of cooperating distributed virtual machine monitors that provide the basis for a single virtual server. This means that while each local instance of distributed virtual machine monitor program (e.g., microkernel) may only act locally, the local instance of the distributed virtual machine monitor exchanges control and data information with other local instances of the distributed virtual machine monitor programs in the same DVMM. This exchange leads to a single distributed virtual machine monitor view in which each local instance of the distributed virtual machine monitor plays a part.

In one embodiment, each node and virtual server may be uniquely identified by their own independent IDs. These IDs allow the microkernel programs to identify actions to be taken on their node, as well as which virtual server requires action. Many commands may be node-specific, that is, they may be sent as necessary to individual nodes and the scope of the command and response is a single node. Alternatively, a command, for example, the "configure" command, may be sent to a single node within the server.

In one example, a "configure" command is used to specify a new configuration. More particularly, the command may be sent to only one node within a distributed virtual machines monitor and the nodes of the DVMM propagate the change as necessary. That is, by notifying one node of the distributed virtual machine monitor of a change, all nodes are notified of the change.

In one example, the management server may begin by notifying any node of the configuration change. This node may obtain the new configuration from the management server via various protocols (e.g., via the TFTP protocol, DHCP, etc.) and parses the received configuration. It should be appreciated that the configuration change information may be transferred using any method or protocol, and the invention is not limited to any particular protocol(s) or method(s) for transferring configuration information. Distributed virtual machine monitor components of this configuration are then passed into the microkernel program for action. The microkernel may, or may not, need to make distributed virtual machine monitor changes based upon this new configuration. Further, the microkernel program may obtain agreement across all nodes within the cluster on the configuration. At that point, the management agent may be signaled by the microkernel program to take whatever actions are necessary and each local management agent on each node may be notified of a change in configuration.

Management Interfaces

In one example, the management system and management interface may include the ability to map virtual servers to sets of physical resources (e.g., mapping virtual processors to physical processors) and to create and manage arbitrarily-sized virtual multiprocessors (e.g., SMP, Numa, ASMP, COMA, etc.) through the interface. The management system may maintain and present to the user a topology map as a visualization of virtual to physical mappings and vice versa across the datacenter. The management system may also maintain other mapping information that may be used by an administrator, program, or other entity that can be used to determine a configuration of the virtual computing system. The interface can have either or both a graphical user interface and a programmatic interface for manipulating the underlying objects, meaning that the size of virtual servers can be altered graphically and/or programmatically.

In another example, the interface may allow the ability to add or remove processing, memory, networking, and/or storage resources to/from a running virtual system. More specifically, the interface may provide online or live scale up/scale down of virtual computing systems (e.g., virtual servers). In further examples, the user interface may provide an operator with the ability to move both virtual and physical resources around via drag and drop interface and/or pull-down interface.

In one aspect, the management interface comprises a user interface. Such a user interface may be graphical, as in a graphical user interface (GUI) represented within a screen or window of a general-purpose computer system. Alternatively, the management interface may also include a text-based or command line interface. It should be appreciated that the interface may include a user and/or programmatic interface, and the invention is not limited to any particular interface type.

Figure 11:
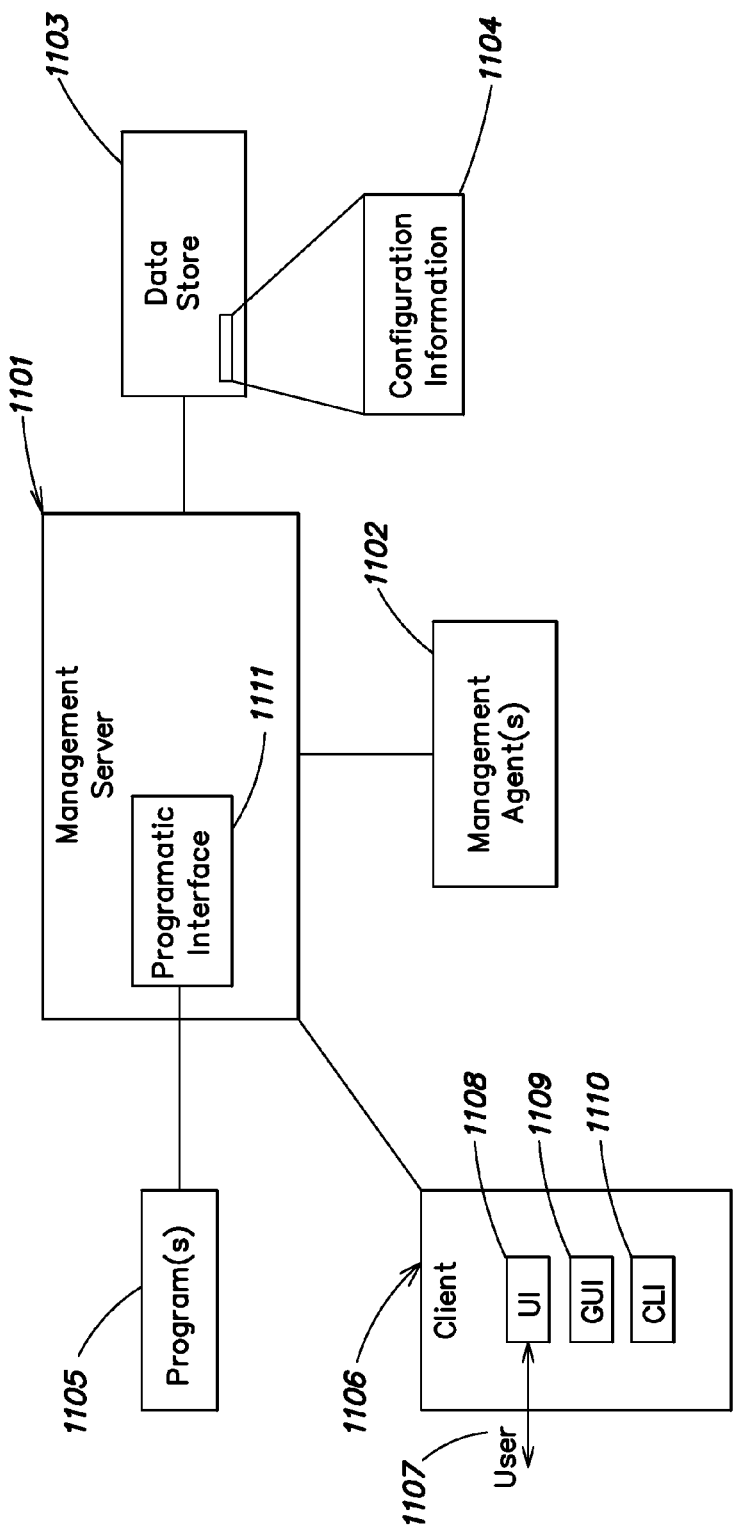
FIG. 11 shows several management system interfaces according to various embodiments of the present invention.

As discussed above, the management server may provide one or more interfaces for configuring virtual servers and their resources. FIG. 11 shows example interfaces to a management system according to one embodiment of the invention. For example, various interfaces may be used to interface with a management server 1101 to control and configure a virtual computing system. The management server 1101 includes a data store 1103 upon which configuration information 1104 may be stored, similar to the management server and data store discussed above with respect to FIG. 2. Management server 1101 communicates with one or more management agents 1102 which communicate with or form part of the virtual computing system being controlled.

As discussed, management server 1101 may have one or more interfaces through which users 1107 or programs 1105 may control and configure a virtual computing system. For instance, a client computer may be capable of being coupled to management server 1101, to act as a management console to the virtual computing system.

According to one embodiment, the management console may comprise a user interface (e.g., user interface 1 108, graphical user interface 1109). In another embodiment, a command line interface (CLI 1110) may be provided in addition to, or instead of, a graphical or other type of user interface. In addition to the management console, a programmatic interface 111 (e.g., an API) may be provided to allow OSs, applications, and other programs 1105 to monitor and control virtual servers. This API may be provided locally (to the management server node) or remotely via Web Services or any other remote method invocation techniques (for example RPC, RMI, DCOM, etc).

An administrator or other program may, using one or more interfaces (e.g., GUI, CLI, programmatic, etc.) to allocate or deallocate resources to virtual servers or virtual partitions. More particularly, the interface may allow an administrator or program to associate a hardware resource (e.g., an I/O device, network interface, node having one or more physical processors, etc.) to a virtual partition of a frame. As discussed further below with reference to FIG. 3, a frame (e.g., frame 302A, 302B) may define a partitioned set of hardware resources, each of which sets may form multiple virtual partitions, each of which sets may be associated with one or more virtual servers. Alternatively, a hardware resource may be allocated directly to a virtual server.

A hardware device may be unassigned to a particular virtual partition within a frame in which the hardware device is coupled, for example, during initial creation of the virtual partition (e.g., with unassigned resources), by adding new hardware to the frame, or by virtue of having previously unassigning the hardware resource to a virtual partition or virtual server. Such unassigned resources may be, for example, grouped into a "pool" of unassigned resources and presented to an administrator or program as being available for assignment. This "pool" may also include virtual and/or physical resources.

Further, there may be a "pool" of identifiers associated with virtual I/O entities such as, for example, virtual network interfaces or virtual storage adapters. These virtual identifiers may include, for example, network addresses such as MAC addresses or storage adapter identifiers such as World Wide Node Name (WWNN) identifiers. As discussed, the management server may maintain a pool of these identifiers, and assign one or more identifiers as virtual servers and other resources are created.

In another embodiment, addresses may be administered using licenses. For instance, a license may be associated with one or more addresses, and when the license is entered into the management server, the one or more addresses may be available for assignment to virtual I/O resources. In this manner, a producer of software enabling the virtual computing system may produce revenue based on the size of the virtual computing system that is supported. It should be appreciated, however, that licensing may be performed using other criteria, and that the invention is not limited to any particular licensing criteria.

Once assigned, the virtual computing system may maintain a representation of the assignment (or association) in a data structure (e.g., in the data store described above) that relates the hardware resource to a particular virtual partition or virtual server.

Once an actual resource (e.g., hardware) is assigned, virtual resources associated with the hardware resource may be defined and allocated to virtual servers. For instance, one or more VNICs (virtual network interface cards) may be defined that can be backed by one or more actual network interface devices. Also, a new node may be assigned to a virtual partition upon which a virtual server is executed, and any CPUs of the newly-assigned nodes may be assigned as additional virtual processors (VPs) to the virtual server.

According to various embodiments, an interface may portray a common view of virtual and physical resources, where the physical resources can be distributed across a network. The user interface may express a virtualization layer that encompasses all mathematical resource "sets" and their mappings. According to yet another embodiment, a single user interface may represent one or more virtualized data centers with the ability to map sets of sets, and multiple sets at each level.

According to one embodiment, the management server may include a management console that provides an interface for the management server. In one example, the management console may be implemented as a locally-run application on a computer system running a management server program. The application renders, in an interface of the computer system, a user interface that allows an administrator to manage virtual servers.

In another example, the management console may be provided as a web-based application that provides a remote user interface for one or more virtual computing systems that each support one or more virtual servers. This web-based application may be run, for example, through a web browser, such as Internet Explorer, Netscape or the like. In one example of a web-based user interface, web pages and programs (e.g., applets) that, when executed, render various aspects of the management console may be transmitted to and executed by a client browser program.

To provide transport-level security, web page and applet information may be transmitted using SSL or other secure method. To provide additional security, a webserver of the management server may be located behind a network firewall to prevent insecure access to the management server. Management applications may be protected, for example, with security features such as an account name and password and types and levels of permissions. Such a tiered security model may be beneficial, as multiple levels of security must be accessed to make a configuration change or operational state change in virtual servers.

According to one embodiment, configuration information for the system may be presented as a single virtual partition view on the management console. This view may comprise information specific to the virtual partition and information defining each of the nodes and virtual servers within the virtual partition. Some example user interface views are shown in FIGS. 12-20 and discussed further below.

In another embodiment, the management server may provide a virtual server console that may include, for example, software that accepts terminal output from a virtual server console and displays it in a window (or other interface) so that a virtual server can be used and managed. That is, the virtual server may generate screen output, and this output may be redirected to another computer for viewing by an administrator. Similarly, mouse and/or keyboard input may be transmitted to the virtual server console and provided as input to the virtual server console. In one example, the virtual server console may be launched from the management console by selecting a virtual server in the graphical user interface and choosing to launch a virtual server console for the virtual server.

Figure 12:
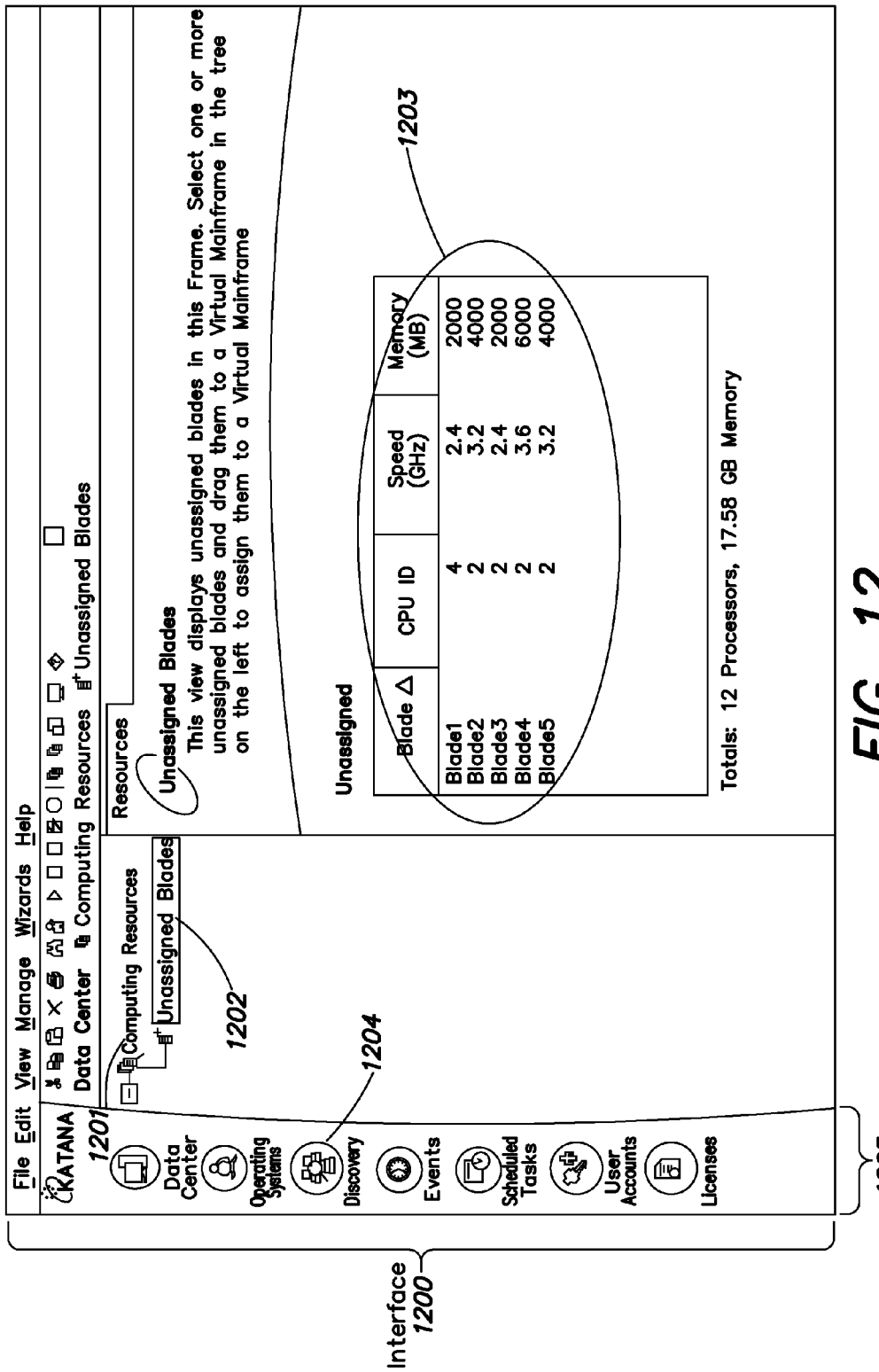
FIG. 12 shows a management interface according to one embodiment of the present invention.

FIG. 12 shows one example of management interface 1200 according to one embodiment of the invention. As discussed, an administrator may be presented, through an interface of a computer system, an interface through which the administrator may configure and control a virtual computing system. Interface 1200 includes one or more views that display different information about the virtual computing system. Interface 1200 may include a number of controls 1205 that allow the administrator to configure one or more aspects of the virtual computing system. For instance, a discovery control 1204, when selected, may present to the administrator information and further controls for managing a discovery process. For example, the management system may be capable of discovering virtual and/or hardware resources that are configured in a virtual computing system.

In the case shown in FIG. 12, the virtual computing system includes a number of computing resources 1201. These computing resources may include, for example, resources which have not yet been assigned to the virtual computing system. As shown, unassigned nodes 1202 represent nodes that may be discovered and used by the virtual computing system. For example, such nodes may include one or more processors, memory, or other resources that may be contributed to the virtual computing system. Nodes may include, for instance, one or more standalone or rack-mounted computer systems (e.g., including nodes provided on "blades" installed in a rack-mounted enclosure) capable of providing resources to the virtual computing system. In the example shown in FIG. 12, unassigned nodes 1203 include a number of nodes, some of which have different numbers of processors, processors speeds, or memory capabilities. These unassigned resources may, once discovered, be added to a virtual computing system.

Figure 13:
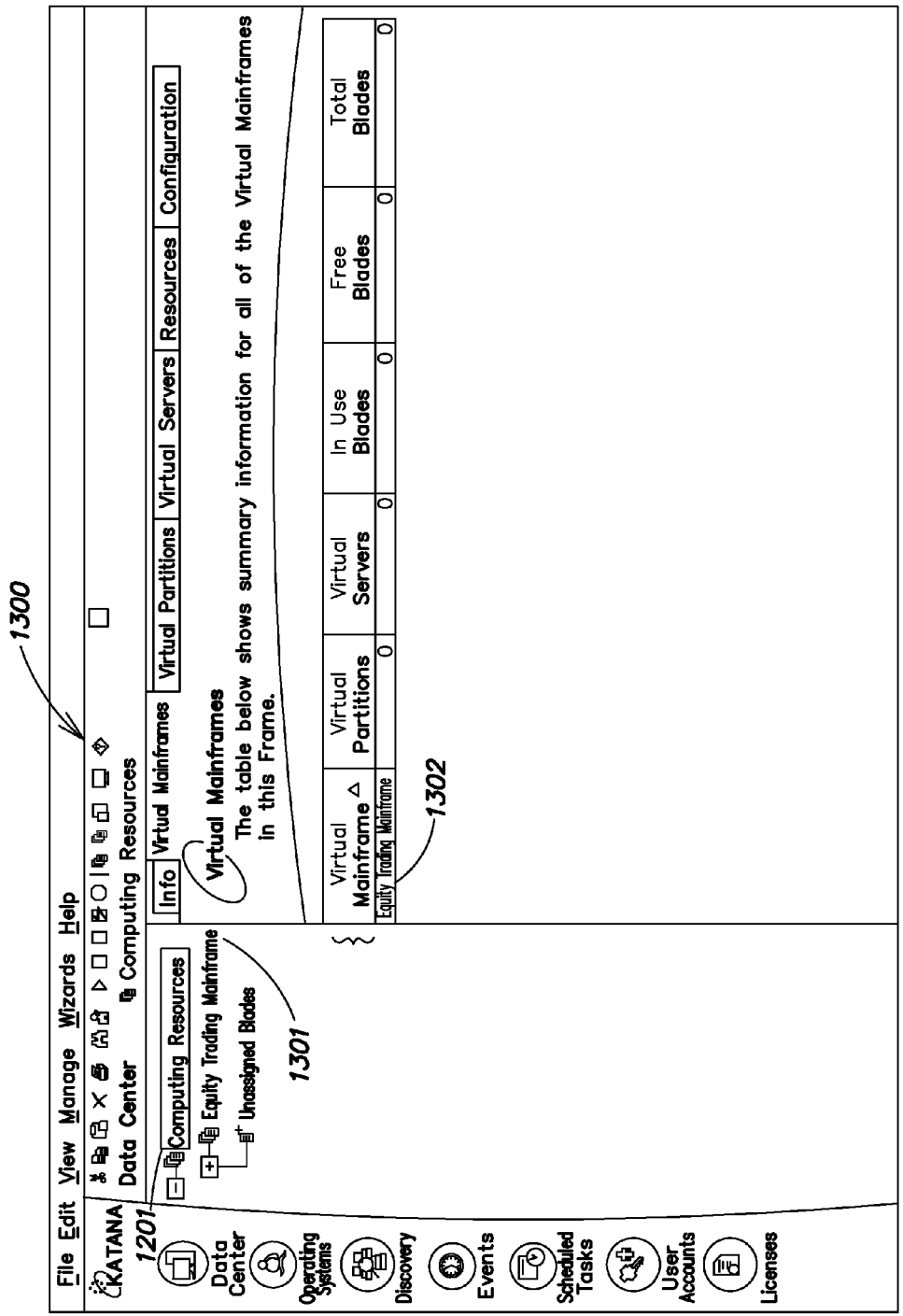
FIG. 13 shows a management interface according to another embodiment of the present invention.

FIG. 13 shows another interface according to one embodiment of the invention. In particular, an administrator may define within the interface, one or more virtual computing entries to which actual hardware may be associated. For instance, within computing resources 1201, an "Equity Training Mainframe" 1301 may be created. Item 1301 may be an organizational construct to which actual resources may be assigned. Interface 1300 may list each virtual computing system (e.g., a virtual mainframe) defined within the virtual computing system. Because no actual resources have been associated with entry 1302, the virtual mainframe represented by the entry may not include any resources.

Figure 14:
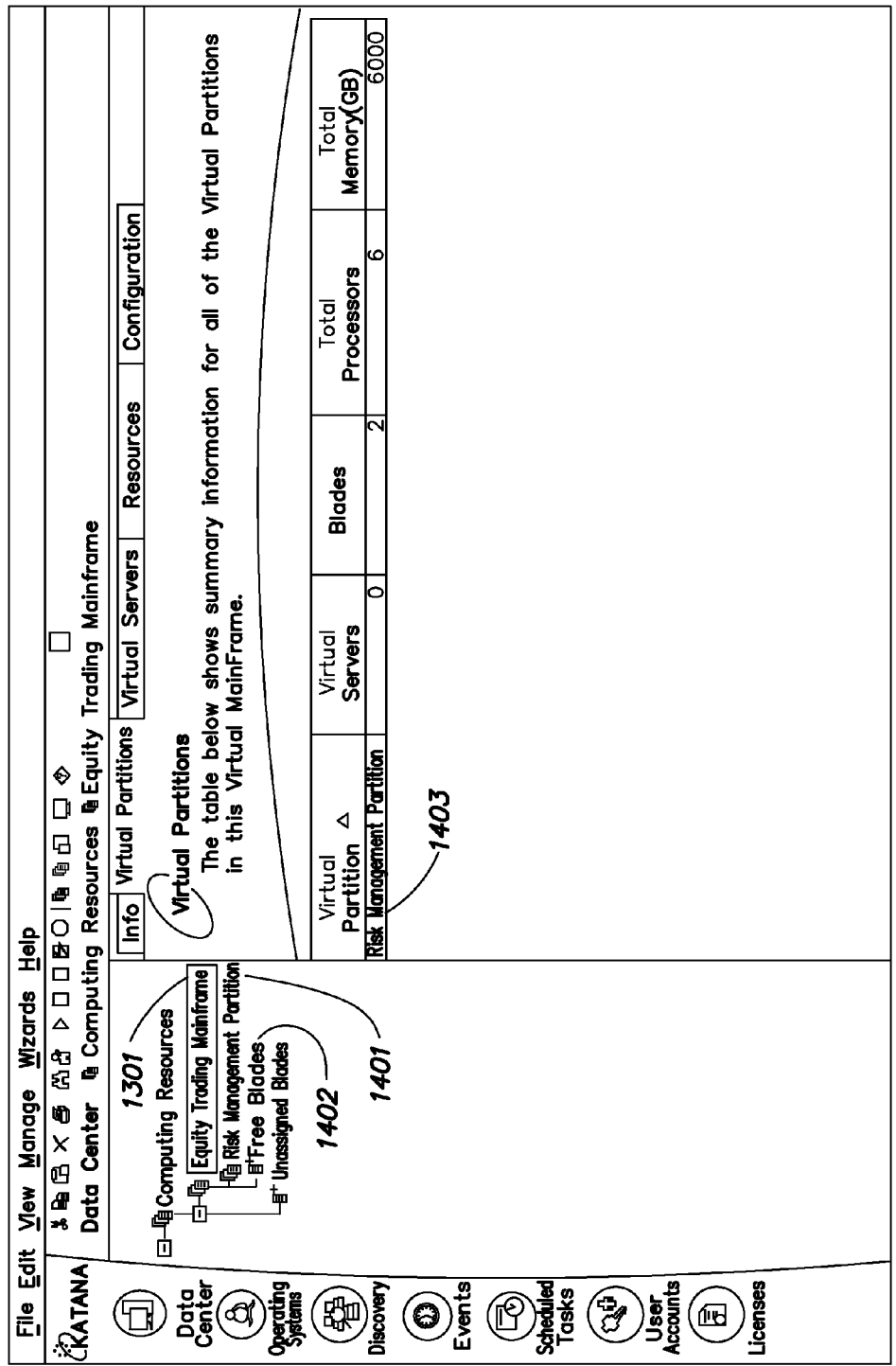
FIG. 14 shows a management interface according to another embodiment of the present invention.

FIG. 14 shows another interface according to one embodiment of the invention. Within "Equity Training Mainframe" 1301, a virtual partition may be created. Such a virtual partition may define isolation between virtual computing systems. For example, a "Risk Management" virtual partition 1401 may be created which includes resources dedicated to that partition. In one embodiment, resources are not permitted to be accessed across virtual partition boundaries. Further, within the virtual partition may be assigned particular nodes or other resources that may be associated with a virtual server. For example, free nodes 1402 (e.g., "Free Blades") may be assigned to the "Risk Management" virtual partition 1401. Such an assignment may be represented as an entry 1403, indicating the number of nodes, processors, and memory assigned to the virtual partition.

Figure 15:
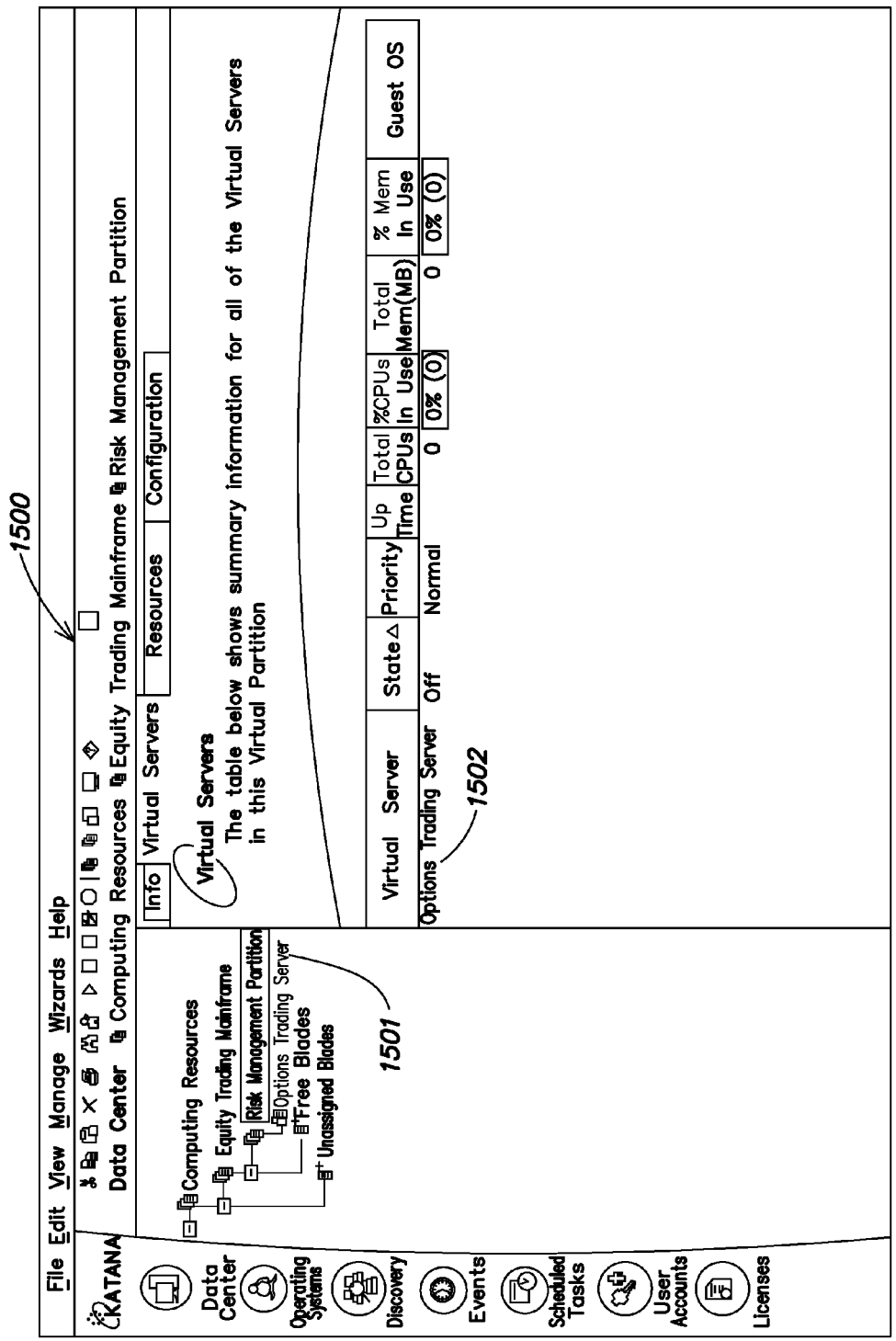
FIG. 15 shows a management interface according to another embodiment of the present invention.

FIG. 15 shows another interface according to one embodiment of the invention. As discussed above, within a virtual partition may be defined as one or more virtual servers. A listing of the virtual servers for a particular virtual partition may be shown in an interface 1500. For example, in the example shown in FIG. 15, the risk management virtual partition includes a virtual server "Options Trading Server" 1501. A corresponding entry 1502 may be displayed indicating information relating to that virtual server. Such information may include, for example, an operating state, performance, or configuration of the particular virtual server. In the example shown in FIG. 15, no hardware resources have been assigned to the Options Trading Server 1501 and therefore the virtual server 1051 is an empty organizational entity without any hardware associations.

Figure 16:
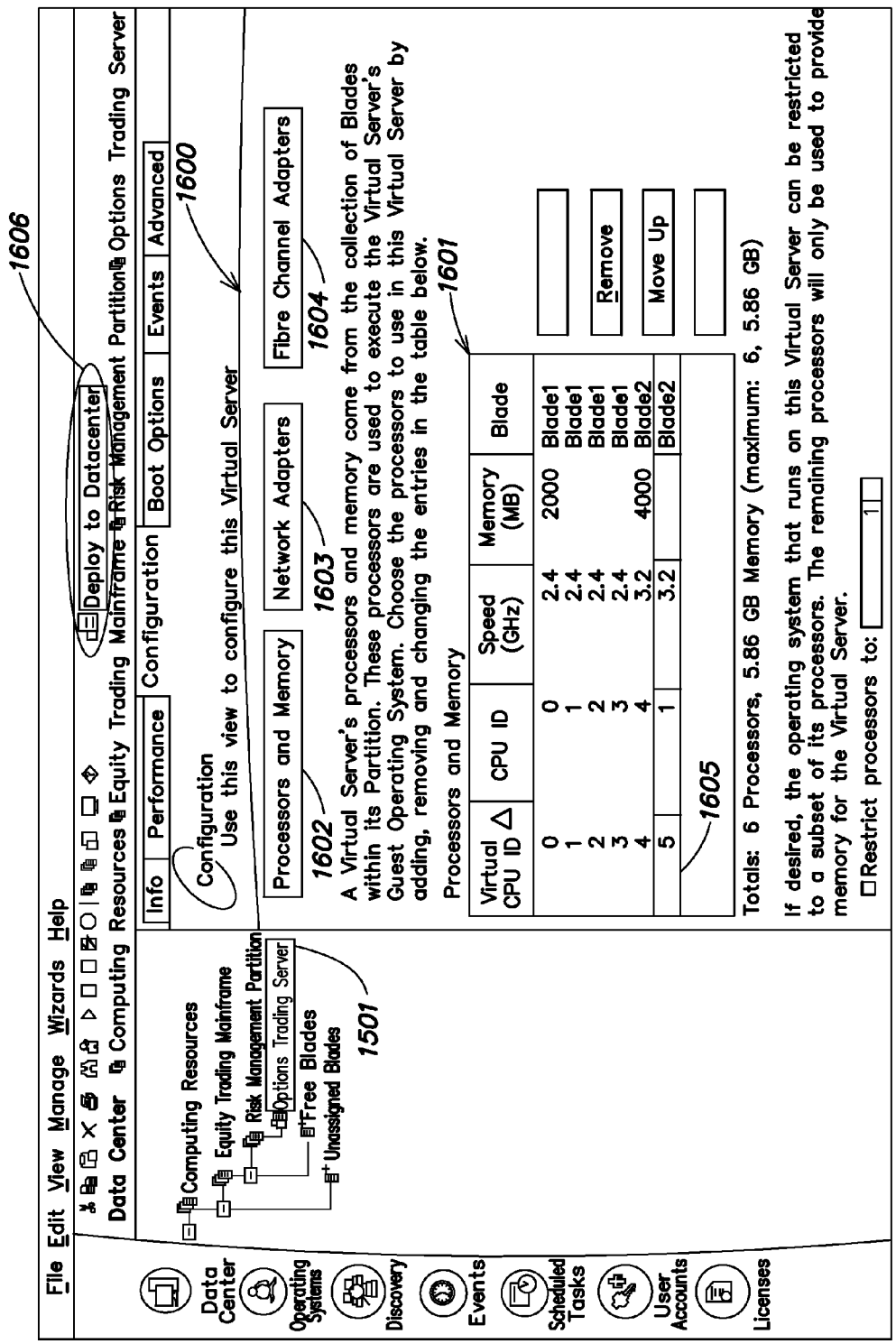
FIG. 16 shows a management interface according to another embodiment of the present invention.

FIG. 16 shows a configuration interface 1600 that allows hardware resources such as processors and memory 1602, network adapters 1603 and fiber channel storage adapters 1604 to be assigned to a virtual computing system. Further, one or more nodes (represented by blades 1601 and FIG. 16) may also be assigned to a virtual computing system. For example, in interface 1600, nodes or other resources may be selected and deployed to one or more virtual servers. For instance, node (e.g., a blade) entry 1605 may be associated with Options Trading Server 1501 by selection of a control 1606. In this manner, an administrator can add resources to a virtual server.

Figure 17:
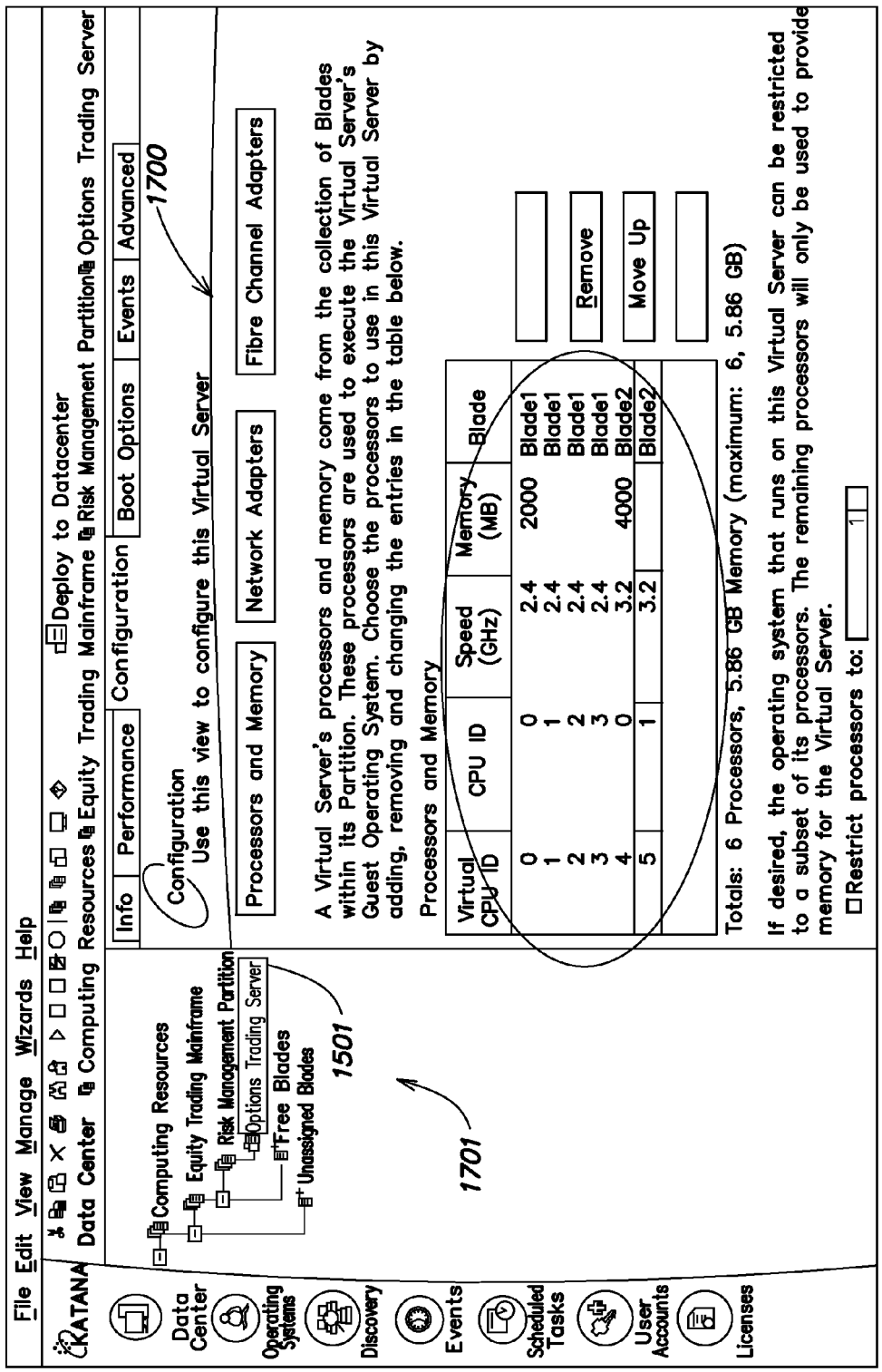
FIG. 17 shows a management interface according to another embodiment of the present invention.
Figure 18:
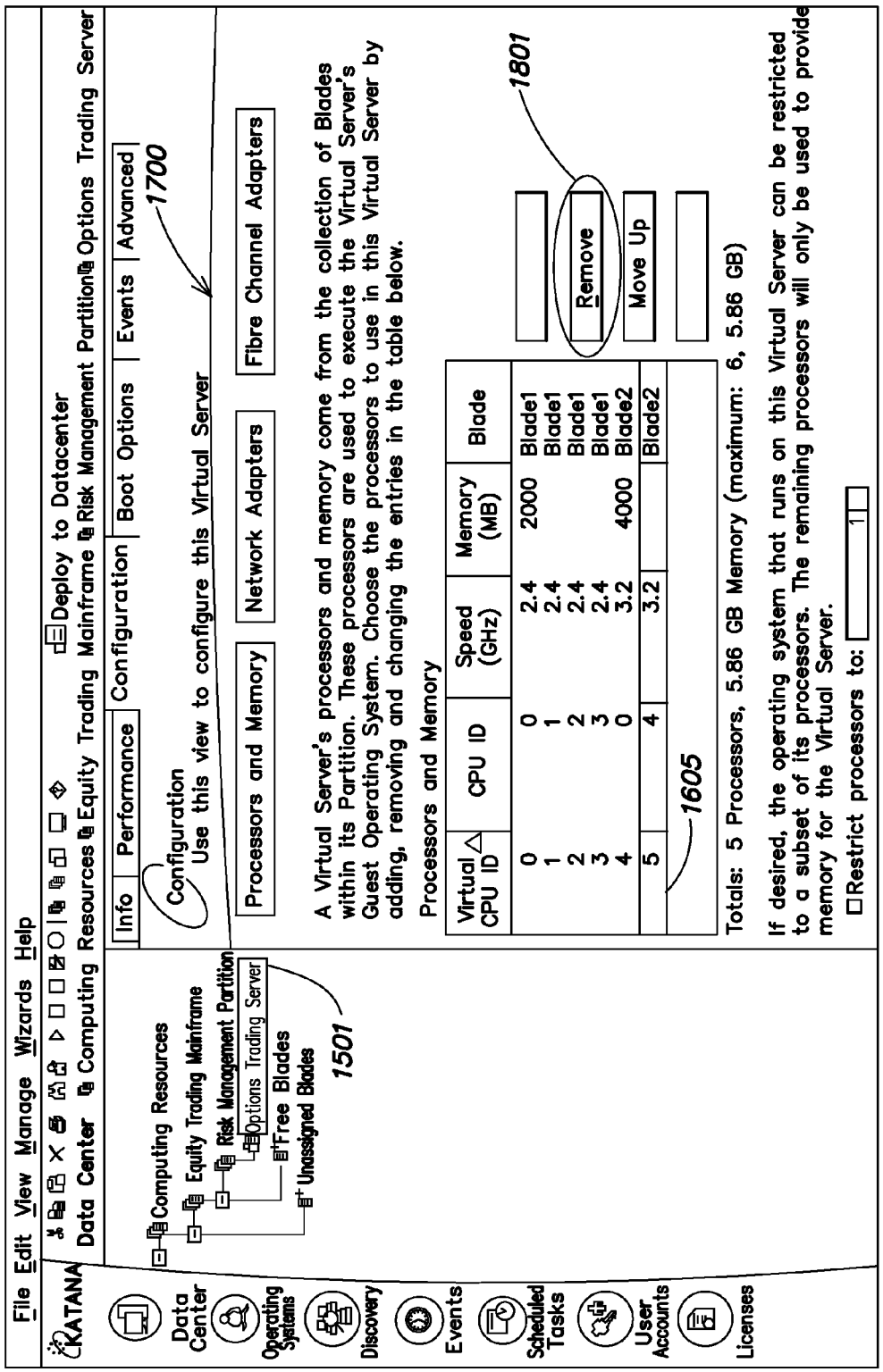
FIG. 18 shows a management interface according to another embodiment of the present invention.

FIG. 17 shows another interface according to one embodiment of the invention. Once deployed, hardware resources are available to a virtual server, and the virtual server may be started. Changes to the virtual server configuration may be made within interface 1700. For instance, virtual processors may be assigned to one or more virtual servers selected in interface 1701. Likewise, as shown in FIG. 18, associations between hardware and virtual resources may be removed through interface 1700. For instance, a node entry 1605 may be removed from Options Trading Server 1501.

Figure 19:
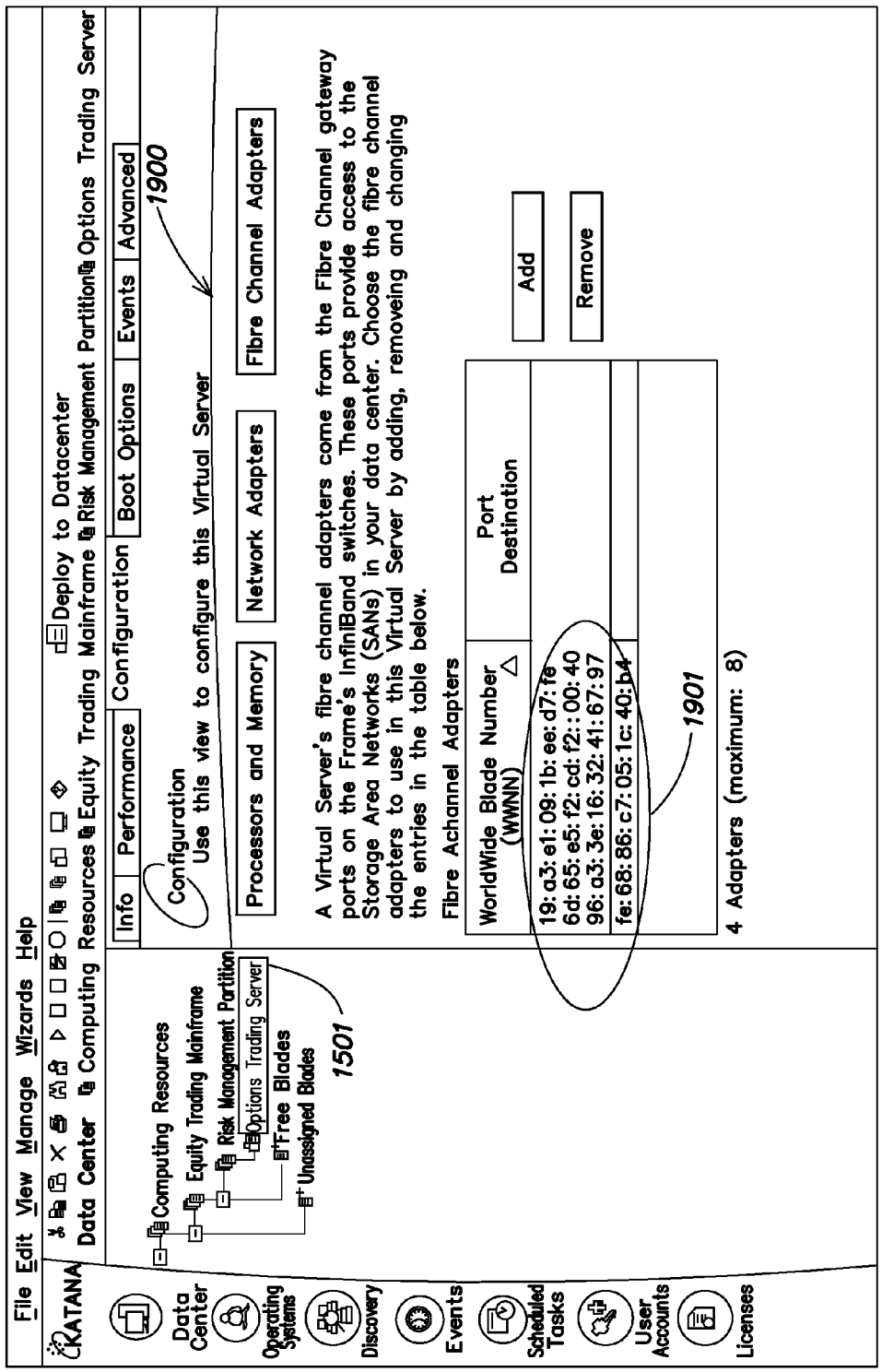
FIG. 19 shows a management interface according to another embodiment of the present invention.
Figure 20:
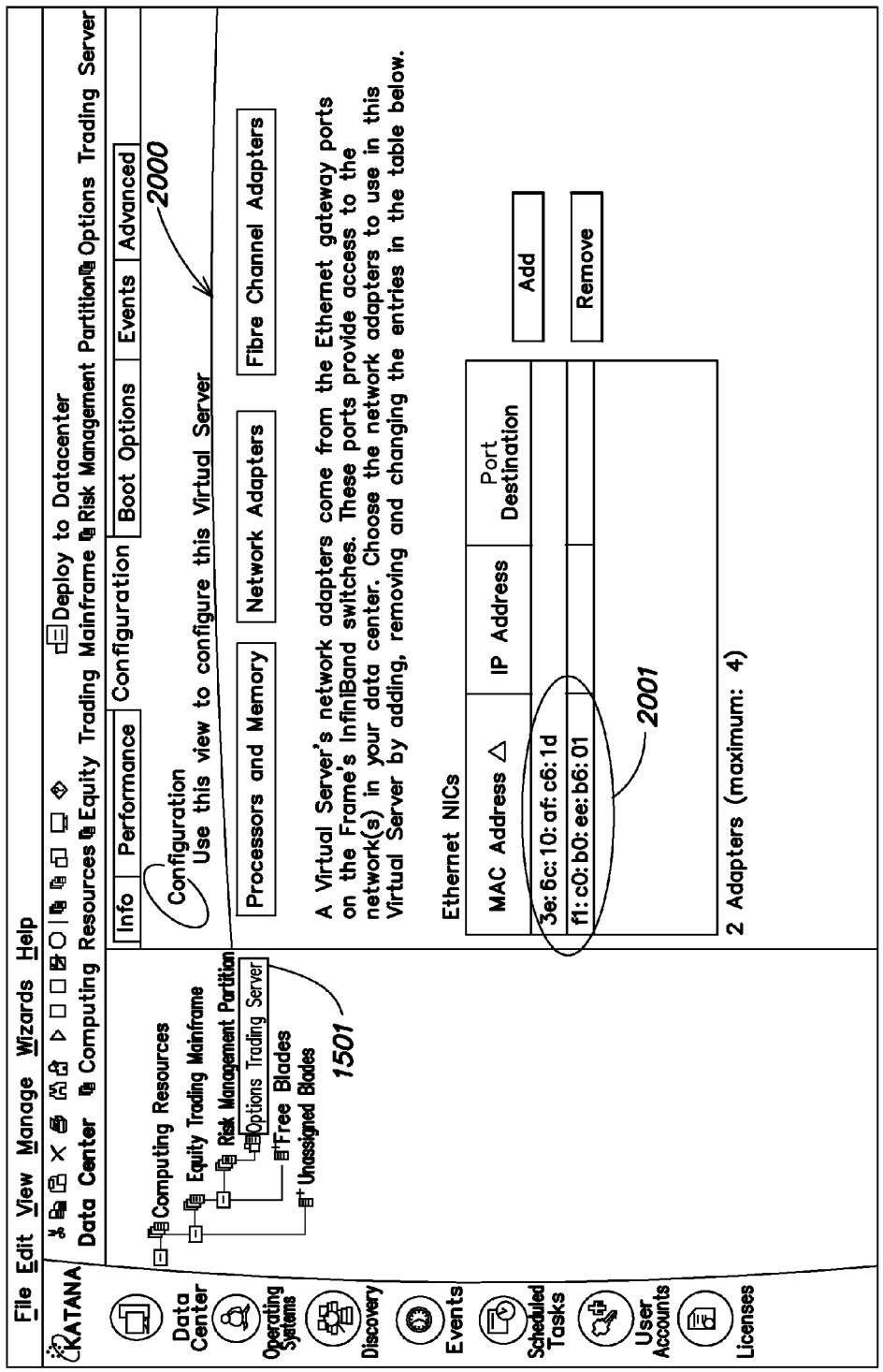
FIG. 20 shows a management interface according to another embodiment of the present invention.

FIGS. 19 and 20, respectively, show configuration windows 1900, 2000 through which FibreChannel adapters and network interface controllers (NICs) may be associated with a particular virtual server (e.g., Options Trading Server 1501). In the case of FibreChannel adapters, each may include a unique World Wide Port Number that uniquely identifies a FibreChannel gateway port used for accessing storage. As discussed below, virtual servers may access virtual storage adapters using one or more World Wide Port Numbers. Further, one or more network interfaces may be defined that can be used by a virtual server. Such network interfaces may be, for example, virtual network interfaces backed by one or more actual network interfaces (NICs).

Virtual servers, once defined, may be copied to new virtual servers. That is, one virtual server may be used as a "template" to define further virtual servers. A virtual server may be, for example, copied by a user or program using an interface (e.g., a graphical, programmatic, or CLI interface) to another instance of the virtual server. Once copied, the management server may automatically assign one or more new addresses (e.g., from an address pool as described above) to virtual I/O entities (e.g., network interface(s), virtual storage adapter(s)) as necessary.

Virtual Port Architecture

As discussed above, resources may be virtualized and mapped to physical resources. According to one embodiment, a virtual port architecture is provided that allows such a mapping. In particular, a virtual switch is provided that maps virtual I/O interfaces on a virtual server such as VNICs and VHBAs to physical I/O interfaces. The virtual switch is another virtual element that may be managed, and provides a layer of abstraction separating the virtual datacenter from physical network connections. In one embodiment, virtual switches enable physical network connections to change without impacting the configuration of the virtual servers.

Figure 22:
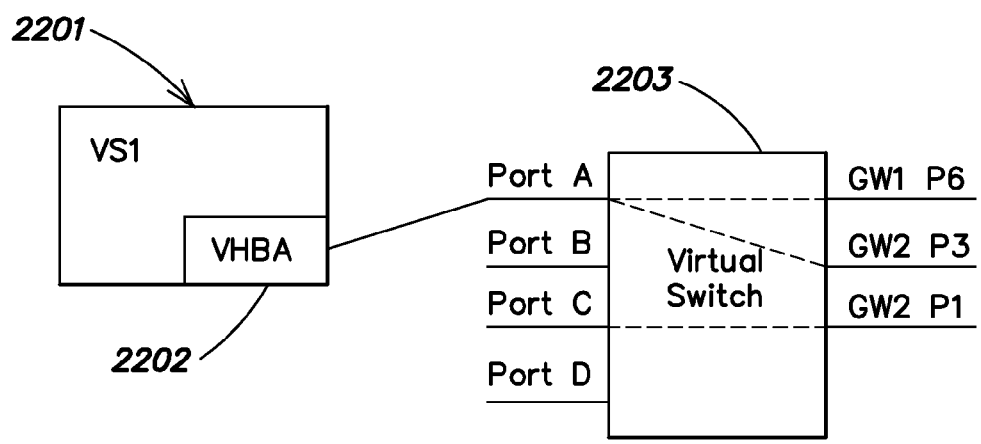
FIG. 22 is a block diagram of a virtual switch architecture according to one embodiment of the present invention.

Such a virtual switch architecture allows, for example, multiple virtual switch ports to be connected to the same physical port. Thus, each virtual port can be connected to multiple physical connections. This allows, for example, resources to be shared. FIG. 22 shows a virtual switching architecture according to one embodiment of the present invention.

In particular, a virtual server 2201 may include an associated virtual HBA 2202. VHBA 2202 may be mapped to a port A of virtual switch 2203. Virtual switch 2203 may correspond to one or more actual FibreChannel switches coupled to one or more storage resources. As shown, virtual switch 2203 may include one or more ingress ports and one or more egress ports. Egress ports may be coupled to, for instance, a gateway to one or more resources (e.g., storage). Also as shown, an ingress port (e.g., port A) of switch 2203 may be mapped to more than one egress port (e.g., GW1 P6 and GW2 P3). To this end, a virtual port may be coupled to multiple physical connections.

The following tables shows example configuration information that that may be used to create a virtual switch architecture according to one embodiment of the present invention. Such an architecture may, for example, use FibreChannel, Ethernet, or any other communication type. For instance, Table I below shows an example configuration of a virtual architecture that uses FibreChannel. Further, Table II below shows another example configuration of a virtual architecture using Ethernet.

TABLE I

| | | Virtual FibreChannel Switch | | |
|---|---|---|---|---|
| Virtual Port | Gateway Port | Dynamic Pathing | Virtual Server | VHBA |
| Medical DBs | FCGW1 Port 1 | Load Balancing | VS1 | VHBA-1 |
| Medical DBs | FCGW1 Port 2 | | VS1 | VHBA-2 |
| VS OSs | FCGW2 Port 1 | Path Affinity | VS2 | VHBA-1 |

TABLE II

| Virtual Ethernet Switch | | | |
| --- | --- | --- | --- |
| Virtual Port | Gateway Port | Virtual Server | VNIC |
| 1.1.1.* | ENETGW1 Port 6 | VS1 | VNIC-1 |
| 2.2.2.* | ENETGW1 Port 2 | VS1 | VNIC-2 |
| 1.1.1.* | ENETGW2 Port 1 | VS1 | VNIC-3 |
| 4.4.4.* | ENETGW2 Port 2 | VS4 | VNIC-1 |

In one example system, the user is permitted to create a virtual port and assign the virtual port a logical name. In one example architecture architecture using FibreChannel, a virtual port in a virtual Fibre Channel switch may be assigned a name that describes the storage arrays that are accessible from that virtual port. In an Ethernet virtual switch architecture, a virtual port in a virtual Ethernet Switch may be assigned a name that describes the destination subnet (e.g., 2.2.2.*). After a virtual port is created, the user is permitted to map the virtual port to one or more physical gateway ports. Once this mapping is complete, a pathing option for the virtual port can be assigned. For example, the path may have a path affinity to a particular path, load balancing may be performed among a number of parallel paths, or other path options may be used that influence how information is transmitted. For example, if there are more than one physical port connected to a particular destination, then load balancing can be selected that permits information to transmitted over multiple paths to a destination. After virtual ports have been created and mapped, a virtual interface (e.g., a VHBA or VNIC) can be mapped to one or more of the virtual ports.

Policy-Based Management

According to one embodiment of the present invention, a virtual computing architecture and its resources may be managed using policies in addition to direct control. According to another embodiment, the system may operate according to automatic policies, giving the user the ability to create a set of policy rules and actions governing automatic sizing and reconfiguration of virtual servers. For instance, automatic scale-up and/or scale-down of computing resources may be performed based on policies created by a system administrator. Alternatively, automatic scale-up/scale-down functions may be performed under programmatic control (e.g., by a management or other program).

Dynamically increasing (scale-up) or decreasing (scale-down) system processing capacity may be triggered, for example, by received events. Such events may be, for example, received from an application, a virtual computing system, one or more external computing systems, or any other entity capable of generating event. For instance, a Distributed Virtual Machine Monitor may be configured to send an event to a management server upon the occurrence of a particular condition. In response to the event or series of events, the management server or other program may perform (or cause the virtual computing system to perform) scale-up, scale-down, repair, shutdown, or other actions.

According to one aspect of the present invention, the virtual computing system may be capable of generating events that cause the management server to perform one or more administrative actions on the virtual computing system. For instance, a virtual server may be capable of performing a scale-up, scale-down, repair, shutdown or other action on itself by issuing one or more event messages to a management server, which then may perform the required administrative action(s).

According to one embodiment of the present invention, the system may include one or more events and one or more rules. An event may be, for example, an indication of a status or change in status of a managed entity, such as virtual or physical resources. The event may be generated by a managed entity, a proxy, or the event may be determined through polling of the managed entity, or through any other status-determining method. It should be appreciated that any method for generating an event may be used, and is not limited to any particular method (e.g., by polling, by generating and transmitting a message, etc.).

In one example, a system administrator may define a rule that is triggered based on one (or more) events. A collection or set of rules defines a policy for the virtual computing system. The following is an example rule according to one embodiment of the present invention:

Rule 1: When a virtual server (VS) reaches 85% CPU utilization, perform a SCALEUP action where the SCALEUP action may add additional computation capacity (e.g. processors, either virtual or actual) to the virtual server. The SCALEUP action may include one or more operations. For example, as more processing resources are added, memory, storage, or other resources may be changed. Actions such as SCALEUP, SCALEDOWN (that removes resources), REPAIR (that repairs, replaces, restarts) or other action may be performed in response to events, alone or in combination with other actions. These actions may be stored in a data store (e.g., a database) associated with a management server or other program.

Figure 21:
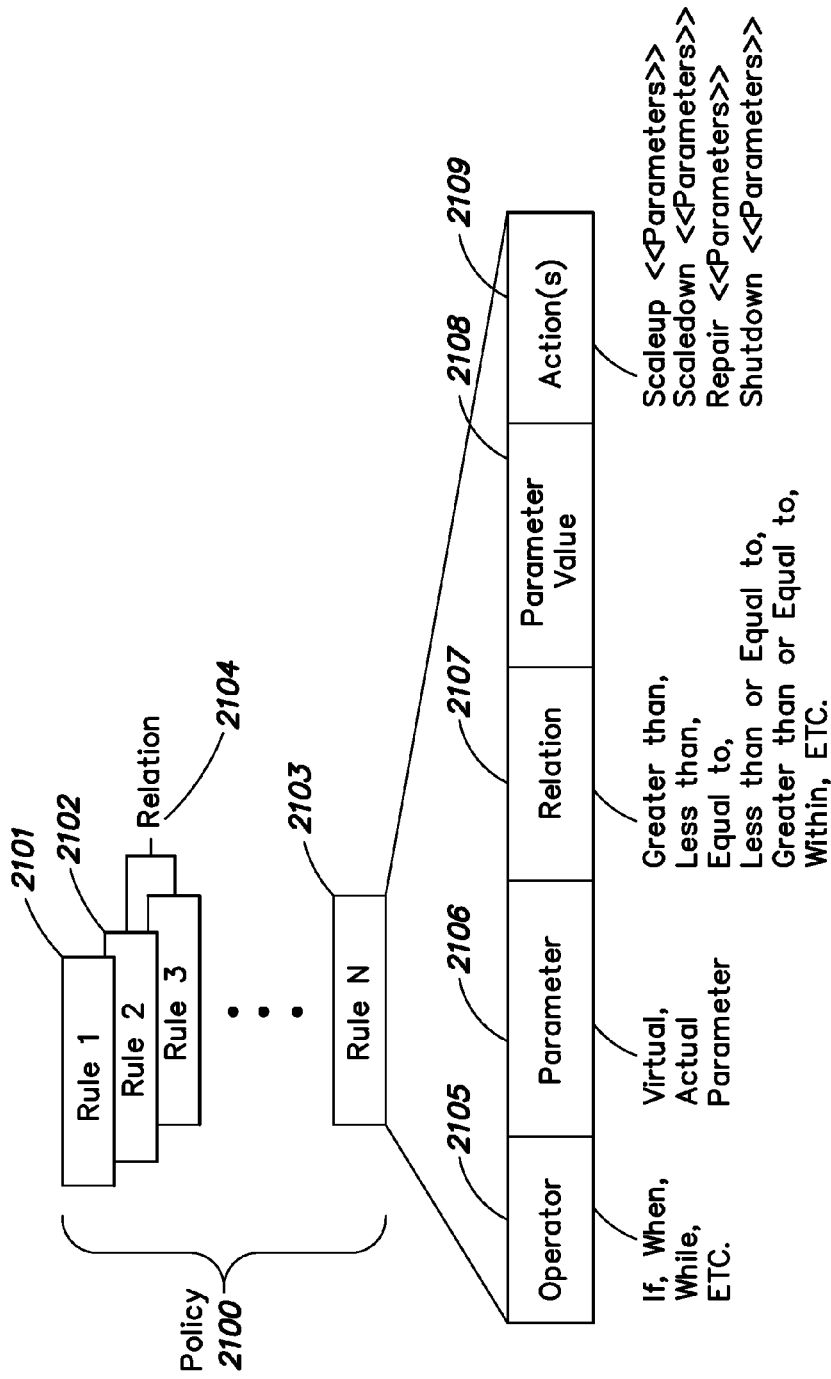
FIG. 21 is a block diagram of a management policy format according to one embodiment of the present invention.

FIG. 21 shows a diagram of a policy 2100 according to one embodiment of the present invention. Policy 2100 may include one or more rules 2101-2103. These rules may be attached to one or more managed objects, such as virtual mainframes, virtual partitions and virtual servers, in the virtual computing system. Rules may include parameters that define what performance or configuration information trigger actions that change the configuration or operating parameters of the virtual server.

For example, rule 2103 may comprise a number of elements, including operator 2105, parameter 2106, relation 2107, parameter value 2108, and action 2109. Operator 2105 may indicate, for instance, what condition rule 2103 will apply, and may be expressed as a logical operator such as IF, WHILE, etc. Operator 2105, along with other values, may determine whether 2103 is triggered. Parameter 2106 may be a generalized parameter (e.g. CPU utilization) that, when attached to a hardware or virtual element instance (or group of instances) within the virtual computing system, allows that particular instance or group of instances to act as a trigger for a particular rule. In one embodiment, rules may be selectively attached to particular instances within the virtual computing system.

Rule 2103 may also comprise a relation 2107 that relates parameter 2106 to a parameter value 2108. The relation may be, for example, a mathematical relation such as greater than, less than or equal to, greater than or equal to, within, or any other relation (e.g., mathematical, Boolean, etc.). Also, relations may be combined to create hierarchical rule sets. Parameter value 2108 may correspond to a value of parameter 2106, when satisfied by the relation, one or more actions 2109 may be performed. For example, if a parameter 2106 such as the CPU utilization on a particular virtual server needs a relation 2107 of greater than a parameter value 2108 on 85% then an action 2109 of a SCALEUP may be performed on the particular virtual server. Rule 2103 may trigger one or more actions 2109, depending on what functions need to be performed.

Actions 2109 may include, for example, a SCALEUP action which adds resources to a particular virtual server, a SCALEDOWN action that subtracts one or more resources from a virtual server, a REPAIR action which may, for example, replace a particular resource with a spare resource within the virtual computing system. Resources, as discussed above, may be associated with one or more physical nodes. Thus, a SCALEUP action may add resources from a physical node not previously associated with a particular virtual server. In this manner, the capabilities of the virtual server may be expanded.

Also, a SHUTDOWN action may be performed that shuts down a particular virtual server. Other actions may be performed, and those listed above are only by way of example. According to one embodiment, there may be multiple actions performed as a result of a rule trigger, and such actions may be performed in a particular sequence.

Although an example policy 2100 is shown having one or more rules, the invention is not limited to any particular policy. Rather, policies may be implemented using other methods, rule formats, and implementations.

According to one embodiment, an interface is provided for users to create management policies within the management server. In one example, these policies may cause automated actions to objects defined in the virtual computing system based on triggers. For instance, a user, within a user interface associated with the management server, may be permitted to define one or more policies. These policies may be defined by, for example, an object (e.g., a server, a node, etc.), a trigger, and an action as discussed above.

Policies, in one implementation, may include rules that are applied to individual groupings of hardware (referred to hereinafter as virtual partitions), objects within those virtual partitions such as virtual servers and nodes, and nodes in a free pool of the virtual computing system for that virtual partition. Each policy may include one or more objects, triggers, and actions. The following example policies may be applied to one or more objects:

For CPU utilization average>70% for 10 minutes, add another node to the virtual partition For CPU utilization average <30% for 10 minutes, remove a node from the virtual partition Although the above examples show performance-triggered policies, it should be appreciated that, according to one embodiment of the invention, different types of triggers may be used to initiate an action.

For example, according to one embodiment, actions may be started based on the following triggers:

TABLE III

Example Triggers

| Triggers | Description |
| --- | --- |
| Performance | Utilization (Mem/CPU), page faults/CPU, peak and average, specified sampling rate |
| Failures or Errors | Intermittent or duration |
| Time | Action to occur now or at another set time |
| User defined | Created by the user |
| Node Availability | When a node has become available |

A trigger generally may include an object's property, event or method result, time or user-defined script. As outlined in Table III above, triggers may be defined for performance issues (e.g., resource utilization) or failures, as measured instantaneously or over some period of time. Other triggers may be time-based. For example, a trigger may cause an action to occur immediately, or at some other time. There may be other types of triggers that relate to other events (e.g., a user defined trigger based on one or more parameters, an event-based trigger such as a "node availability" trigger that is fired when a particular node or nodes become available). Any number and type of triggers may be defined, using any type of interface to the management server.

Based on the triggers as discussed above, actions as shown below in Table IV may be available to be performed on the defined objects:

TABLE IV

Example Actions

| Actions | Description |
| --- | --- |
| Move | Applies to nodes and virtual server. Move node in or out of a specified virtual partition. In one example, when moved into the virtual partition, the source is the free pool of the virtual mainframe. When moved from the virtual partition, the destination is the free pool of the virtual mainframe. Move a virtual server from the virtual partition A to virtual partition B within this virtual mainframe, the virtual server is quiesced prior to being moved. |
| Provision | Selected virtual server profile is moved into the virtual partition and becomes a virtual server. |
| Start | Start virtual server on this virtual partition |
| Delete | Delete virtual server on this virtual partition |
| Halt | Virtual server shutdown - h (GOS brought down in an orderly fashion) |
| Restart | Virtual server shutdown - r (GOS brought down in an orderly fashion) and virtual server restarted (virtual power cycle) |
| Reset | Virtual server error (GOS is not shut down in an orderly fashion) |
| Optimize (future) | Virtual server performance upgrade, the goal is to re-optimize the node selection that is used by the specified virtual server. |
| Failover | Failover virtual partition to another virtual partition. In one example, the virtual partition must be locked so that the virtual partition is available. In another example, destination virtual partition resources are locked if the destination virtual partition is a target of a failover. None of the nodes associated with the virtual partition may be moved out if there is at least one rule on the source virtual partition with a failover rule. |

As discussed, actions based on policies could be performed on particular objects in the virtual computing system. These objects may be, for example, any virtual or physical objects in the virtual computing system. Also, it should be appreciated that policies and their actions may be applied to groups of objects.

Policies can be run, for instance, for a specified duration. In one example, the policy may be run at a start time to an end time, and this may be specified through, for example, a management interface. Also, in another example, the policy be constantly applied (e.g., always "on"). Alternatively, the policy may be stored in a memory of the management server, but not applied to an object, or not turned "on". Such a policy may be activated in the future, as needed.

Mapping of Virtual Servers

Figure 3:
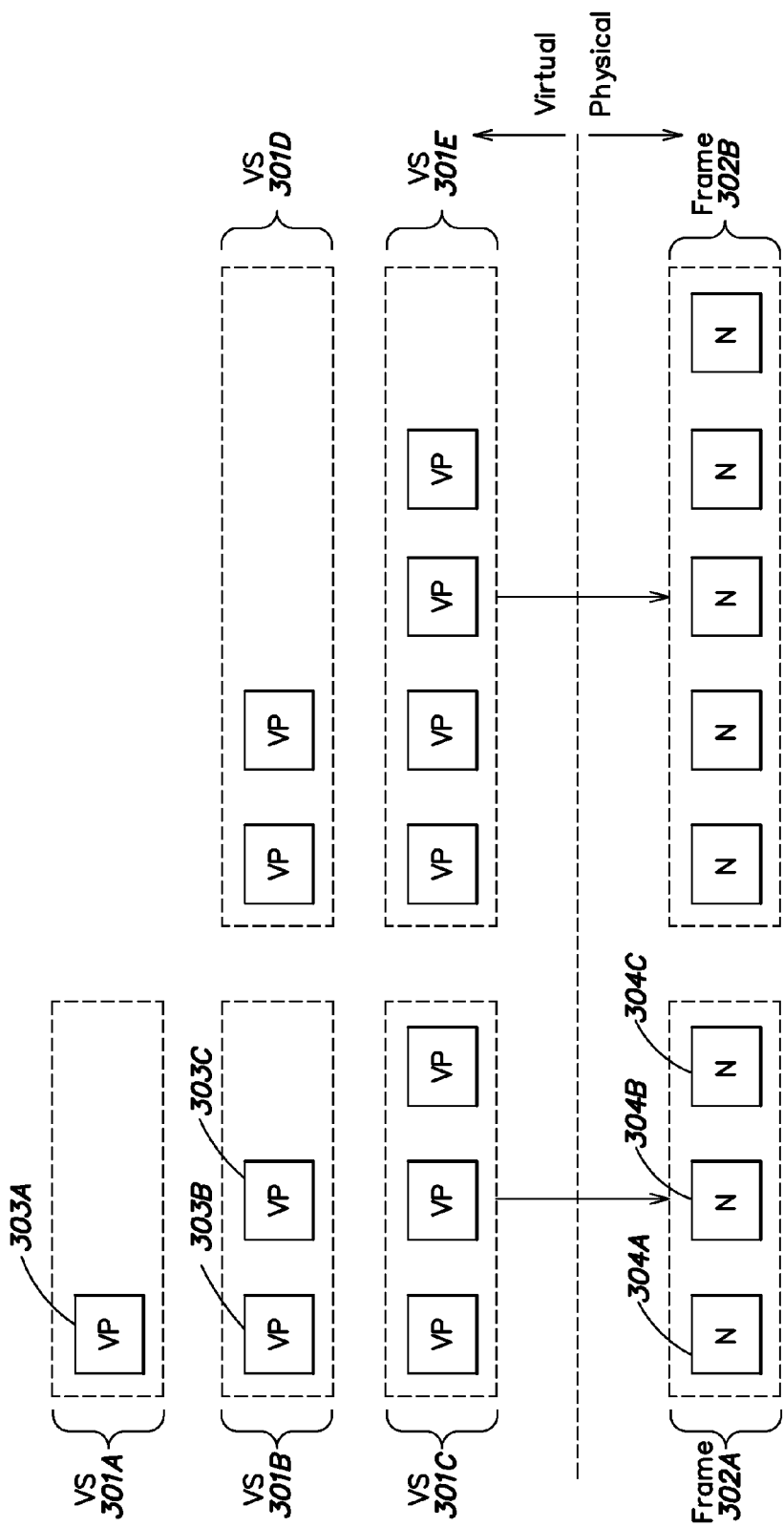
FIG. 3 is a block diagram showing a mapping relation between virtual processors and physical nodes according to one embodiment of the present invention.

FIG. 3 shows in more detail an example mapping of one or more virtual servers to a grouping of hardware referred to as a virtual partition according to one embodiment of the invention. A collection of one or more virtual processors is arranged in a set. In one embodiment, a virtual server (VS) may be viewed as a simple representation of a complete computer system. A VS, for example, may be implemented as a series of application programming interfaces (APIs). An operating system is executed on a virtual server, and a distributed virtual machine monitor may manage the mapping of VPs onto a set of physical processors. A virtual server (e.g., VS 301A-301E) may include one or more VPs (e.g., 303A-303C), and the number of VPs in a particular VS may be any number.

Hardware nodes and their associated resources are grouped together into a set referred to herein as a frame. According to one embodiment, a virtual server is associated with a single frame, and more than one virtual server may be serviced by a frame. In the physical realm, nodes (e.g., nodes 304A-304C) may be associated with a particular frame (e.g., frame 302A). In one example, a frame (e.g., frame 302A, 302B) may define a partitioned set of hardware resources, each of which sets may form multiple virtual partitions, each of which may be associated with one or more virtual servers. In one embodiment, virtual processors are mapped to physical processors by the distributed virtual machine monitor (DVMM). In one embodiment, there may be a one-to-one correspondence between virtual processors and physical processors. Nodes within a frame may include one or more physical processors upon which virtual processor tasks may be scheduled. Although several example mappings are shown, it should be appreciated that the invention is not limited to the shown mappings. Rather, any mapping may be provided that associates a virtual server to a frame.

However, there may be configurations that are not allowed for reasons having to do with security, performance, or other reasons. For instance, according to one embodiment, mapping of a virtual server to more than one frame may not be permitted (e.g., nodes outside of a frame are not connected to the internal frame interconnect). Other configurations may not be permitted based on one or more rules. For instance, in one example, a physical processor may not be permitted to be allocated to more than one virtual partition. Restriction rules may be defined alone or in combination with other restriction rules.

Scheduling

Figure 4:
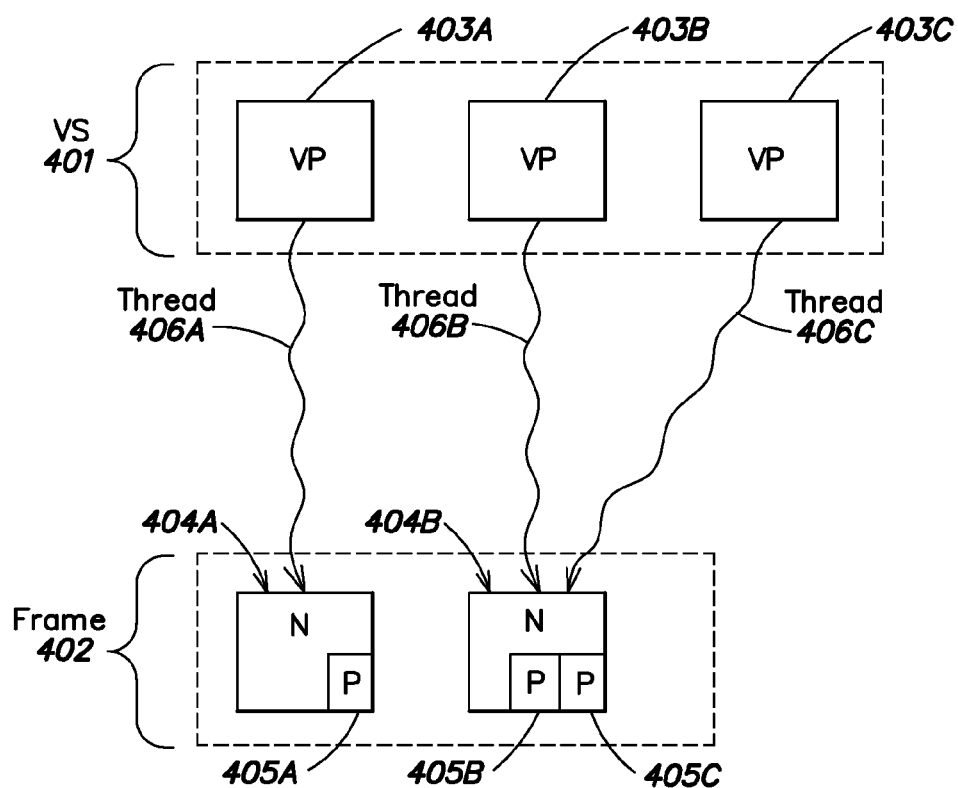
FIG. 4 is a block diagram showing scheduling of virtual processor tasks according to one embodiment of the present invention.

FIG. 4 shows an example scheduling relation between virtual processors and physical processors according to one embodiment of the invention. As shown, virtual server 401 includes two virtual processors VP 403A-403B. Each of these VPs are mapped to nodes 404A-404B, respectively in frame 402. Node 404A may include one processor 405A upon which a task associated with VP 403A may be scheduled.

There may be a scheduler within the distributed virtual machine monitor that handles virtual processor scheduling. In one example, each virtual processor is mapped to one process or task. The scheduler may maintain a hard affinity of each scheduled process (a VP) to a real physical processor within a node. According to one embodiment, the distributed virtual machine monitor may execute one task per virtual processor corresponding to its main thread of control. Tasks in the same virtual server may be simultaneously scheduled for execution.

Figure 5:
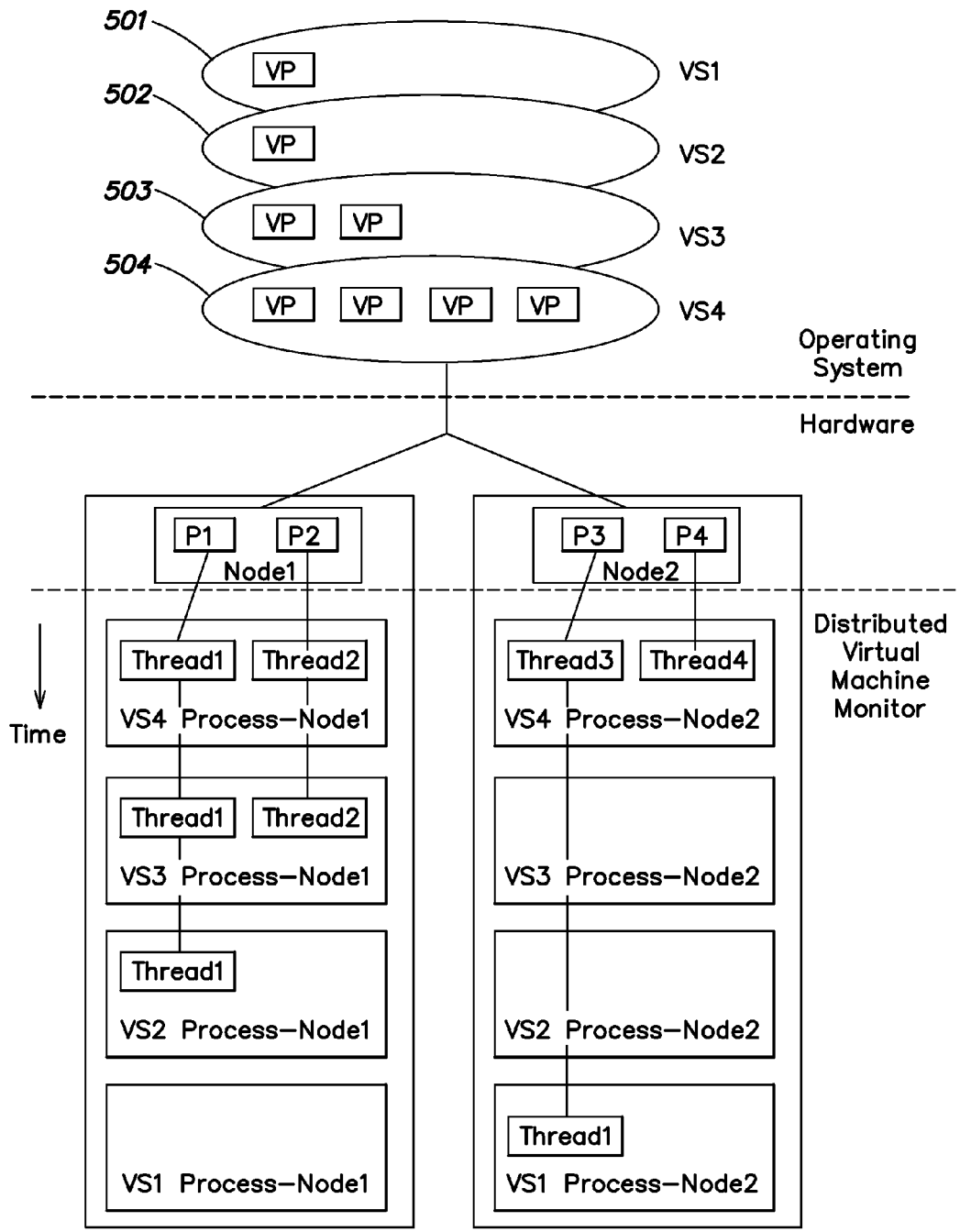
FIG. 5 is a block diagram showing scheduling of virtual processor tasks in accordance with another embodiment of the present invention.

FIG. 5 shows a more detailed example showing how virtual server processes may be scheduled according to one embodiment of the present invention. In the example, there are four virtual servers, VS1 (item 501), VS2 (item 502), VS3 (item 504), and VS4 (item 505) defined in the system. These virtual servers have one or more virtual processors (VPs) associated with them.

These four virtual processors are mapped to two nodes, each of which nodes includes two physical processors, P1-P4. The distributed virtual machine monitor maps each virtual server to an individual process. Each virtual processor (VP) within a virtual server is a thread within this process. These threads may be, for example, bound via hard affinity to a specific physical processor. To the distributed virtual machine monitor, each of the virtual servers appears as a process running at a non-privileged level. Each of the individual virtual processors included in a virtual server process are component threads of this process and may be scheduled to run on a separate, specific physical processor.

With the example configuration having two dual processor nodes (four physical processors total), in one embodiment of the invention there may be up to a maximum of four VPs created in any virtual server. Also, with a total number of eight VPs, there are eight threads. As shown in FIG. 5, the distributed virtual machine monitor may run each virtual server process at approximately the same time (e.g., for performance reasons as related processes running at different times may cause delays and/or issues relating to synchronization). That is, the VS4 processes are scheduled in one time slot, VS3 processes in the next, and so forth. There may be "empty" processing slots in which management functions may be performed or other overhead processes. Alternatively, the scheduler may rearrange tasks executed in processor slots to minimize the number of empty processor slots.

Further, the scheduler may allow for processors of different types and/or different processing speeds to perform virtual server tasks associated with a single virtual server. This capability allows, for example, servers having different processing capabilities to be included in a frame, and therefore is more flexible in that an administrator can use disparate systems to construct a virtual computing platform. Connections between different processor types are facilitated, according to one embodiment, by not requiring synchronous clocks between processors.

Memory

Figure 6:
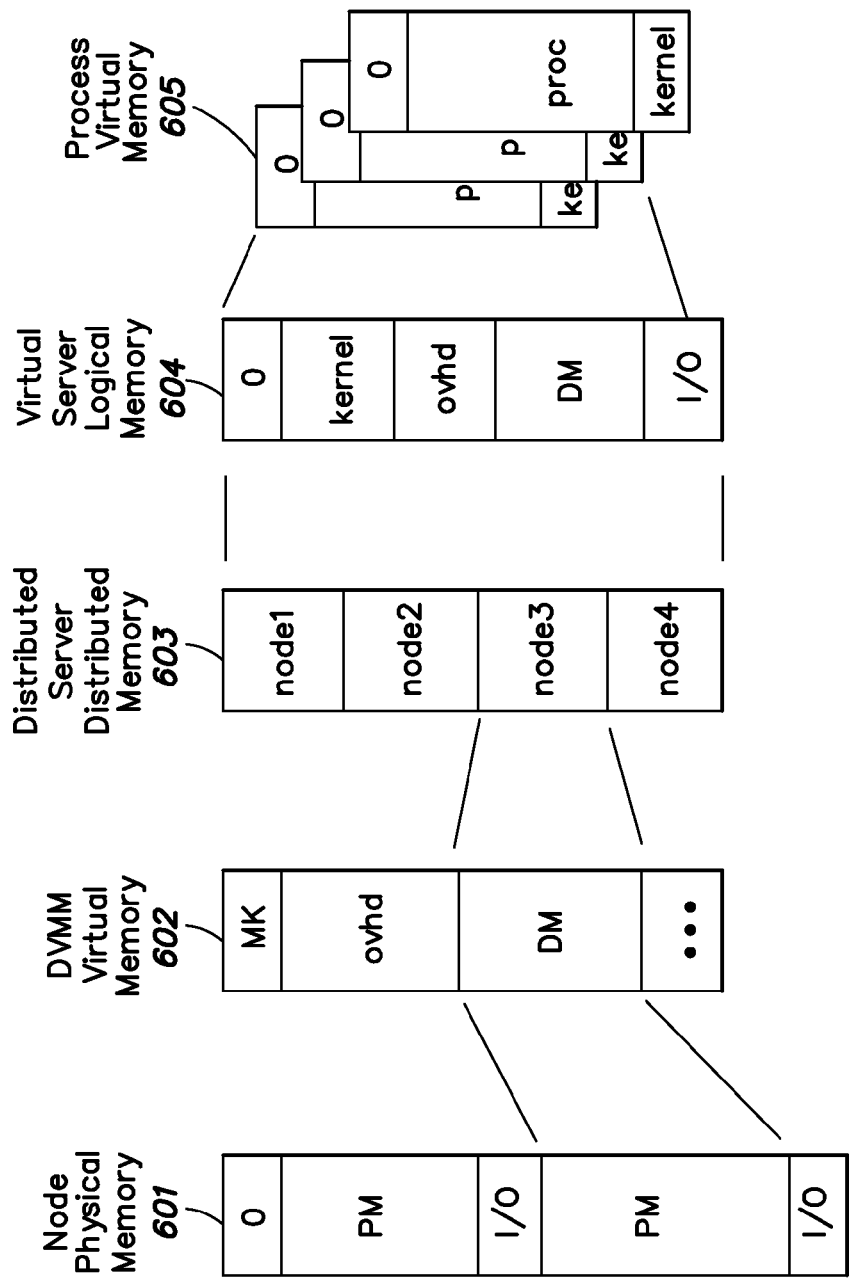
FIG. 6 is a block diagram showing an example memory mapping in a virtual server system in accordance with another embodiment of the present invention.

FIG. 6 shows a block diagram of a memory mapping in a virtual computer system according to one embodiment of the invention. In general, the distributed virtual machine monitor may make memory associated with hardware nodes available to the guest operating system (GOS) and its applications. The distributed virtual machine monitor (DVMM), through a virtual machine architecture interface (hereinafter referred to as the VMA), offers access to a logical memory defined by the distributed virtual machine monitor and makes available this memory to the operating system and its applications.

According to one embodiment, memory is administered and accessed through a distributed memory manager (DMM) subsystem within the distributed virtual machine monitor. Memory may, therefore, reside on more than one node and may be made available to all members of a particular virtual server. However, this does not necessarily mean that all memory is distributed, but rather, the distributed virtual machine monitor may ensure that local memory of a physical node is used to perform processing associated on that node. In this way, local memory to the node is used when available, thereby increasing processing performance. One or more "hint" bits may be used to specify when local memory should be used, so that upper layers (e.g., virtual layers) can signal to lower layers when memory performance is critical.

Referring to FIG. 6 and describing from left to right, a node's physical memory 601 may be arranged as shown in FIG. 6, where a portion of the node's physical memory is allocated to virtual memory 602 of the distributed virtual machine monitor memory. As shown, distributed memory associated with the node may be part of a larger distributed memory 603 available to each virtual partition. Collectively, the distributed memories of each node associated with the virtual partition may be made available to a virtual server as logical memory 604 and to the operating system (GOS), as if it were a physical memory. Memory 604 is then made available (as process virtual memory 605) to applications.

GOS page table manipulation may, for example, be performed by the distributed virtual machine monitor in response to GOS requests. Because, according to one embodiment, the GOS is not permitted direct access to page tables to ensure isolation between different virtual servers, the distributed virtual machine monitor may be configured to perform page table manipulation. The distributed virtual machine monitor may handle all page faults and may be responsible for virtual address spaces on each virtual server. In particular, the DMM subsystem of the distributed virtual machine monitor (DVMM) may perform operations on page tables directly.

Memory operations that may be presented to the operating system through the virtual machine architecture (VMA). According to one embodiment of the present invention, the VMA may include memory operations that are similar in function to that of conventional architecture types (e.g., Intel). In this manner, the amount of effort needed to port a GOS to the VMA is minimized. However, it should be appreciated that other architecture types may be used.

In the case where the architecture is an Intel-based architecture, memory operations that may be presented include management of physical and logical pages, management of virtual address spaces, modification of page table entries, control and modification of base registers, management of segment descriptors, and management of base structures (e.g., GDT (global descriptor table), LDT (local descriptor table), TSS (task save state) and IDT (interrupt dispatch table)).

According to one embodiment, access to such memory information may be isolated.

For instance, access to hardware tables such as the GDT, LDT, and TSS may be managed by the VMA. More particularly, the VMA may maintain copies of these tables for a particular virtual server (providing isolation), and may broker requests and data changes, ensuring that such requests and changes are valid (providing additional isolation). The VMA may provide as a service to the GOS access to instructions and registers that should not be accessed at a privileged level. This service may be performed by the VMA, for example, by a function call or by transferring data in a mapped information page.

It can be appreciated that although the VMA may expose logical memory to the GOS, actual operations may be performed on memory located in one or more physical nodes. Mapping from virtual to logical memory may be performed by the VMA. For instance, a virtual address space (or VAS) may be defined that represents a virtual memory to logical memory mapping for a range of virtual addresses.

Logical memory may be managed by the GOS, and may be allocated and released as needed. More particularly, the GOS may request (e.g., from the VMA) for an address space to be created (or destroyed) through the VMA, and the DMM subsystem of the DVMM may perform the necessary underlying memory function. Similarly, the VMA may include functions for mapping virtual addresses to logical addresses, performing swapping, perform mapping queries, etc.

Remote Direct Memory Access (RDMA) techniques may also be used among the nodes to speed memory access among the nodes. Remote Direct Memory Access (RDMA) is a well-known network interface card (NIC) feature that lets one computer directly place information into the memory of another computer. The technology reduces latency by minimizing demands on bandwidth and processing overhead.

InDput/Output

Regarding I/O, the VMA may provide isolation between the GOS and distributed virtual machine monitor. According to one embodiment of the present invention, the VMA functions as a thin conduit positioned between the GOS and a DVMM I/O subsystem, thereby 30 providing isolation. In one embodiment, the GOS is not aware of the underlying hardware I/O devices and systems used to support the GOS. Because of this, physical I/O devices may be shared among more than one virtual server. For instance, in the case of storage I/O, physical storage adapters (e.g., HBAs) may be shared among multiple virtual servers.

In one implementation, a virtual I/O port is created. An I/O driver in the GOS passes data through this virtual I/O port. This driver, may, for example, may act as a pipe between the application/GOS and a virtual I/O subsystem (e.g., in the microkernel). Thus, this architecture provides a virtualized I/O in the GOS. This architecture contrasts with other architectures where an I/O adapter is a completely virtualized adapter including I/O registers and other information relating to the adapter. However, according to one embodiment, a virtual port is created that transfers information to a virtual I/O subsystem, which passes the information transparently to an underlying resource in a transparent manner.

In one implementation, GOS drivers associated with I/O may be modified to interface with the VMA. Because the size of the distributed virtual machine monitor should, according to one embodiment, be minimized, drivers and changes may be made in the GOS, as there is generally more flexibility in changing drivers and configuration in the GOS than the distributed virtual machine monitor.

I/O functions that may be performed by the distributed virtual machine monitor in support of the GOS may include I/O device configuration and discovery, initiation (for both data movement and control), and completion. Of these types, there may be varying I/O requests and operations specific to each type of device, and therefore, there may be one or more I/O function codes that specify the functions to be performed, along with a particular indication identifying the type of device upon which the function is performed. I/O support in the VMA may act as a pipe that channels requests and results between the GOS and underlying distributed virtual machine monitor subsystem.

I/O devices that may be shared include, for example, Fibre-Channel, InfiniBand, Ethernet, Console and Keyboard. In hardware, I/O requests may be sent to intelligent controllers (referred to hereinafter as I/O controllers) over multiple paths (referred to as multipathing). I/O controllers service the requests by routing the request to virtual or actual hardware that performs the I/O request possibly simultaneously on multiple nodes (referred to as multi-initiation), and returns status or other information to the distributed virtual machine monitor.

In one example I/O subsystem, the distributed virtual machine monitor maintains a device map that is used to inform the GOS of devices present and a typing scheme to allow access to the devices. This I/O map may be an emulation of a bus type similar to that of a conventional bus type, such as a PCI bus. The GOS is adapted to identify the device types and load the appropriate drivers for these device types. Drivers pass specific requests through the VMA interface, which directs these requests (and their responses) to the appropriate distributed virtual machine monitor drivers.

The VMA configuration map may include, for example, information that allows association of a device to perform an operation. This information may be, for example, an index/type/key information group that identifies the index of the device, the device type, and the key or instance of the device. This information may allow the GOS to identify the I/O devices and load the proper drivers.

Once the GOS has determined the I/O configuration and loaded the proper drivers, the GOS is capable of performing I/O to the device. I/O initiation may involve the use of the VMA to deliver an I/O request to the appropriate drivers and software within the distributed virtual machine monitor. This may be performed, for example, by performing a call on the VMA to perform an I/O operation, for a specific device type, with the request having device-specific codes and information. The distributed virtual machine monitor may track which I/O requests have originated with a particular virtual server and GOS. I/O commands may be, for example, command/response based or may be performed by direct CSR (command status register) manipulation. Queues may be used between the GOS and distributed virtual machine monitor to decouple hardware from virtual servers and allow virtual servers to share hardware I/O resources.

According to one embodiment of the present invention, GOS drivers are virtual port drivers, presenting abstracted services including, for example, send packet/get packets functions, and write buffer/read buffer functions. In one example, the GOS does not have direct access to I/O registers. Higher level GOS drivers, such as class drivers, filter drivers and file systems utilize these virtual ports.

In one embodiment of the present invention, three different virtual port drivers are provided to support GOS I/O functions: console, network and storage. These drivers may be, for example, coded into a VMA packet/buffer interface, and may be new drivers associated with the GOS. Although a new driver may be created for the GOS, above the new driver the GOS kernel does not access these so called "pass-through" virtual port drivers and regular physical device drivers as in conventional systems. Therefore, virtual port drivers may be utilized within a context of a virtual system to provide additional abstraction between the GOS and underlying hardware.

According to another embodiment, the use of virtual port drivers may be restricted to low-level drivers in the GOS, allowing mid-level drivers to be used as is (e.g., SCSI multipath drivers). With respect to the I/O bus map, virtual port drivers are provided that present abstracted hardware vs. real hardware (e.g., VHBA vs. HBA devices), allowing the system (e.g., the distributed virtual machine monitor) to change the physical system without changing the bus map. Therefore, the I/O bus map represents devices in an abstract sense, but does not represent the physical location of the devices. For example, in a conventional PC having a PCI bus and PCI bus map, if a board in the PC is moved, the PCI map will be different. In one embodiment of the present invention, a system is provided wherein if the location of a physical device changes, the I/O map presented to higher layers (e.g., application, GOS) does not change. This allows, for example, hardware devices/resources to be removed, replaced, upgraded, etc., as the GOS does not experience a change in "virtual" hardware with an associated change in actual hardware.

Example I/O Function

The following is an example of an I/O function performed in a virtual server as requested by a GOS (e.g., Linux). The I/O function in the example is initially requested of the Guest Operating System. For instance, a POSIX-compliant library call may invoke a system service that requests an I/O operation.

The I/O operation passes through a number of layers including, but not limited to:

Common GOS I/O processing. A number of common steps might occur including request aggregation, performance enhancements and other I/O preprocessing functions. The request may be then passed to a first driver level referred to as an "Upper Level" driver.

"Upper Level" drivers that are not in direct hardware contact, but provide support for a particular class of devices. The request is further processed here and passed on to Lower Level drivers.

"Lower Level" drivers are in direct hardware contact. These drivers are specific to a virtual server and are modified to work in direct contact with the VMA I/O interface as discussed above. These drivers process the request and pass the request to the VMA I/O component as if the I/O component was a specific hardware interface.

The VMA I/O component routes the request to the proper distributed virtual machine monitor (DVMM) drivers for processing.

The DVMM I/O layer now has the request and processes the request as needed. In this example, a set of cooperating drivers moves the request onto network drivers (e.g., InfiniBand drivers) and out onto the hardware (e.g., storage adapters, network interfaces, etc.).

In a virtual server according to one embodiment, all processors may initiate and complete I/O operations concurrently. All processors are also capable of using multipath I/O to direct I/O requests to the proper destinations, and in turn each physical node can initiate its own I/O requests. Further, the network (e.g., an interconnect implementing InfiniBand) may offer storage devices (e.g., via FibreChannel) and networking services (e.g., via IP) over the network connection (e.g., an InfiniBand connection). This set of capabilities provides the distributed virtual machine monitor, and therefore, virtual servers, with a very high performance I/O system. An example architecture that shows some of these concepts is discussed further below with reference to FIG. 9. A specific virtual architecture that shows these concepts as they relate to storage is discussed further below with reference to FIG. 10.

Interrupts and Exceptions

Other interfaces to the GOS may also provide additional isolation. According to one aspect of the present invention, interrupts and exceptions may be isolated between the GOS and distributed virtual machine monitor (DVMM). More particularly, interrupts and exceptions may be handled, for example, by an interface component of the VMA that isolates the GOS from underlying interrupt and exception support performed in the DVMM. This interface component may be responsible for correlation and propagation of interrupts, exceptions, faults, traps, and abort signals to the DVMM. A GOS may be allowed, through the VMA interface, to set up a dispatch vector table, enable or disable specific event, or change the handler for specific events.

According to one embodiment, a GOS may be presented a typical interface paradigm for interrupt and exception handling. In the case of an Intel-based interface, an interrupt dispatch table (IDT) may be used to communicate between the GOS and the DVMM. In particular, an IDT allows the distributed virtual machine monitor to dispatch events of interest to a specific GOS executing on a specific virtual server. A GOS is permitted to change table entries by registering a new table or by changing entries in an existing table. To preserve isolation and security, individual vectors within the IDT may remain writeable only by the distributed virtual machine monitor, and tables and information received from the GOS are not directly writable. In one example, all interrupts and exceptions are processed initially by the distributed virtual machine monitor.

As discussed above, a (VMA) may be defined that is presented as an abstraction layer to the GOS. Any OS (e.g., Linux, Windows, Solaris, etc.) may be ported to run on a VMA in the same manner as would be performed when porting the OS to any other architecture (e.g., Alpha, Intel, MIPS, SPARC, etc.). According to one aspect of the present invention, the VMA presented to the GOS may be similar to an Intel-based architecture such as, for example, IA-32 or IA-64.

In an example VMA architecture, non-privileged instructions may be executed natively on an underlying hardware processor, without intervention. In instances when privileged registers or instructions must be accessed, the distributed virtual machine monitor may intervene. For examples, in cases where there are direct calls from the operating system, trap code in the VMA may be configured to handle these calls. In the case of exceptions (unexpected operations) such as device interrupts, instruction traps, page faults or access to a privileged instruction or register may cause an exception. In one example, the distributed virtual machine monitor may handle all exceptions, and may deliver these exceptions to the GOS via a VMA or may be handled by the VMA.

Execution Privilege Levels

Figure 7:
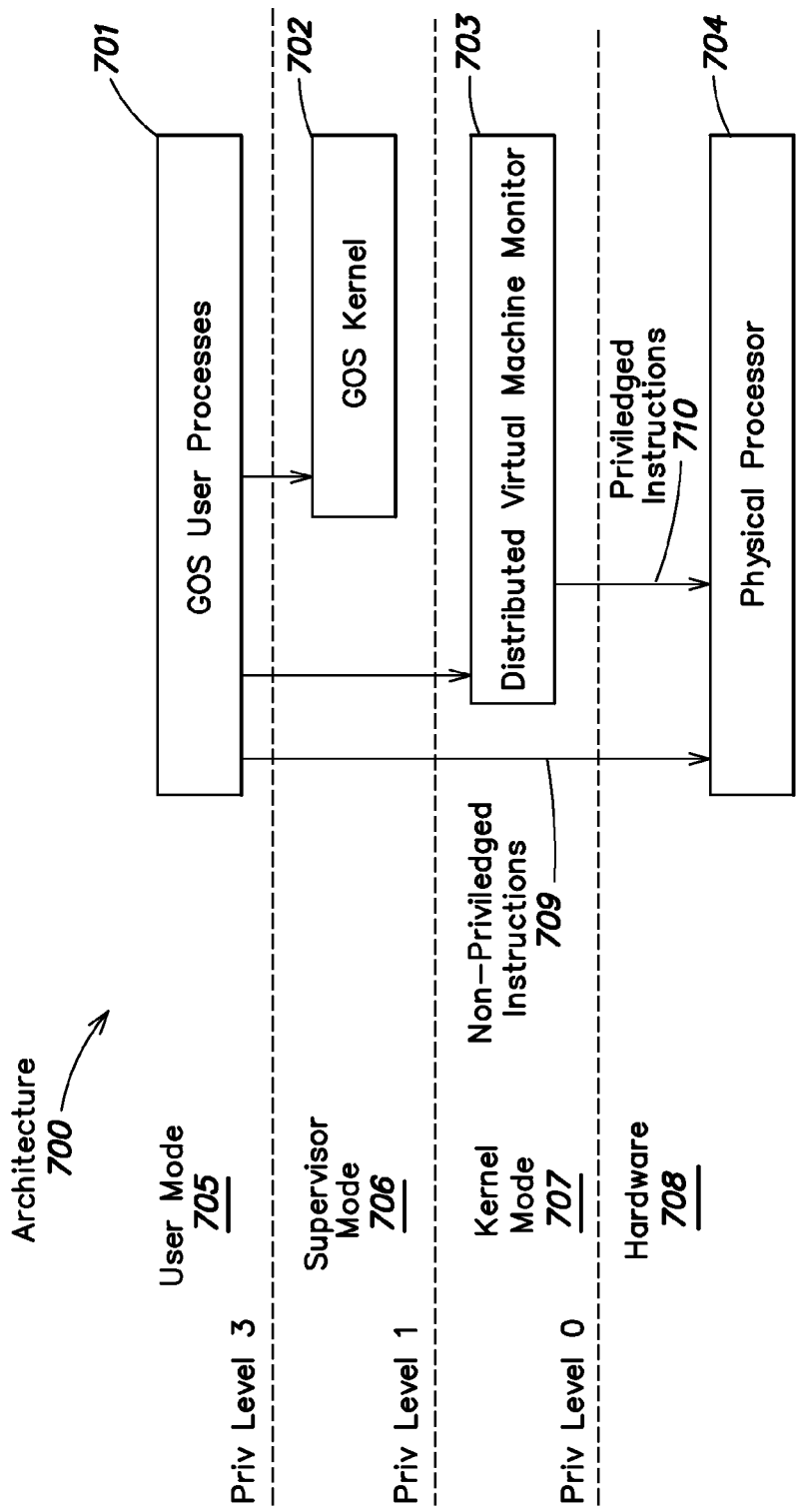
FIG. 7 is a block diagram showing an example execution level scheme in accordance with another embodiment of the present invention.

FIG. 7 shows an execution architecture 700 according to one aspect of the invention. In particular, architecture 700 includes a number of processor privilege levels at which various processes may be executed. In particular, there is defined a user mode level 705 having a privilege level of three (3) at which user mode programs (e.g., applications) are executed. At this level, GOS user processes 701 associated with one or more application programs are executed. Depending on the access type requested, user processes 701 may be capable of accessing one or more privilege levels as discussed further below.

There may also be a supervisor mode 706 that corresponds to a privilege level of one (1) at which the GOS kernel (item 702) may be executed. In general, neither the GOS nor user processes are provided access to the physical processor directly, except when executing non-privileged instructions 709. In accordance with one embodiment, non-privileged instructions are executed directly on the hardware (e.g., a physical processor 704 within a node). This is advantageous for performance reasons, as there is less overhead processing in handling normal operating functions that may be more efficiently processed directly by hardware. By contrast, privileged instructions may be processed through the distributed virtual machine monitor (e.g., DVMM 703) prior to being serviced by any hardware. In one embodiment, only the DVMM is permitted to run at privilege level of 0 (kernel mode) on the actual hardware. Virtual server isolation implies that the GOS cannot have uncontrolled access to any hardware features (such as CPU control registers) nor to certain low-level data structures (such as, for example, paging directories/tables and interrupt vectors).

In the case where the hardware is the Intel IA-32 architecture, there are four processor privilege levels. Therefore, the GOS (e.g., Linux) may execute at a level higher than kernel mode (as the distributed virtual machine monitor, according to one embodiment, is only permitted to operate in kernel mode). In one embodiment, the GOS kernel may be executed in supervisor mode (privilege level 1) to take advantage of IA-32 memory protection hardware to prevent applications from accessing pages meant only for the GOS kernel. The GOS kernel may "call down" into the distributed virtual machine monitor to perform privileged operations (that could affect other virtual servers sharing the same hardware), but the distributed virtual machine monitor should verify that the requested operation does not compromise isolation of virtual servers. In one embodiment of the present invention, processor privilege levels may be implemented such that applications, the GOS and distributed virtual machine monitor are protected from each other as they reside in separate processor privilege levels.

Although the example shown in FIG. 7 has four privilege levels, it should be appreciated that any number of privilege levels may be used. For instance, there are some architecture types that have two processor privilege levels, and in this case, the distributed virtual machine monitor may be configured to operate in the supervisor mode (privilege level 0) and the user programs and operating system may be executed at the lower privilege level (e.g., level 1). It should be appreciated that other privilege scenarios may be used, and the invention is not limited to any particular scenario.

Example Distributed Virtual Machine Monitor Architecture

Figure 8:
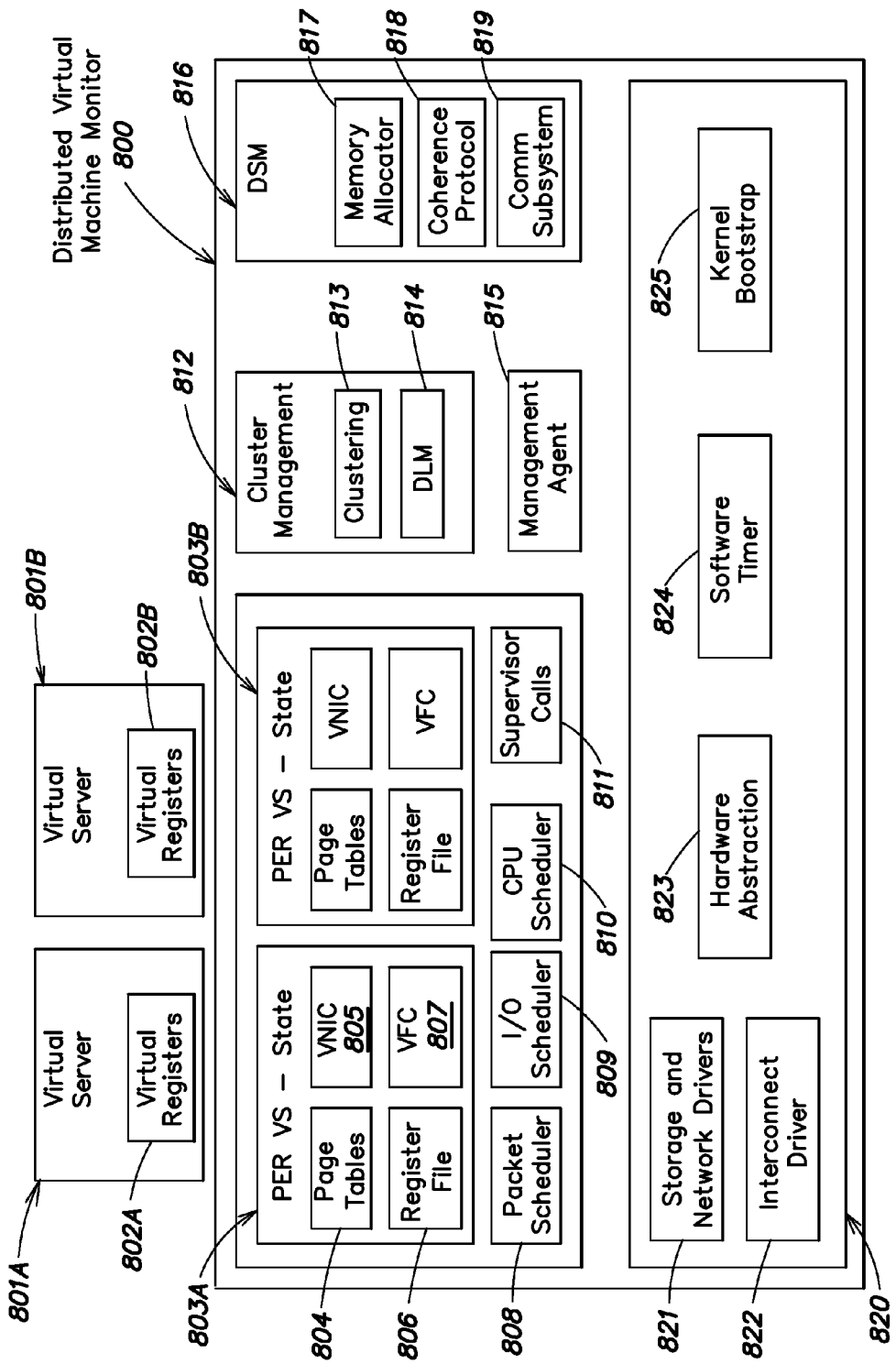
FIG. 8 is a block diagram showing an example distributed virtual machine monitor architecture in accordance with another embodiment of the present invention.

FIG. 8 shows an example of a DVMM architecture according to one embodiment of the present invention. As discussed above, the DVMM is a collection of software that handles the mapping of resources from the physical realm to the virtual realm. Each hardware node (e.g., a physical processor associated with a node) executes a low-level system software that is a part of the DVMM, a microkernel, and a collection of these instances executing on a number of physical processors form a shared-resource cluster. As discussed above, each collection of cooperating (and communicating) microkernels is a virtual partition. There is a one-to-one mapping of a virtual partition to a distributed virtual machine monitor (DVMM). The DVMM, according to one embodiment, is as thin a layer as possible.

FIG. 8 shows a DVMM architecture 800 according to one embodiment of the present invention. DVMM 800 executes tasks associated with one or more instances of a virtual server (e.g., virtual server instances 801A-801B). Each of the virtual server instances store an execution state of the server. For instance, each of the virtual servers 801A-801B store one or more virtual registers 802A-802B, respectively, that correspond to a register states within each respective virtual server.

DVMM 800 also stores, for each of the virtual servers, virtual server states (e.g., states 803A, 803B) in the form of page tables 804, a register file 806, a virtual network interface (VNIC) and virtual fiber channel (VFC) interface. The DVMM also includes a packet scheduler 808 that schedules packets to be transmitted between virtual servers (e.g., via an InfiniBand connection or other connection, or direct process-to-process communication).

I/O scheduler 809 may provide I/O services to each of the virtual servers (e.g., through I/O requests received through the VMA). In addition, the DVMM may support its own I/O, such as communication between nodes. Each virtual device or controller includes an address that may be specified by a virtual server (e.g., in a VMA I/O request). I/O devices are abstracted as a virtual device to the virtual server (e.g., as a PCI or PCI-like device) such that the GOS may access this device. Each virtual I/O (VIO) device may be described to the GOS by a fixed-format description structure analogous to the device-independent PCI config space window.

Elements of the descriptor may include the device address, class, and/or type information that the GOS may use to associate the device with the proper driver module. The descriptor may also include, for example, one or more logical address space window definitions for device-specific data structures, analogous to memory-mapped control/status registers. The I/O scheduler 809 schedules requests received from virtual servers and distributes them to one or more I/O controllers that interface to the actual I/O hardware. More particularly, the DVMM I/O includes a set of associated drivers that moves the request onto a communication network (e.g., InfiniBand) and to an I/O device for execution. I/O may be performed to a number of devices and systems including a virtual console, CD/DVD player, network interfaces, keyboard, etc. Various embodiments of an I/O subsystem are discussed further below with respect to FIG. 9.

CPU scheduler 810 may perform CPU scheduling functions for the DVMM. More particularly, the CPU scheduler may be responsible for executing the one or more GOSs executing on the DVMM. The DVMM may also include supervisor calls 811 that include protected supervisor mode calls executed by an application through the DVMM. As discussed above, protected mode instructions may be handled by the DVMM to ensure isolation and security between virtual server instances.

Packet scheduler 808 may schedule packet communication and access to actual network devices for both upper levels (e.g., GOS, applications) as well as network support within DVMM 800. In particular, packet scheduler 808 may schedule the transmission of packets on one or more physical network interfaces, and perform a mapping between virtual interfaces defined for each virtual server and actual network interfaces.

DVMM 800 further includes a cluster management component 812. Component 812 provides services and support to bind the discrete systems into a cluster and provides basic services for the microkernels within a DVMM to interact with each other. These services include cluster membership and synchronization. Component 812 includes a clustering subcomponent 813 that defines the protocols and procedures by which microkernels of the DVMMs are clustered. At the DVMM level, for example, the configuration appears as a cluster, but above the DVMM level, the configuration appears as a non-uniform memory access, multi-processor single system.

The DVMM further includes a management agent 815. This component is responsible for handling dynamic reconfiguration functions as well as reporting status and logging to other entities (e.g., a management server). Management agent 815 may receive commands for adding, deleting, and reallocating resources from virtual servers. The management agent 815 may maintain a mapping database that defines mapping of virtual resources to physical hardware.

According to various embodiments of the invention microkernels, which form parts of a DVMM, communicate with each other using Distributed Shared Memory (DSM) based on paging and/or function shipping protocols (e.g., object-level). These techniques are used to efficiently provide a universal address space for objects and their implementation methods. With this technology, the set of instances executing on the set of physical processors seamlessly and efficiently shares objects and/or pages. The set of microkernel instances may also provide an illusion of a single system to the virtual server (running on DVMM), which boots and run a single copy of a traditional operating system.

Distributed shared memory 816 is the component that implements distributed shared memory support and provides the unified view of memory to a virtual server and in turn to the Guest Operating System. DSM 816 performs memory mapping from virtual address spaces to memory locations on each of the hardware nodes. The DSM also includes a memory allocator 817 that performs allocation functions among the hardware nodes. DSM 816 also includes a coherence protocol 818 that ensures coherence in memory of the shared-memory multiprocessor. The DSM may be, for example, a virtual memory subsystem used by the DVMM and as the foundation for the Distributed Memory Manager subsystem used by virtual servers.

DSM 816 also includes a communication subsystem that handles distributed memory communication functions. In one example, the DMM may use RDMA techniques for accessing distributed memory among a group of hardware nodes. This communication may occur, for example, over a communication network including one or more network links and switches. For instance, the cluster may be connected by a cluster interconnect layer (e.g., interconnect driver 822) that is responsible for providing the abstractions necessary to allow microkernels to communicate between nodes. This layer provides the abstractions and insulates the rest of the DVMM from any knowledge or dependencies upon specific interconnect features.

Microkernels of the DVMM communicate, for example, over an interconnect such as InfiniBand. Other types of interconnects (e.g., PCI-Express, GigaNet, Ethernet, etc.) may be used. This communication provides a basic mechanism for communicating data and control information related to a cluster. Instances of server functions performed as part of the cluster include watchdog timers, page allocation, reallocation, and sharing, I/O virtualization and other services. Examples of a software system described below transform a set of physical compute servers (nodes) having a high-speed, low latency interconnect into a partitionable set of virtual multiprocessor machines. These virtual multiprocessor machines may be any multiprocessor memory architecture type (e.g., COMA, NUMA, UMA, etc.) configured with any amount of memory or any virtual devices.

According to one embodiment, each microkernel instance of the DVMM executes on every hardware node. As discussed, the DVMM may obtain information from a management database associated with a management server (e.g., server 212). The configuration information allows the microkernel instances of the DVMM to form the virtual partition. Each virtual partition provides services and aggregated resources (e.g., memory) for supporting the virtual servers.

DVMM 800 may include hardware layer components 820 that include storage and network drivers 821 used to communicate with actual storage and network devices, respectively. Communication with such devices may occur over an interconnect, allowing virtual servers to share storage and network devices. Storage may be performed, for example, using Fibre-Channel. Networking may be performed using, for example, a physical layer protocol such as Gigabit Ethernet. It should be appreciated that other protocols and devices may be used, and the invention is not limited to any particular protocol or device type. Layer 820 may also include an interconnect driver 822 (e.g., an InfiniBand driver) to allow individual microkernels of the DVMM running on the nodes to communicate with each other and with other devices (e.g., I/O network). DVMM 800 may also include a hardware abstraction 823 that relates virtual hardware abstractions presented to upper layers to actual hardware devices. This abstraction may be in the form of a mapping that relates virtual to physical devices for I/O, networking, and other resources.

DVMM 800 may include other facilities that perform system operations such as software timer 824 that maintains synchronization between clustered microkernel entities. Layer 820 may also include a kernel bootstrap 825 that provides software for booting the DVMM and virtual servers. Functions performed by kernel bootstrap 825 may include loading configuration parameters and the DVMM system image into nodes and booting individual virtual servers.

In another embodiment of the present invention, the DVMM 800 creates an illusion of a Virtual cache-coherent, Non-Uniform Memory Architecture (NUMA) machine to the GOS and its application. However, it should be appreciated that other memory architectures (e.g., UMA, COMA, etc.) may be used, and the invention is not limited to any particular architecture. The Virtual NUMA (or UMA, COMA, etc.) machine is preferably not implemented as a traditional virtual machine monitor, where a complete processor instruction set architecture (ISA) is exposed to the guest operating system, but rather is a set of data structures that abstracts the underlying physical processors to expose a virtual processor architecture with a conceptual ISA to the guest operating system. The GOS may be ported to the virtual machine architecture in much the same way an operating system may be ported to any other physical processor architecture.

A set of Virtual Processors makes up a single virtual multiprocessor system (e.g., a Virtual NUMA machine, a Virtual COMA machine). Multiple virtual multiprocessor systems instances may be created whose execution states are separated from one another. The architecture may, according to one embodiment, support multiple virtual multiprocessor systems simultaneously running on the same DVMM.

In another example architecture, the DVMM provides a distributed hardware sharing layer via the Virtual Processor and Virtual NUMA or Virtual COMA machine. The guest operating system is ported onto the Virtual NUMA or Virtual COMA machine. This Virtual NUMA or Virtual COMA machine provides access to the basic I/O, memory and processor abstractions. A request to access or manipulate these items is handled via APIs presented by the DVMM, and this API provides isolation between virtual servers and allows transparent sharing of the underlying hardware.

Example System Architecture

Figure 9:
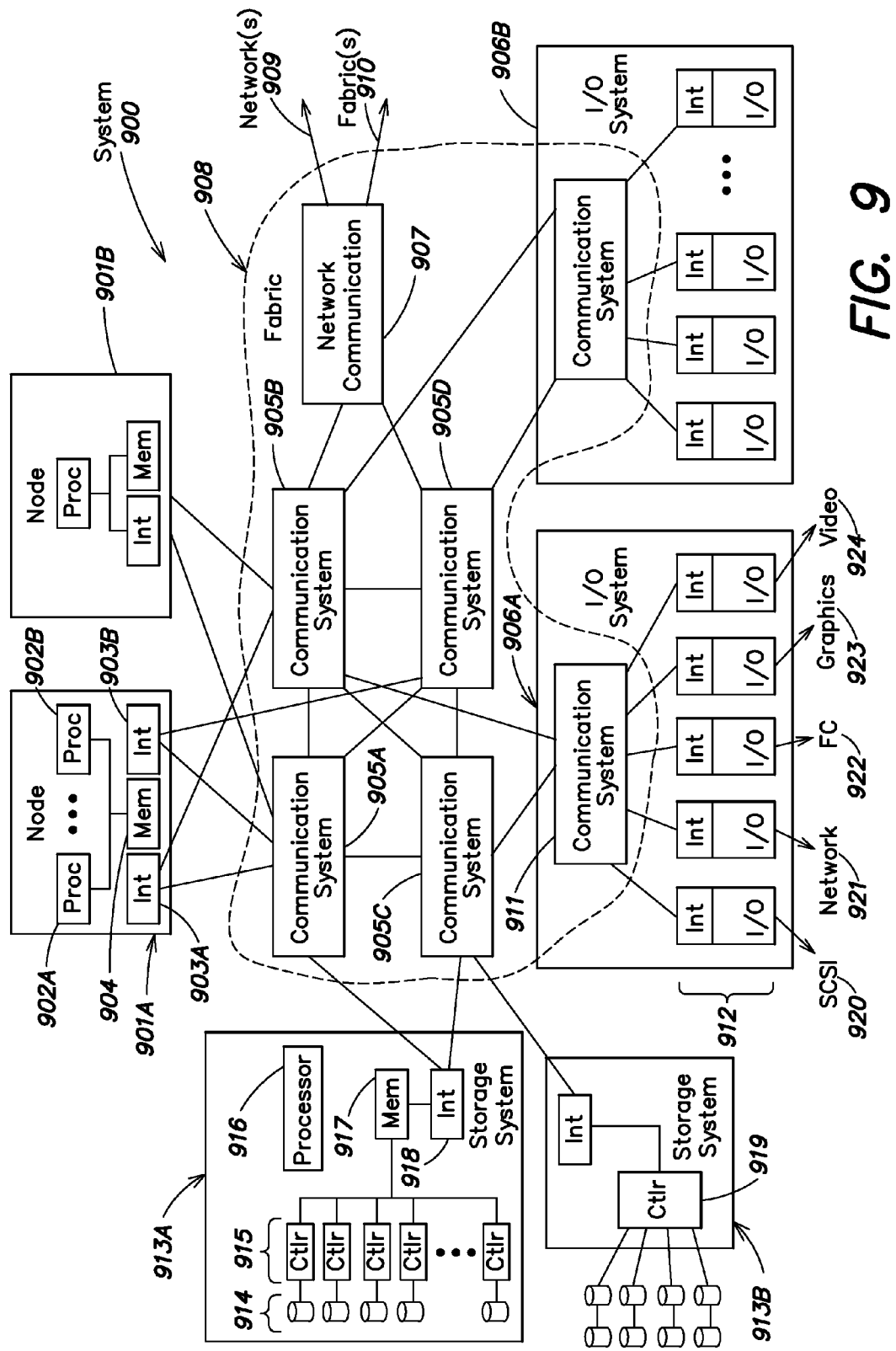
FIG. 9 is a block diagram showing an example system architecture upon which a virtual computing system in accordance with another embodiment of the present invention may be implemented.

FIG. 9 is a block diagram of an example system architecture upon which a virtual computing system in accordance with one embodiment of the present invention may be implemented. As discussed above, a virtual computing system may be implemented using one or more resources (e.g., nodes, storage, I/O devices, etc.) linked via an interconnect. As shown in the example system 900 in FIG. 9, a system 900 may be assembled having one or more nodes 901A-901B coupled by a communication network (e.g., fabric 908). Nodes 901A-901B may include one or more processors (e.g., processors 902A-902B) one or more network interfaces (e.g., 903A-903B) through which nodes 901A-901B communicate through the network.

As discussed above, nodes may communicate through many different types of networks including, but not limited to InfiniBand or Gigabit Ethernet. More particularly, fabric 908 may include one or more communication systems 905A-905D through which nodes and other system elements communicate. These communication systems may include, for example, switches that communicate messages between attached systems or devices. In the case of a fabric 908 that implements InfiniBand switching, interfaces of nodes may be InfiniBand host channel adapters (HCAs) as are known in the art. Further, communication systems 905A-905B may include one or more InfiniBand switches.

Communication systems 905A-905D may also be connected by one or more links. It should be appreciated, however, that other communication types (e.g., Gigabit Ethernet) may be used, and the invention is not limited to any particular communication type. Further, the arrangement of communication systems as shown in FIG. 9 is merely an example, and a system according to one embodiment of the invention may include any number of components connected by any number of links in any arrangement.

Node 901A may include local memory 904 which may correspond to, for example, the node physical memory map 601 shown in FIG. 6. More particularly, a portion of memory 904 may be allocated to a distributed shared memory subsystem which can be used for supporting virtual server processes.

Data may be stored using one or more storage systems 913A-913B. These storage systems may be, for example, network attach storage (NAS) or a storage area network (SAN) as are well-known in the art. Such storage systems may include one or more interfaces (e.g., interface 918) that are used to communicate data between other system elements. Storage system may include one or more components including one or more storage devices (e.g., disks 914), one or more controllers (e.g., controllers 915, 919), one or more processors (e.g., processor 916), memory devices (e.g., device 917), or interfaces (e.g., interface 918). Such storage systems may implement any number of communication types or protocols including Fibre Channel, SCSI, Ethernet, or other communication types.

Storage systems 913 may be coupled to fabric 908 through one or more interfaces. In the case of a fabric 908 having an InfiniBand switch architecture; such interfaces may include one or more target channel adapters (TCAs) as are well-known in the art. System 900 may include one or more I/O systems 906A-906B. These I/O systems 906A-906B may include one or more I/O modules 912 that perform one or more I/O functions on behalf of one or more nodes (e.g., nodes 901A-901B). In one embodiment, an I/O system (e.g., system 906A) includes a communication system (e.g., system 911) that allows communication between one or more I/O modules and other system entities. In one embodiment, communication system 911 includes an InfiniBand switch.

Communication system 911 may be coupled to one or more communication systems through one or more links. Communication system 911 may be coupled in turn to I/O modules via one or more interfaces (e.g., target channel adapters in the case of InfiniBand). I/O modules 912 may be coupled to one or more other components including a SCSI network 920, other communication networks (e.g., network 921) such as, for example, Ethernet, a FibreChannel device or network 922.

For instance, one or more storage systems (e.g., systems 913) or storage networks may be coupled to a fabric though an I/O system. In particular, such systems or networks may be coupled to an I/O module of the I/O system, such as by a port (e.g., SCSI, FibreChannel, Ethernet, etc.) of an I/O module coupled to the systems or networks. It should be appreciated that systems, networks or other elements may be coupled to the virtual computing system in any manner (e.g., coupled directly to the fabric, routed through other communication devices or I/O systems), and the invention is not limited to the number, type, or placement of connections to the virtual computing system.

Modules 912 may be coupled to other devices that may be used by virtual computing systems such as a graphics output 923 that may be coupled to a video monitor, or other video output 924. Other I/O modules may perform any number of tasks and may include any number and type of interfaces. Such I/O systems 906A-906B may support, for virtual servers of a virtual computing system, I/O functions requested by a distributed virtual machine monitor in support of the GOS in its applications.

As discussed above, I/O requests may be sent to I/O controllers (e.g., I/O modules 912) over multiple communication paths within fabric 908. The I/O modules 912 service the requests by routing the requests to virtual or actual hardware that performs the I/O request, and returns status or other information to the distributed virtual machine monitor.

According to one embodiment, GOS I/O devices are virtualized devices. For example, virtual consoles, virtual block devices, virtual SCSI, virtual Host Bus Adapters (HBAs) and virtual network interface controllers (NICs) may be defined which are serviced by one or more underlying devices. Drivers for virtual I/O devices may be multi-path in that the requests may be sent over one or more parallel paths and serviced by one or more I/O modules. These multi-path drivers may exist within the GOS, and may be serviced by drivers within the DVMM. Further, these multi-path requests may be serviced in parallel by parallel-operating DVMM drivers which initiate parallel (multi-initiate) requests on hardware.

In one embodiment, virtual NICs may be defined for a virtual server that allow multiple requests to be transferred from a node (e.g., node 901A) through a fabric 908 to one or more I/O modules 912. Such communications may occur in parallel (e.g., over parallel connections or networks) and may occur, for instance, over full duplex connections. Similarly, a virtual host bus adapter (HBA) may be defined that can communicate with one or more storage systems for performing storage operations. Requests may be transmitted in a multi-path manner to multiple destinations. Once received at one or more destinations, the parallel requests may be serviced (e.g., also in parallel). One example virtual storage architecture is discussed below with respect to FIG. 10.

System 900 may also be connected to one or more other communication networks 909 or fabrics 910, or a combination thereof. In particular, system 900 may connect to one or more networks 909 or fabrics 910 through a network communication system 907. In one embodiment, network communication system 907 may be switch, router or other device that translates information from fabric 908 to outside entities such as hosts, networks, nodes or other systems or devices.

Virtual Storage Architecture

Figure 10:
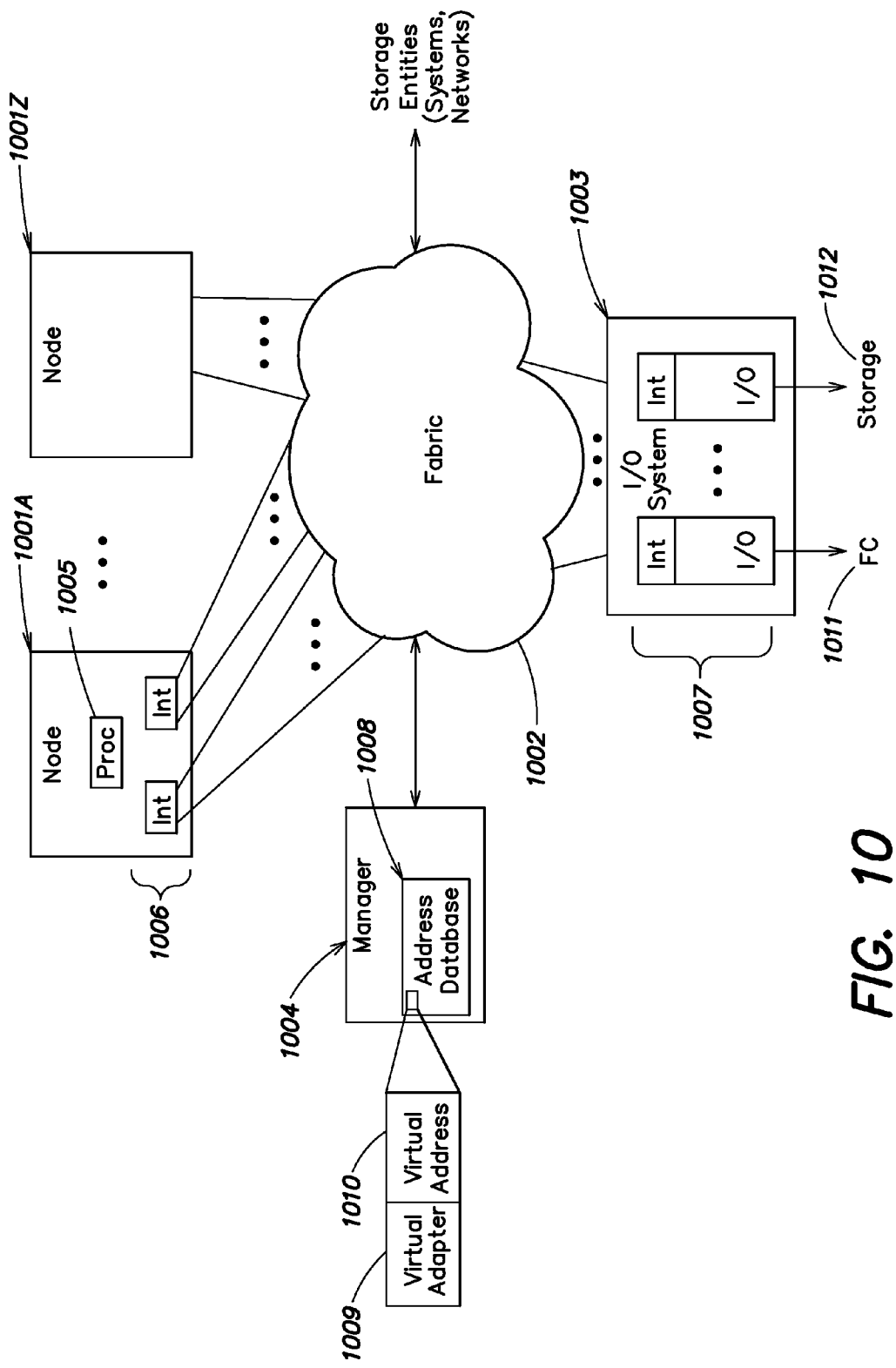
FIG. 10 is a block diagram showing a virtual storage architecture according to one embodiment of the present invention.

FIG. 10 is a block diagram of an example system architecture for a virtual storage system according to one embodiment of the present invention. As discussed above, a virtual computing system may implement a virtual storage architecture wherein actual storage resources are virtualized and presented to a GOS and its applications. According to one embodiment of the present invention, a virtual storage adapter may be defined that is supported by one or more physical hardware resources (e.g., paths, FibreChannel (FC) fabric, high-availability logic). Because such an adapter is virtualized, details of the underlying software and hardware may be hidden from the GOS and its associated software applications.

More particularly, a virtual storage adapter (e.g., an HBA) may be defined that is supported by multiple storage resources, the storage resources being capable of being accessed over multiple data paths. According to one aspect of the present invention, the fact that there are more than one resource (e.g., disks, paths, etc.) that are used to support the virtual adapter may be hidden from the GOS. To accomplish this abstraction of underlying resources, the GOS may be presented a virtualized adapter interface that can be used to access the underlying resources transparently. Such access may be accomplished, for example, using the I/O and multi-path access methods discussed above.

FIG. 10 shows a particular example of an example storage architecture 1000. More specifically, one or more nodes 1001A-B supporting a virtual server (VS) may access a virtual adapter, according to one embodiment of the invention, to perform storage operations. As discussed above, tasks executing on a node may access a virtual device (e.g. a virtual storage adapter) using a virtual interface associated with the virtual device. The interface may be presented by, for example, software drivers as discussed above. According to one embodiment, these software drivers do not provide direct hardware contact, but provide support for a particular set of devices (e.g., storage). These drivers may include upper level and lower level drivers as discussed above with respect to I/O functions. A Distributed Virtual Machine Monitor (DVMM) I/O layer may receive requests for access to the virtual device (e.g., virtual storage adapter) from lower level drivers and process the requests as necessary. For instance, the DVMM I/O layer translates requests for access to a virtual storage adapter and sends the translated requests to one or more I/O systems (e.g., system 1003) for processing.

As discussed, processors of a node (e.g., processor 1005) may initiate and complete I/O operations concurrently. Processors may also be permitted to transmit requests over multiple paths to a destination storage device to be serviced. For instance, node 1001A may send multiple requests from one or more interfaces 1006 through a communication network (e.g., fabric 1002) to an I/O system 1003 for processing. System 1003 may include one or more interfaces and I/O processing modules (collectively 1007) for servicing I/O requests. These I/O requests may be storage requests directed to a storage device coupled to I/O system 1003. For example, I/O system may serve as a gateway to a FibreChannel (1011) or other type of storage network (1012). Parallel requests may be received at a destination device, and serviced. Responses may also be sent over parallel paths for redundancy or performance reasons. Further, fabric 1002 may have any number of storage entities (1013) coupled to fabric 1002, including one or more storage systems or storage networks. Such storage entities may be directly attached to fabric 1002 or be coupled indirectly by one or more communication devices and/or networks.

According to one embodiment of the present invention, the virtual adapter (e.g., a virtual HBA or VHBA) may be defined for a particular virtual server (VS). The virtual adapter may be assigned a virtual address through which storage resources are referenced and accessed. In one embodiment, the virtual address is a World Wide Node Name (WWNN) that uniquely identifies a VHBA. For instance, a virtual HBA may defined in the virtual computing system as "VHBA-1" or some other identifier having a specific WWNN address. In one example, virtual WWNN identifiers are provided by a software vendor providing virtualization system software. It should be appreciated, however, that any other identifier used to identify storage may be used, and that the invention is not limited to WWNN identifiers.

VHBAs having WWNN addresses may be assigned to virtual servers (VSs), for example, using an interface of a management program. For instance, a user or program may be presented an interface through which one or more VHBAs may be assigned to a particular VS. Because WWNN addresses must be globally unique within a system, the addresses may be administered centrally by a management server (e.g., manager 1004). In one embodiment, the management server maintains a database 1008 of available WWNN addresses that may be used by the virtual computing system. These WWNN addresses may be associated with corresponding virtual adapters defined in the virtual computing system, and allocated to virtual servers.

In one embodiment, a particular VHBA has only one WWNN assigned. This is beneficial, as mappings to underlying resources may change, yet the VHBA (and its assigned WWNN) do not change. A user (e.g., an administrator) may assign an available WWNN to the VHBA using a management interface associated with a management server (e.g., manager 1004).

Also, within the management interface, the user may be permitted to associate storage entities with one or more VHBAs. For instance, SCSI Target/LUNs may be associated with a VHBA. The Target (or Target ID) represents a hardware entity attached to a SCSI interconnect. Storage entities, referred to by a Logical Unit Number (LUN), may be mapped to a VHBA which then permits the VS associated with the VHBA to access a particular LUN. Such mapping information may be maintained, for example, in a database by the management server. It should be appreciated that any storage element may be associated with a virtual adapter, and that the invention is not limited to any number or particular type of storage element or identification/addressing convention.

In support of multi-pathing to various storage entities, there may be one or more options by which data is multi-pathed. For example, associated with each storage entity may be path preference (e.g., path affinity) information that identifies a preferred path among a number of available paths. For example, if the number of outstanding I/O requests becomes excessive, or if a path fails, an alternate path may be used. Another option may include a load balancing feature that allows an I/O server to distribute I/O among one or more gateway ports to a storage entity. For instance, an I/O server may attempt to distribute requests (or data traffic) equally among a number of gateway ports. Further, an I/O server having multiple gateway ports to a particular destination entity may allow gateway port failover in the case where a primary gateway port fails.

According to one embodiment, each of these multi-pathing features are transparent to the GOS and its applications. That is, multi-pathing configuration and support (and drivers) need not exist within the GOS. Yet, according to one embodiment of the present invention, because multi-pathing is performed at lower levels, the GOS is provided the performance and reliability benefits of multi-pathing without the necessity of exposing underlying support structures of multi-pathing hardware and software. Such a feature is beneficial, particularly for operating systems and applications that do not support multi-pathing.

Conclusion

In summary, a management architecture is provided. This management architecture allows, for example, to create a virtual data center environment where virtual servers are dynamically assigned to physical resources. This management architecture allows, for example, scale-up and scale-down of virtual computing systems, and such a management capability provides for control of such scale-up and scale-down functions. For instance, a capability is provided to allocate and/or deallocate resources (e.g., processing, memory, networking, storage, etc.) to a virtual computing system. Such control may be provided, for example, to an administrator through an interface (e.g., via a CLI, or GUI) or to other programs (e.g., via a programmatic interface). Such architecture may be used, for example, to manage one or more virtual computing entities that reside on single-node or multi-node computer systems (e.g., grid-based, cluster-based, etc.). In a specific example, such virtual management architecture may be used to manage a virtual computing system that executes on one or more nodes as summarized below.

In one such virtual computing system as discussed above that executes on one or more nodes, a level of abstraction is created between the set of physical processors and a set of virtual multiprocessor partitions to form a virtualized data center. This virtualized data center comprises a set of virtual, isolated systems separated by boundaries. Each of these systems appears as a unique, independent virtual multiprocessor computer capable of running a traditional operating system and its applications. In one embodiment, the system implements this multi-layered abstraction via a group of microkernels that are a part of a distributed virtual machine monitor (DVMM) to form a virtual partition, where each of the microkernels communicates with one or more peer microkernel over a high-speed, low-latency interconnect.

Functionally, a virtual data center is provided, including the ability to take a collection of servers and execute a collection of business applications over the compute fabric. Processor, memory and I/O are virtualized across this fabric, providing a single system image, scalability and manageability. According to one embodiment, this virtualization is transparent to the application.

Ease of programming and transparency is achieved by supporting a shared memory programming paradigm. Both single and multi-threaded applications can be executed without modification on top of various embodiments of the architecture.

According to one embodiment, a part of the distributed virtual machine monitor (DVMM), a microkernel, executes on each physical node. A set of physical nodes may be clustered to form a multi-node virtual partition. Each virtual partition has a unique memory address space that spans the nodes comprising it. A cluster of microkernels form a virtual partition which exports a virtual machine architecture (VMA) interface. Each instance of this interface is referred to as a virtual server.

Because there is isolation between the operating system and its application from the underlying hardware, the architecture is capable of being reconfigured. In one embodiment, capability for dynamically reconfiguring resources is provided such that resources may be allocated (or deallocated) transparently to the applications. In particular, a capability may be provided to perform changes in a virtual server configuration by changing the virtual partition the virtual servers runs on (e.g., node eviction from or integration to a virtual partition or set of virtual partitions). In another embodiment, individual virtual partitions can span physical nodes having one or more processors. In one embodiment, physical nodes can migrate between virtual multiprocessor systems. That is, physical nodes can migrate across virtual partition boundaries.

According to another embodiment of the invention, copies of a traditional multiprocessor operating system boot into multiple virtual servers. According to another embodiment of the invention, virtual processors may present an interface to the traditional operating system that looks like a pure hardware emulation or the interface may be a hybrid software/hardware emulation interface.

It should be appreciated that the invention is not limited to each of embodiments listed above and described herein, but rather, various embodiments of the invention may be practiced alone or in combination with other embodiments.

Having thus described several aspects of at least one embodiment of this invention, it is to be appreciated that various alterations, modifications and improvements will readily occur to those skilled in the art. Such alterations, modifications, and improvements are intended to be part of this disclosure, and are intended to be within the spirit and scope of the invention. Accordingly, the foregoing description is by way of example only.

What is claimed is:

1. A system comprising:
a hardware layer comprising plurality of physical processors included within separate nodes of a plurality of physical nodes;

a virtualization layer that allocates the plurality of physical nodes to one or more virtual resources, the virtualization layer comprising:
  a one or more virtual servers, and
  a distributed virtual machine monitor comprising a plurality of microkernels, each of the microkernels comprising pseudo-machines, and each of the pseudo-machines executing on a single physical node of the plurality of physical nodes, wherein at least one virtual resource of the one or more virtual resources spans at least two of the plurality of physical nodes, wherein the distributed virtual machine monitor maps functions performed by the one or more virtual servers to functions performed by one or more of the physical nodes, and wherein each virtual server executes a single instance of an operating system; and
an interface that represents the allocation of the plurality of physical nodes to the one or more virtual resources, wherein the interface-provides a representation of a mapping of the at least one of the plurality of virtual resources to the plurality of physical nodes and at least one control adapted to create and delete the mapping.

2. The system as recited in claim 1, wherein the plurality of physical nodes includes at least one physical multiprocessor.

3. The system as recited in claim 1, wherein the one or more virtual resources include at least one virtual multiprocessor.

4. The system as recited in claim 1, wherein the one or more virtual resources include at least one virtual processor that is mapped to a plurality of physical multiprocessors.

5. The system as recited in claim 1, wherein the interface is adapted to provide an ability to allocate physical resources to the at least one virtual resource and to deallocate physical resources from the at least one virtual resource.

6. The system as recited in claim 1, wherein the interface includes at least one of a group comprising:
  a graphical user interface;
  a command line interface; and
  a programmatic interface.

7. The system of claim 1, wherein the interface permits configuration of the plurality of resources, by:
  displaying a representation of a virtual server on a display; and
  providing for a user to select the plurality of physical nodes and associate the plurality of physical nodes with the virtual server.

8. The system as claimed in claim 7, further comprising providing for the user to select the plurality of physical nodes and disassociate the plurality of physical nodes from the virtual server.

9. The system of claim 1, further comprising a management infrastructure, the management infrastructure comprising:
  a control interface;
  a distributed virtual machine monitor program adapted to execute on at least one resource in the network environment; and
  at least one management agent adapted to communicate with the control interface to receive instructions from, and to forward results, to the control interface, and wherein the management agent is capable of communicating the instructions to the distributed virtual machine monitor program which is capable of implementing the instructions so as to allocate the plurality of physical nodes to a virtual processor and wherein the management agent forwards a result of the implementing of the instructions to the control interface.

10. The system as recited in claim 9, wherein the control interface of the management infrastructure includes at least one of a group comprising:
  a graphical user interface;
  a command line interface; and
  a programmatic interface.

11. The system of claim 1, further comprising a manager that performs at least one of adding, moving, and removing at least one of the plurality of physical nodes from the virtual server.

12. The system according to claim 11, wherein the manager stores a history of changes in configuration of the virtual server.

13. The system according to claim 11, wherein a manager that is adapted to process at least one transaction, the at least one transaction relating to the at least one of adding, moving, and removing the at least one of the plurality of nodes from the virtual server.

14. The system according to claim 13, wherein the manager is adapted to store change information of the at least one transaction as a discrete entry in a history of changes.

15. The system according to claim 14, wherein the manager is adapted to undo the at least one transaction based on the discrete entry stored in the history of changes.

16. The system according to claim 11, wherein the manager is adapted to implement at least one management policy relating to virtual and physical resources.

17. The system according to claim 16, wherein the at least one management policy includes at least one rule triggered by one or more events.

18. The system according to claim 17, wherein the manager is adapted to perform one or more actions in response to a triggering of the at least one rule.

19. The system according to claim 16, wherein the at least one management policy is in effect for a particular period of time.

20. The system according to claim 17, wherein the at least one rule is triggered based on one or more parameters.

21. The system according to claim 20, wherein the one or more parameters include at least one of a performance parameter indicating the performance of the virtual server.

22. The system according to claim 18, wherein the manager is adapted to perform at least one of the group of actions comprising:
  add a resource to the virtual server;
  repair a resource of the virtual server;
  remove a resource from the virtual server;
  start a processing resource of the virtual server; and
  stop a processing resource of the virtual server.

23. The system according to claim 1, wherein the plurality of virtual resources includes a virtual I/O interface.

24. The system according to claim 23, wherein the virtual I/O interface includes an associated identifier.

25. The system according to claim 24, wherein the virtual I/O interface is a virtual network interface, and wherein the associated identifier includes a network address.

26. The system according to claim 25, wherein the network address includes a MAC address.

27. The system according to claim 24, wherein the virtual I/O interface is a virtual storage adapter, and wherein the associated identifier includes a storage adapter identifier.

28. The system according to claim 27, wherein the storage adapter identifier includes a World Wide Node Name (WWNN) identifier.

29. The system according to claim 24, further comprising a manager that is adapted to define the one or more virtual resources in the virtual server, the one or more virtual resources including the virtual I/O resource, and wherein the manager is adapted to assign the associated identifier to the virtual I/O resource.

30. The system according to claim 29, wherein the manager is adapted to select the associated identifier from a group of available identifiers.

31. The system according to claim 29, wherein the manager further comprises an interface, through which the associated identifier is assigned to the virtual I/O resource.

32. The system according to claim 29, wherein the one or more virtual resources include at least one virtual computer that is mapped to at least one of a plurality of physical resources, and wherein the manager further comprises an interface, through which the at least one virtual computer may be created.

33. The system according to claim 32, wherein the manager is adapted to perform at least one of adding, moving, and removing at least one of the plurality of physical resources from the virtual server.

34. The system according to claim 32, wherein the interface of the manager includes a control for making a copy of the at least one virtual computer, and wherein the control includes means for assigning, to a virtual I/O resource associated with the copy, a new associated identifier.

35. The system according to claim 34, wherein the manager is adapted to select the associated identifier from a group of available identifiers.

36. The system according to claim 34, wherein the interface of the manager includes at least one of a group comprising:

a graphical user interface;
a command line interface; and
a programmatic interface.

37. The system according to claim 1, wherein the at least two of the plurality of physical resources are associated with respective separate nodes, and wherein the one or more virtual resources span the separate nodes.

* * * * *

UNITED STATES PATENT AND TRADEMARK OFFICE
CERTIFICATE OF CORRECTION

Page 1 of 2

PATENT NO. : 8,776,050 B2
APPLICATION NO. : 10/972762
DATED : July 8, 2014
INVENTOR(S) : Plouffe et al.

It is certified that error appears in the above-identified patent and that said Letters Patent is hereby corrected as shown below:

On the Title Page, References Cited

On page 2, column 1, under Other Publications, line 1, delete "runing" and insert -- running --, therefor.

On page 2, column 2, under Other Publications, line 28, delete "(sourceforget.net)," and insert -- (sourceforge.net), --, therefor.

In the Specification

Column 1, line 12, delete "to" and insert -- to U.S. --, therefor.

Column 7, line 17, delete "an-infinite" and insert -- an infinite --, therefor.

Column 10, line 18, delete "or-more" and insert -- or more --, therefor.

Column 10, line 48, delete "microkemel" and insert -- microkernel --, therefor.

Column 10, line 51, delete "microkemel" and insert -- microkernel --, therefor.

Column 12, lines 47-58, delete "Such........programmatically." and insert the same on Column 12, Line 46, after "system." as the continuation of the same paragraph.

Column 12, line 61, delete "paritions." and insert -- partitions. --, therefor.

Column 15, line 25, after "resources)" insert -- . --.

Column 16, line 60, delete "microkemel" and insert -- microkernel --, therefor.

Signed and Sealed this
Twenty-fourth Day of February, 2015

Michelle K. Lee
*Deputy Director of the United States Patent and Trademark Office*

CERTIFICATE OF CORRECTION (continued)
U.S. Pat. No. 8,776,050 B2

Column 17, line 38, delete "microkemel's" and insert -- microkernel's --, therefor.

Column 20, line 30, delete "1 108," and insert -- 1108, --, therefor.

Column 24, line 47, delete "that that" and insert -- that --, therefor.

Column 25, line 13, delete "architecture architecture" and insert -- architecture --, therefor.

Column 26, lines 17-27, delete "where the.......program." and insert the same on Column 26, Line 16, after "action" as the continuation of the same paragraph.

Column 27, line 38, delete "average>70%" and insert -- average >70% --, therefor.

Column 31, line 62, delete "InDput" and insert -- Input --, therefor.

Column 31, line 67, delete "30 providing" and insert -- providing --, therefor.

Column 36, line 55, delete "config" and insert -- configuration --, therefor.

Column 38, line 34, delete "microkemel" and insert -- microkernel --, therefor.